United States Patent [19]

Watanabe et al.

[11] Patent Number: 5,793,310
[45] Date of Patent: Aug. 11, 1998

[54] PORTABLE OR VEHICULAR NAVIGATING APPARATUS AND METHOD CAPABLE OF DISPLAYING BIRD'S EYE VIEW

[75] Inventors: Masaki Watanabe; Norimasa Kishi, both of Yokohama; Yoshitaka Yatsugi, Zama, all of Japan; Kiyomichi Yamada, rue des Trois Ponts, Belgium

[73] Assignee: Nissan Motor Co., Ltd., Kanagawa, Japan

[21] Appl. No.: 384,715

[22] Filed: Feb. 3, 1995

[30] Foreign Application Priority Data

| Feb. 4, 1994 | [JP] | Japan | 6-033182 |
| Feb. 7, 1994 | [JP] | Japan | 6-034202 |
| Jul. 8, 1994 | [JP] | Japan | 6-180553 |
| Aug. 29, 1994 | [JP] | Japan | 6-203835 |

[51] Int. Cl.$^6$ .................................................. G08G 1/123
[52] U.S. Cl. .................. 340/995; 340/990; 701/201; 701/202; 701/211; 701/212
[58] Field of Search ........................ 340/995, 988, 340/990; 364/444, 449, 439; 701/201, 202, 211, 212, 213

[56] References Cited

U.S. PATENT DOCUMENTS

| 3,715,716 | 2/1973 | Stiegemeier | 340/995 |
| 4,442,609 | 4/1984 | Senoo. | |
| 4,653,012 | 3/1987 | Duffy et al. | 395/137 |
| 4,660,037 | 4/1987 | Nakamura | 340/990 |
| 4,661,811 | 4/1987 | Gray et al. | 340/995 |
| 4,737,927 | 4/1988 | Hanabusa et al. | 364/443 |

(List continued on next page.)

FOREIGN PATENT DOCUMENTS

| 0 059 435 | 9/1982 | European Pat. Off. . |
| 0 378 271 | 7/1990 | European Pat. Off. . |
| 4121095 | 6/1991 | Germany . |
| 57-206815 | 12/1982 | Japan . |
| 59-186099 | 10/1984 | Japan . |
| 62-86499 | 4/1987 | Japan . |
| 64-41976 | 2/1989 | Japan . |
| 3-3589 | 1/1991 | Japan . |
| 3-42399 | 2/1991 | Japan . |
| 3225391 | 4/1991 | Japan . |
| 5-281903 | 10/1993 | Japan . |
| WO86/02764 | 5/1986 | WIPO . |

OTHER PUBLICATIONS

Toshiyuki Itoh et al., "Navigation Systems Using GPS for Vehicles", Society of Automotive Engineers, Inc., Paper No. 861360, pp. 1–13, 1986.

Masakazu Tsunoda et al., "Navigation Systems for Passenger Cars", Society of Automotive Engineers, Inc., Paper No. 861056, pp. 201–210.

*Primary Examiner*—Jeffery A. Hofsass
*Assistant Examiner*—Benjamin C. Lee
*Attorney, Agent, or Firm*—McDermott, Will & Emery

[57] ABSTRACT

In an apparatus and method for navigating a mobile body such as a vehicle or user, an accurate and easily grasping road map graphic data in a bird's eye display mode are achieved with a running route on which the mobile body has traveled maintained and having a continuity to the past running information and operability of the navigating apparatus is improved. In the navigating apparatus and method, the present position information and display parameter information are previously set, a line of sight is determined on the basis of the forwarding direction information, a view point position is determined on the basis of the forwarding direction is determined. A road map data expressed with a two-dimensional X-Y plane as a reference is stored. The road map data stored receive their coordinate transformations on the basis of the determined view point position and direction of line of sight to generate the bird's eye view. Such generated bird's eye view image data are output to a display unit so that the bird's eye view can be viewed from a display image screen. Furthermore, character data such as names of places are selectively superimposed on respective minor regions of the image screen without superimpositions on other character data belonging to adjacent minor regions.

34 Claims, 45 Drawing Sheets

U.S. PATENT DOCUMENTS

| | | | |
|---|---|---|---|
| 4,743,913 | 5/1988 | Takai . | |
| 4,757,455 | 7/1988 | Tsunoda et al. . | |
| 4,774,671 | 9/1988 | Itoh et al. . | |
| 4,774,672 | 9/1988 | Tsunoda et al. . | |
| 4,782,447 | 11/1988 | Ueno et al. . | |
| 4,812,980 | 3/1989 | Yamada et al. | 364/449 |
| 4,862,374 | 8/1989 | Ziemann | 364/449 |
| 4,876,651 | 10/1989 | Dawson et al. | 364/449 |
| 4,899,285 | 2/1990 | Nakayama et al. . | |
| 4,964,052 | 10/1990 | Ohe | 340/995 |
| 5,031,104 | 7/1991 | Ikeda et al. | 340/995 |
| 5,115,398 | 5/1992 | De Jong | 340/995 |
| 5,121,326 | 6/1992 | Moroto et al. | 364/449 |
| 5,161,886 | 11/1992 | De Jong et al. | 364/449 |
| 5,200,902 | 4/1993 | Piley | 364/439 |
| 5,212,643 | 5/1993 | Yoshida | 340/995 |
| 5,272,638 | 12/1993 | Martin et al. | 340/990 |
| 5,371,678 | 12/1994 | Nomura . | |
| 5,377,102 | 12/1994 | Nishiishigaki | 340/990 |
| 5,420,582 | 5/1995 | Kubbat et al. | 340/974 |

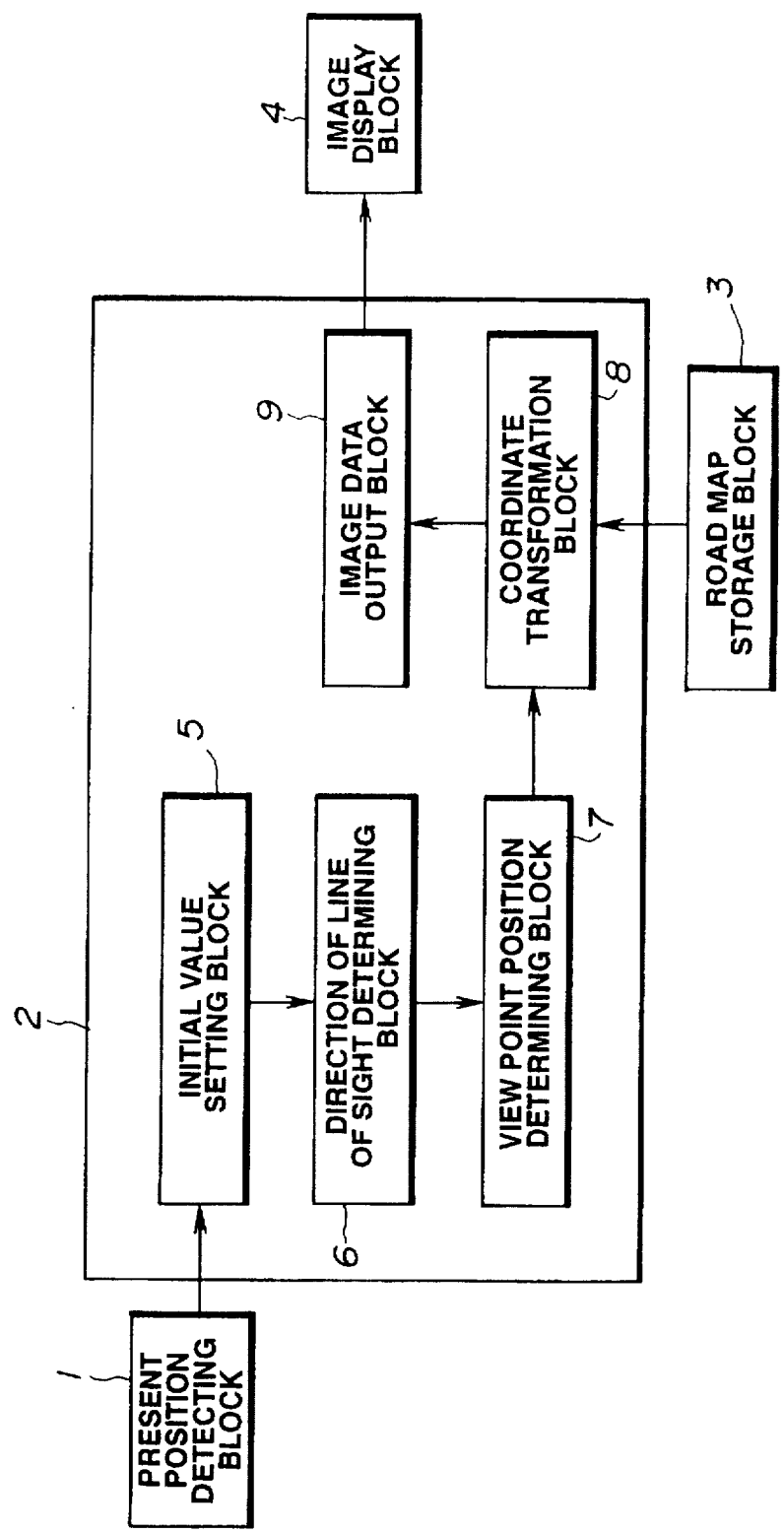

WHEN THE VEHICLE RUNS TOWARD E VIA
INTERSECTIONS A,B,C, AND D

WHEN THE VEHICLE CURVES ON A LETTER S-SHAPED ROAD.

(IN FIGS.7A AND 7B, → DENOTES VEHICULAR FORWARDING DIRECTION, ▨ DENOTES A DISPLAYED REGION OF THE BIRD'S EYE VIEW UNDER A FILTERING ▱ DENOTES THE DISPLAYED REGION OF THE BIRD'S EYE VIEW IN A CASE OF A COMPARATIVE EXAMPLE SHOWN IN FIG.2

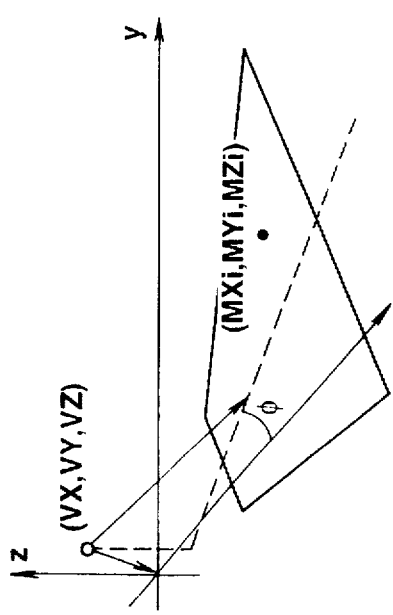

FIG.23A

$$\begin{pmatrix} MX*_1 \\ MY*_1 \\ MX*_1 \end{pmatrix} = \begin{pmatrix} MX_1 \\ MY_1 \\ MZ_1 \end{pmatrix} - \begin{pmatrix} VX \\ VY \\ VZ \end{pmatrix}$$

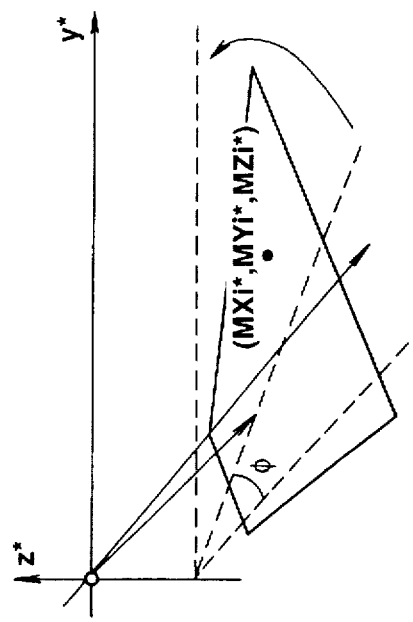

FIG.23B

$$\begin{pmatrix} MX_1 \\ MY_1 \\ MX**_1 \end{pmatrix} = \begin{pmatrix} \cos\left(\frac{\pi}{2}-\phi\right) & -\sin\left(\frac{\pi}{2}-\phi\right) & 0 \\ \sin\left(\frac{\pi}{2}-\phi\right) & \cos\left(\frac{\pi}{2}-\phi\right) & 0 \\ 0 & 0 & 1 \end{pmatrix} \begin{pmatrix} MX*_1 \\ MY*_1 \\ MX*_1 \end{pmatrix}$$

CONTENT OF MEMORY BLOCK AFTER DETECTION
OF LATERAL SUPERIMPOSITION WITH SRj

|   | (NAME) N | SUPER-IMPOSITION NO. | DEGREE OF SUPERIMPOSITION | | |
|---|---|---|---|---|---|
|   |   |   | LEFT | UP/DOWN | RIGHT |
| 0 | j | ○○○ | 1 | 0 | 0 | ov1 |
| 1 | j | ☐☐☐ | 2 | ov1 | 0 | ov2 |
| 2 | j | △△ | 1 | ov2 | 0 | 0 |
| 3 | j | ××  | 0 | 0 | 0 | 0 |

# PORTABLE OR VEHICULAR NAVIGATING APPARATUS AND METHOD CAPABLE OF DISPLAYING BIRD'S EYE VIEW

BACKGROUND OF THE INVENTION

1. Field of the Invention

The present invention relates to a navigating apparatus and method which are capable of displaying a bird's eye view of a road map and which are applicable to a vehicular route guidance system or to a portable navigating apparatus.

2. Description of the Background Art

Conventionally, various types of navigation systems and methods which have been applied to route guidance systems of vehicles or to portable navigating apparatuses and methods have been proposed.

Display modes in almost all navigating apparatuses are generally top views as found in road maps of atlas. In addition, in a case where a navigating system operator (user) wants to view an information on a certain traffic intersection, an enlarged view indicating this intersection is displayed (superimposed) around a center of a displayed image screen with this intersection as a reference point. However, it is difficult for the user to grasp where a recommended route to a destination except a displayed recommended route is present, kinds of roads (road attributes, for example, freeway or national highway) and whether left and right turns (corners) are present or not due to a restriction imposed on the screen of an image display block (unit).

To solve the above-described problem, a previously proposed navigating apparatus has been proposed. FIG. 1 illustrates a functional block diagram of the previously proposed navigating apparatus. The previously proposed navigating apparatus shown in FIG. 1 includes: a calculation processing block 101 having a data access block 102 which is so constructed as to execute accesses of data to various data input from its external blocks, a reduced scale transformation block 103 which is so constructed as to transform a reduced scale of data, and an image data output block 104 which is so constructed as to output data from the reduced scale transformation block 103; a road map data storage block 105 which is so constructed as to store a plurality of road map data; a vehicle present position detecting block 106 which is so constructed as to to detect the position of the vehicle; a display reduced scale factor input block 107 which is so constructed as to input a command to switch a scale factor of the road map data to be displayed; and an image display block 105 which is so constructed as to display the reduced scale road map on a television monitor screen of display.

In operation, in a case where an area surrounding a present position of, for example, a vehicle is desired to be displayed by the user, through the display reduced scale factor input block 107, a display mode of the image display block 108 is switched into a relatively narrow region of a road map surrounding an intersection near to the present position.

Next, in a case where an information of a relatively wide region of the road map such as a direction of the destination to which the user has desired to reach and the recommended route of travel is desired to be displayed, through the display reduced scale factor input block 103, the display mode of the image display block 108 is switched into the relatively wide region of the road map. In these cases, the road map reduced scale transformation block 101 in the calculation processing block 101 serves to execute the desired and the reduced scale displays. In other words, the execution of the desired display is carried out by selecting the scale factor of the road map in the reduced scale mode.

However, in the previously proposed navigating apparatus shown in FIG. 1, when a part of the recommended route to the destination which is remote from the present position is desired to be grasped from the displayed road map, it is necessary to switch the display mode of the image display block 108 into the mode of relatively wide region of the road map. In this case, a shape of any one of the intersections on the route which would be approached to an immediate front part of the user is extremely constricted so that the user cannot easily grasp the above-described part of the recommended route which is remote from the present position. In addition, since a tiresome or complicated operation is needed via an operation switch installed on the reduced scale factor input block 107, an operability of the previously proposed navigating apparatus is reduced.

SUMMARY OF THE INVENTION

It is an object of the present invention to provide an improved apparatus and method for navigating a vehicle or a user of the apparatus which are capable of displaying bird's eye view of a road map and which provide a user (or a viewer) for easiness in grasping a traveling road and for easiness in grasping a relationship between the present position of the viewer (vehicle) and easiness in grasping a destination to which the viewer (user) desires to finally reach.

The above-described object can be achieved by providing a navigating apparatus comprising: a) present position detecting means for detecting a present position of a mobile body and a forwarding direction toward which the mobile body moves at the present position thereof; b) initial display parameter value setting means for previously setting the detected present position and display parameters thereinto as initial values; c) direction of line of sight determining means for determining a direction of line of sight for a perspectively projected image on the basis of at least the detected forwarding direction; d) view point position determining means for determining a position of a view point on which the direction of line of sight is based on the basis of at least the information of the forwarding direction detected by the present position detecting means; e) road map data storing means for storing at least a road map data expressed with a two-dimensional X-Y plane as a reference; f) coordinate transforming means for executing a coordinate transformation of the road map data stored in said road map data storing means on the basis of at least the determined direction of line of sight and the determined view point position into a bird's eye view so as to generate the bird's eye view; and g) display means for receiving the display data of the bird's eye view and for displaying the bird's eye view on its image screen.

The above-described object can also be achieved by providing a navigating apparatus comprising: a) external storing means for storing road map data which are divided into a plurality of square-shaped land-partitioned regions defined as meshes; b) display reference point determining means for determining a display reference point on the road map data; c) calculation processing means for executing a calculation processing required to display a bird's eye view on the basis of the mesh data from said external storing means and the determination information of said display reference point determining means; and d) image displaying means for displaying the road map data as the result of calculation processing by said calculation processing means on its display screen.

The above-described object can also be achieved by providing a navigating apparatus comprising: a) present position detecting means for detecting a present position of a mobile body and for detecting a forwarding direction at the present position toward which the mobile body moves; b) road map data storing means for storing a road map information including a road map data previously expressed with a two-dimensional X-Y plane as a reference and traffic intersection data and route road point data on the road map data; c) predicted route road point calculating means for calculating a route road point present in a forward direction of the mobile body toward which the mobile body moves from a route road point at which the mobile body is present as the present position on the basis of the present position detected by the present position detecting means, the forwarding direction at the present position detected by the present position detecting means, and the road map information; d) view point position/reference point position determining means for determining a reference point position and a direction of a view point on a road map display on the basis of the present position and forwarding direction at the present position detected by said present position detecting means; e) display information generating means for carrying out a coordinate transformation of the road map information on the basis of the data of the view point position and reference point position data from the view point position/reference point position determining means so as to generate a display information; and f) display means for displaying the generated display information on its image screen.

The above-described object can also be achieved by providing a navigating apparatus comprising: a) external memory means for storing road map information having a road map graphic data and character data constituting names of places to be superimposed on the road graphic data; b) display reference point determining means for determining a display reference point on the road map according to a position of a vehicle; c) a calculation processing unit which is so constructed as to fetch the road map information required to be displayed from said eternal memory means and so as to determine contents of displays, on the basis of the determined display reference point; and d) image display unit which is so constructed as to display an output from said calculation processing unit in a form of a road map image on its screen, wherein the image screen of the image display unit is divided into a plurality of image minor regions and said calculation processing unit selects and displays one of the character data constituting the names of places to be displayed within one of the same minor regions in accordance with the division of the image screen into the plurality of minor regions.

The above-described object can also be achieved by providing a method for navigating a mobile body, comprising the steps of: a) detecting a present position of the mobile body and a forwarding direction toward which the mobile body moves at the present position thereof; b) previously setting the detected present position and display parameters thereinto as initial values; c) determining a direction of line of sight for a perspectively projected image on the basis of at least the information of the detected forwarding direction; d) determining a position of a view point on which the direction of line of sight is based on the basis of at least the information of the detected forwarding direction; e) storing at least a road map data expressed with a two-dimensional X-Y plane as a reference; f) executing a coordinate transformation of the road map data stored in said road map data storing means on the basis of at least the determined direction of line of sight and the determined view point position into a bird's eye view so as to generate the bird's eye view; and g) receiving the data of the bird's eye view and displaying the bird's eye view on an image screen.

BRIEF DESCRIPTION OF THE DRAWINGS

FIG. 5A is a functional block diagram of the first preferred embodiment of the navigating apparatus according to the present invention.

FIGS. 23A, 23B, 23C, and 23D are explanatory views for explaining a method of coordinate transformation on the road map in the case of the eighth embodiment.

BEST MODE FOR CARRYING OUT THE INVENTION

Reference will hereinafter be made to the drawings in order to facilitate a better understanding of the present invention.

(First Embodiment)

Figure 1:
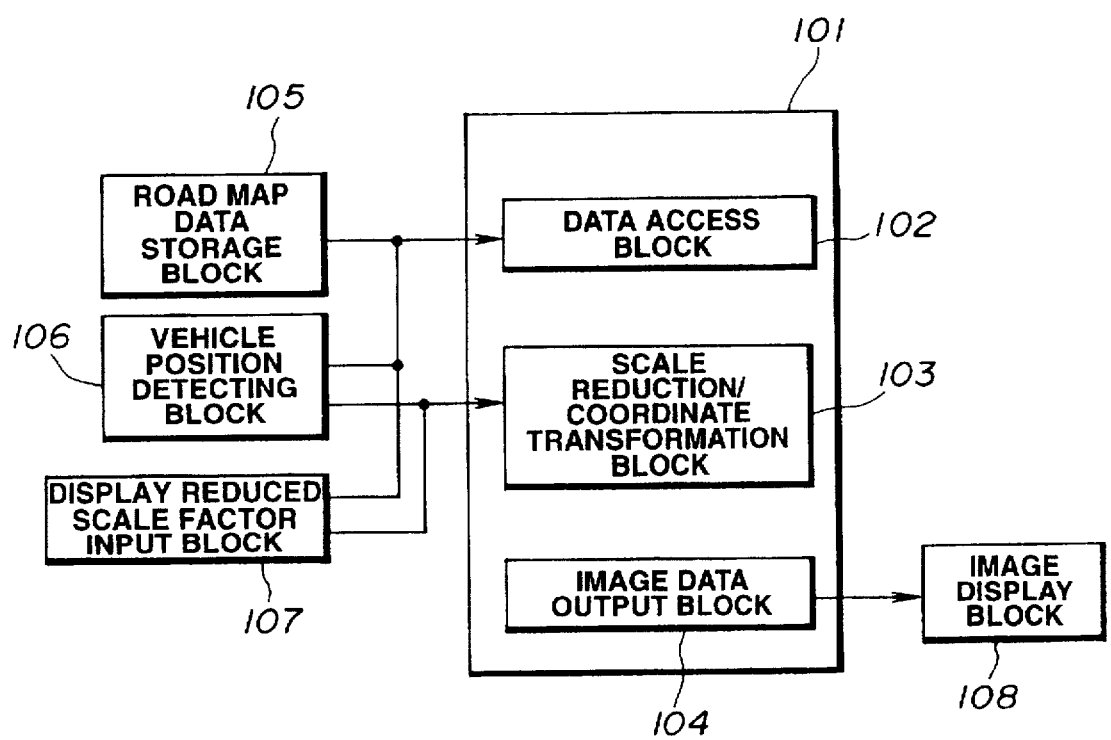
FIG. 1 is a functional block diagram of a previously proposed vehicular navigating apparatus described in the BACKGROUND OF THE INVENTION.

Before explaining a first preferred embodiment of a navigating apparatus according to the present invention, a comparative example of navigating apparatus which is capable of displaying a bird's eye view to compare, for example, with the first embodiment will be explained below with reference to FIG. 1.

The comparative example provides a new display mode of a perspective view from, for example, a vehicular occupant (driver, or pilot) seat applied into a flight simulator or amusement game. It is noted that such a display as the perspectively projected view described above is generally called a bird's eye view. This bird's eye view is a mode of display as if a viewer (user) placed on an upper sky were looking down on a road map. The bird's eye view can provide a recognition of a detailed road pattern surrounding a display reference point (as will be defined later) and, simultaneously, can provide a easy grasping of road shapes located remotely from its view point.

Figure 2:
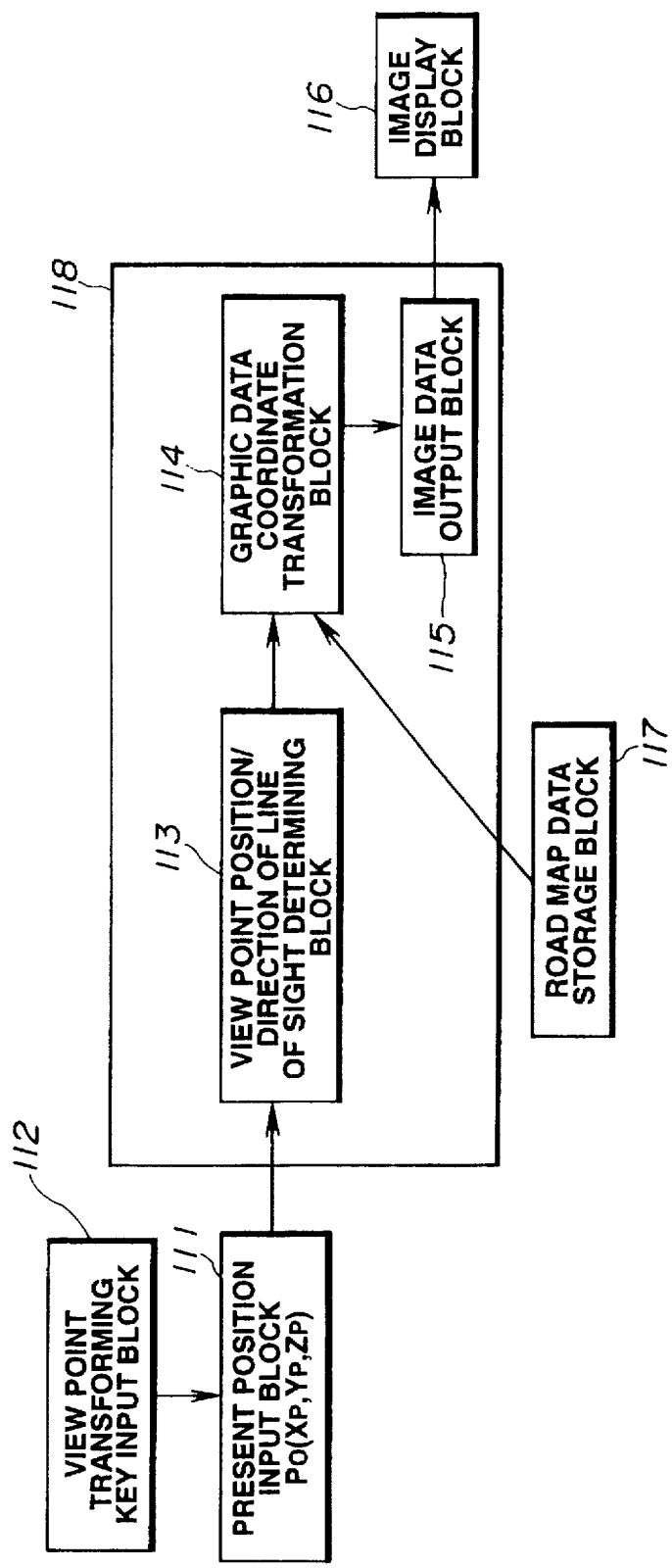
FIG. 2 is a functional block diagram of a comparative example to a first preferred embodiment of a vehicular navigating apparatus.

FIG. 2 shows a schematic functional block diagram of the comparative example to the navigating apparatus according to the present invention.

As shown in FIG. 2, the comparative example of then navigating apparatus includes: a present position input block 111 which is so constructed as to input a present (presently standing) position $P_0$ ($X_p$, $Y_p$, $Z_p$); an operation keyboard block (view point transforming key input block) 112 which is so constructed as to change the present position; a view point position/direction of line of sight determining block 113 which is so constructed as to determine the view point position and direction of line of sight on the basis of the information from the present position input block 111; a graphic data coordinate transformation block 114 which is so constructed as to transform graphic data coordinates on the basis of the information from the view point position/ direction of line of sight determining block 113 and road map data; an image data output block 115 which is so constructed as to output image data on the basis of the information from the graphic data coordinate transformation block 114; a road map storage block 117 which is so constructed as to store various types of the road map data and to be read and to output the stored road map data to the graphic data coordinated transformation block 114; and an image display block 116 which is so constructed as to display the information on a video image output from the image data output block 115. The view point position/ direction of line of sight determining block 113, the graphic data coordinate transformation block 114, the image data output block 115 are constituted by a bird's eye view display calculating block 118.

On the other hand, the perspectively projected view, namely, the bird's eye view will be explained below with reference to FIG. 3.

Figure 3:
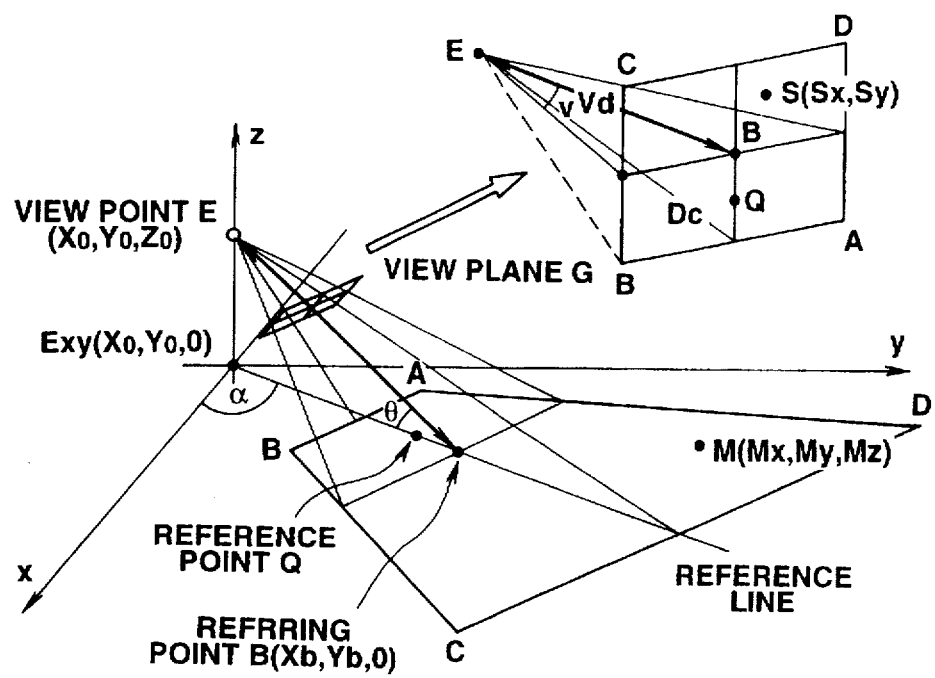
FIG. 3 is an explanatory view for explaining a state of a bird's eye view to be output onto a display screen.

The perspective view, as shown in FIG. 3, is such that an image of a road map region ABCD on three-dimensional coordinate axes (X, Y, Z) which is expressed with respect to a two-dimensional plane (X, Y), the road map region ABCD being looked down from the view point denoted by E ($X_0$, $Y_0$, $Z_0$) to a referring point B ($X_b$, $Y_b$, $Z_b$) through an angle of depression θ, is projected on a view plane G which is arranged vertically with respect to a direction of its line of sight from the view point, the projected image being output on a display image screen as the bird's eye view.

At this time, suppose that, as shown in FIG. 3, a direction of the view point E has an angle α to a reference line as an information of a rotational direction with respect to an X-Y plane. In addition, suppose that a spatial distance between the view point E and view plane G is $V_d$. Then, as shown in FIG. 3, in the perspectively projected image, a longitudinally drawn line on a center line of (X, Y) (X-Y) plane is called a reference line and a definite point Q present on the reference line is referred to as a reference point of the perspective projection. The reference point Q provides a point present on a straight line (reference line) connecting between the view point E when its position is supposed on the X-Y plane on the road map data and the referring point B (on the X-Y plane) for the perspective projection. Therefore, the reference point Q is displayed on a midway point on the line from a bottom of the display screen toward the referring point B (a center of the screen) by a distance $D_c$.

Figure 4:
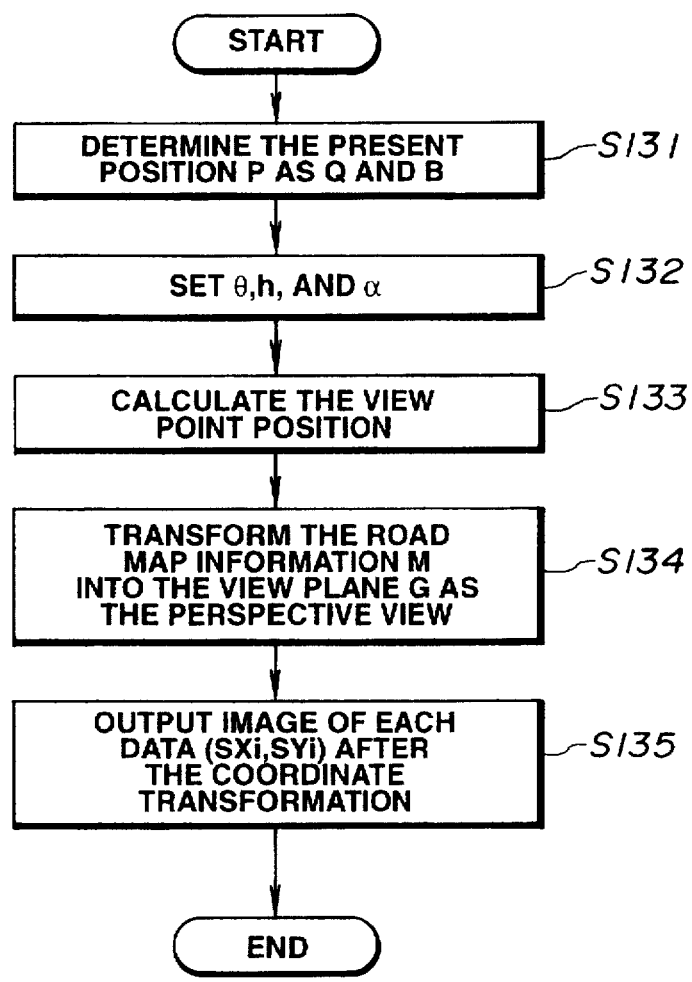
FIG. 4 is an operational flowchart of the comparative example of the vehicular navigating apparatus shown in FIG. 2.

FIG. 4 shows a processing flowchart executed by a computer constituting the bird's eye view display calculating block 118 in the comparative example.

Although both of a method in which the present position $P_0$ is set to be the view point position E and a method in which the present position $P_0$ is set as the view point position E are conceivable, the present position $P_0$ is, herein, set as the reference point Q of the perspective projection since the problem and disadvantage are the same. For explanation convenience, described below is the present position $P_0$ which serves as the reference point Q and this reference point Q has the same position as the referring point B.

Upon start of the routine shown in FIG. 4, at a step S131, both view point transformation key input block 112 and present position input block 111 set the present position $P_0$ as the reference point Q and the referring point B and, at a step S132, the angle of depression θ, the height of the view point h, and forwarding direction α are set, respectively.

Next, at a step 133, the view point position/direction of line of sight determining block 113 calculates the view point position from the following equation.

It is noted that the view point E ($X_0$, $Y_0$, $Z_0$) is determined as follows on the basis of the information on the referring point B ($X_b$, $Y_b$, $Z_b$).

$X_0 = x - h \times \cos \alpha(t)/\tan \theta$, $Y_0 = y - h \times \sin \alpha(t)/\tan \theta$, and $Z_0 = h$.

Next, at a step S134, the graphic data coordinate transformation block 114 carries out the perspective projection of the road map on the basis of the calculated view point position.

At the step S134, a relationship of the coordinate transformation between the point M ($M_x$, $M_y$, $M_z$) on the X-Y plane onto the view plane S ($S_x$, $S_y$) is expressed using the following equation: It is noted that, in the case of the flat plane, $M_z = 0$.

When $$\begin{pmatrix} Ex \\ Ey \\ Ez \\ 1 \end{pmatrix} = \begin{pmatrix} 1 & 0 & 0 & 0 \\ 0 & \sin\theta & \cos\theta & 0 \\ 0 & -\cos\theta & \sin\theta & 0 \\ 0 & 0 & 0 & 1 \end{pmatrix} \begin{pmatrix} \sin\alpha(t) & -\cos\alpha(t) & 0 & 0 \\ \cos\alpha(t) & \sin\alpha(t) & 0 & 0 \\ 0 & 0 & 1 & 0 \\ 0 & 0 & 0 & 1 \end{pmatrix}$$

$$\begin{pmatrix} 1 & 0 & 0 & -Xo \\ 0 & 1 & 0 & -Yo \\ 0 & 0 & 1 & -Zo \\ 0 & 0 & 0 & 1 \end{pmatrix} \begin{pmatrix} Mx \\ My \\ Mz \\ 1 \end{pmatrix}$$

$S_x = E_x \times V_d - E_z$,
$S_y = E_y \times V_d - E_z$, and
$S_z = 0$.

Next, at a step S135, the image data output block 115 outputs the image of the respective data ($SX_i$, $SY_i$) after the coordinate transformation of the road map to the image display block 116.

Thereafter, the processing of FIG. 4 is ended. That is to say, the road map information expressed with respect to the X-Y plane is perspectively projected on the view plane G.

In the comparative example, the value of direction of line of sight α is varied according to the present position information $P_0$ input by means of the keyboard or joy-stick lever installed on the key block 112 so that a variation in a direction of the line of sight is set to be the same as the direction of the forwarding direction at the present position $P_0$. For example, when the joy-stick lever is moved in an upward direction with respect to the screen, the present position is moved in the upward direction at its coordinate system so that the view point position E is accordingly moved toward the upward direction on the image screen in the perspective projection and the line of sight is set to this upward direction of the screen. Thereafter, when the joystick lever is moved in a right direction with respect to the display screen, the present position is accordingly moved toward the right direction of the screen in the perspective view and the right direction serves as the direction of the line of sight so that the line of sight is varied by 90 degrees.

When the above-described coordinate transformation is executed by means of the bird's eye view display calculating block 118, the moving perspectively projected image can be achieved.

However, since, in the comparative example described above, the direction of line of sight to display the bird's eye view of the road map is set as the direction of the line of sight through which the apparatus user, namely, the viewer views from the view point E, the user's view point is unavoidably set in the forwarding direction at the present position $P_0$.

Figure 7A:
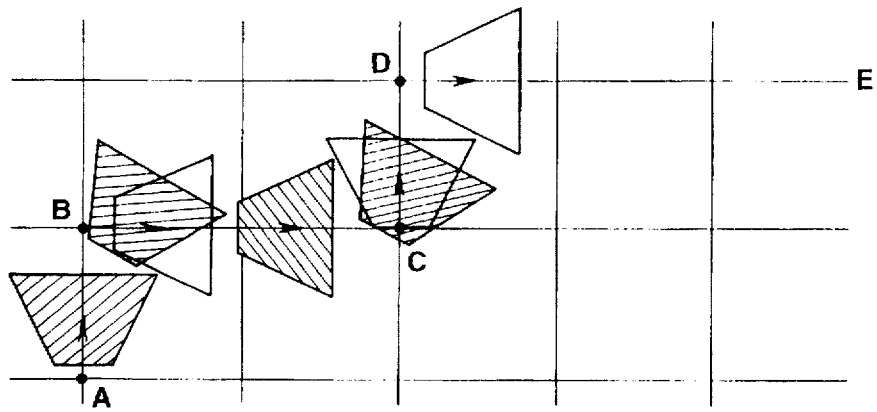
FIG. 7A and 7B are explanatory views for explaining variations in regions to be displayed in the first embodiment and the comparative example.

For example, when the vehicle in which the comparative example is mounted runs on such a route as A→B→C→D→E, namely, right-turn→left-turn→right-turn→left-turn (refer to the bird's eye view displayed region (no-hatched shapes of trapezoids) in the comparative example of FIG. 7A), a direction E (in FIG. 7A) through which the destination is desired to reach is the right direction of the image screen so that, when the vehicle is running through the intersections A and C (refer to FIG. 7A), a blind corner of the intersection E and a future passing road are frequently brought out (no clear passage is frequently brought out).

In addition, when the view point variation is made utilizing the keyboard or forwarding direction of the vehicle and the forwarding direction is largely varied, the viewable range of the road map information to be displayed becomes largely different due to the rotation of the direction of line of sight. Thus, a continuity in the past information on which route the vehicle has run is lost and it becomes difficult to understand, for example, where the vehicle is running, and/or where is the destination from the displayed road map.

Figure 7B:
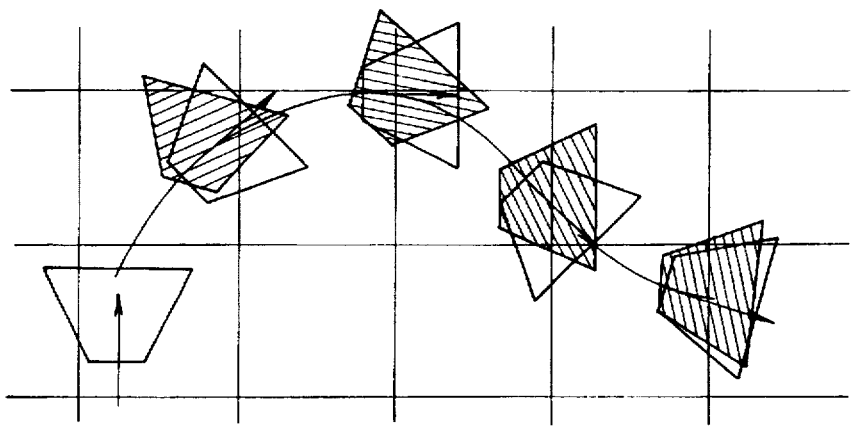

Furthermore, even when the vehicle runs on a mere letter-S shaped road (refer to a displayed region (no hatched trapezoid) of the bird's eye view in the comparative example of FIG. 7B), the line of sight is varied in the right and left directions so that the perspectively projected bird's eye view is not easy to be viewed since the direction of the line of sight is abruptly varied.

In the first embodiment, the displayed bird's eye view assures the continuity maintaining the running route (or traveled route) passed up to the present time without an abrupt change in the direction of line of sight.

In details, the navigating apparatus in the first embodiment detects the information on the forwarding direction at the present position or at the present place, previously sets the information of the forwarding direction and display information, determines the direction of line of sight on the basis of the detected forwarding information, furthermore, determines the view point position, carries out the coordinate transformation of the stored road map on the basis of the direction of line of sight and view point position to generate and display the bird's eye view. Thus, a smooth movement in displays with the smooth variation of direction of line of sight can be achieved.

Figure 5B:
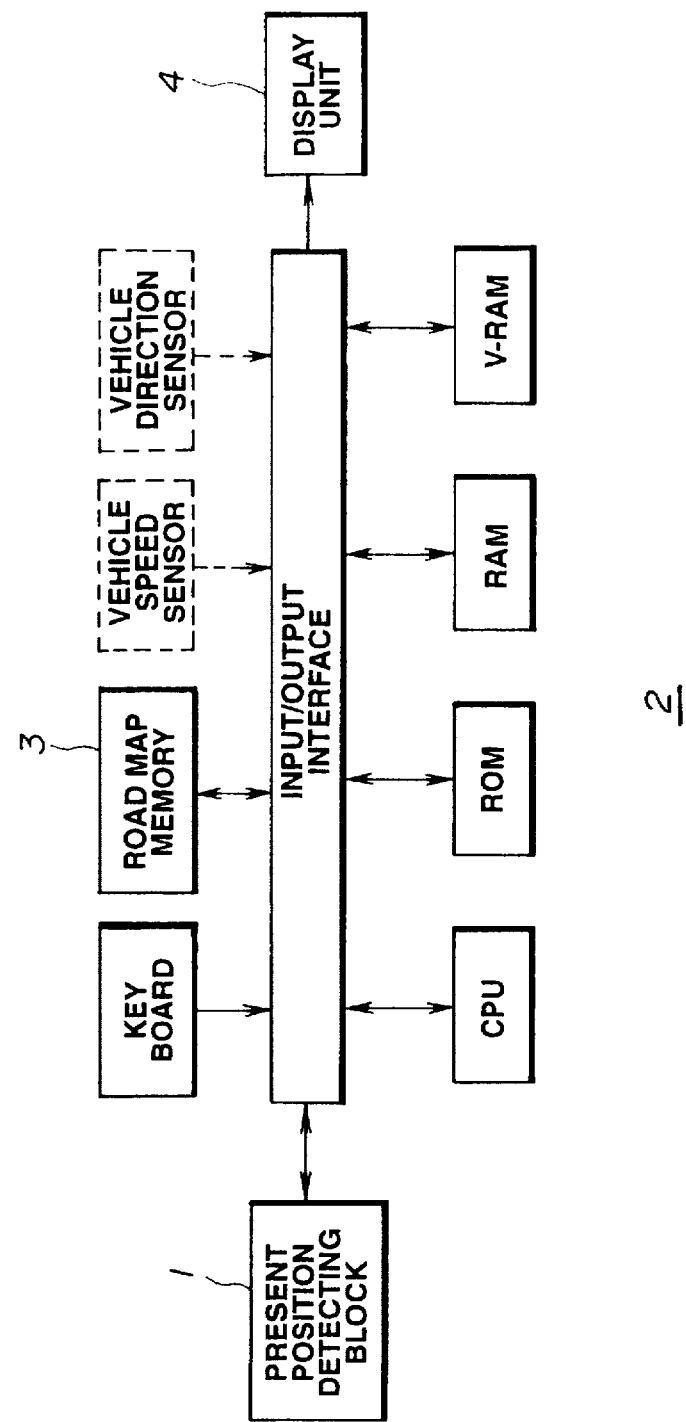
FIG. 5B is a hardware circuit block diagram of an example of the first embodiment shown in FIG. 5A.

FIG. 5A and 5B show the schematic functional and circuit block diagrams of the first embodiment of the navigating apparatus according to the present invention.

As shown in FIG. 5A, the navigating apparatus in the first embodiment includes: a present position detecting block 1 which is so constructed as to detect the present position $P_0$ ($X_0$, $Y_0$, $Z_0$) and the forwarding direction δ using a vehicle speed sensor, GPS (Global Positioning System), and geomagnetic (vehicle forwarding direction) sensor to derive the forwarding information on the present position or present point of place; a bird's eye view display calculating block 2 which is so constructed as to finally output the bird's eye view utilizing the computer system; road map data storage block 3 which is so constructed as to store a road map information with the X-Y plane (two-dimensional axes) as the reference; and an image display block 4 which is so constructed as to display the bird's eye view output from the bird's eye view display calculating block 2 using a highly precise (full-color) liquid crystal television (commercially available) or CRT (Cathode Ray Tube). As shown in FIG. 5B, the bird's eye display calculating block 2 is constituted by CPU, ROM, RAM, V-RAM (Video-Random Access Memory), and output/input interface. The road map memory 3 is generally constituted by such a road map memory as CD (Compact Disc)-ROM (or floppy disc).

Referring again to FIG. 5A, the bird's eye view display calculating block 2 functionally includes: an initial value setting block 5 which is so constructed as to calculate such initial conditions as the referring point B explained with reference to FIG. 3 and the present position $P_0$ ($X_0$, $Y_0$, $Z_0$) or the forwarding direction δ; a line of sight direction determining block 6 which is so constructed as to determine the direction of line of sight; a view point position determining block 7 which is so constructed as to determine the view point position; a coordinate transformation block 8 which is so constructed as to carry out the coordinate transformation of the road map data stored in the road map storage block 3 so as to generate the perspective view; and an image data output block 9 which is so constructed as to output the generated perspective view as the image data by the coordinate transformation block 8 to the image display block 4.

Next, an operation of the navigating apparatus in the first embodiment will be described below with reference to FIG. 3 for explanation convenience.

First, the present position detecting block 1 derives the present position information $P_0$ ($X_0$, $P_0$, $Z_0$), for example, from the vehicle mounted GPS. When the present position detecting block 1 derives the forwarding direction δ at the present place, an angle of a vector direction such as $$\delta = \arg(\text{argument})|P_p - P_0| \tag{1}$$

using an old (past) measured GPS positional information $P_p$ ($X_p$, $Y_p$, $Z_p$) before a constant time or before a constant distance and the present positional information $P_0$. It is of course that in place of the GPS, a generally known gyroscope or geomagnetic sensor to derive the direction of the vehicle may alternatively be used.

Figure 6:
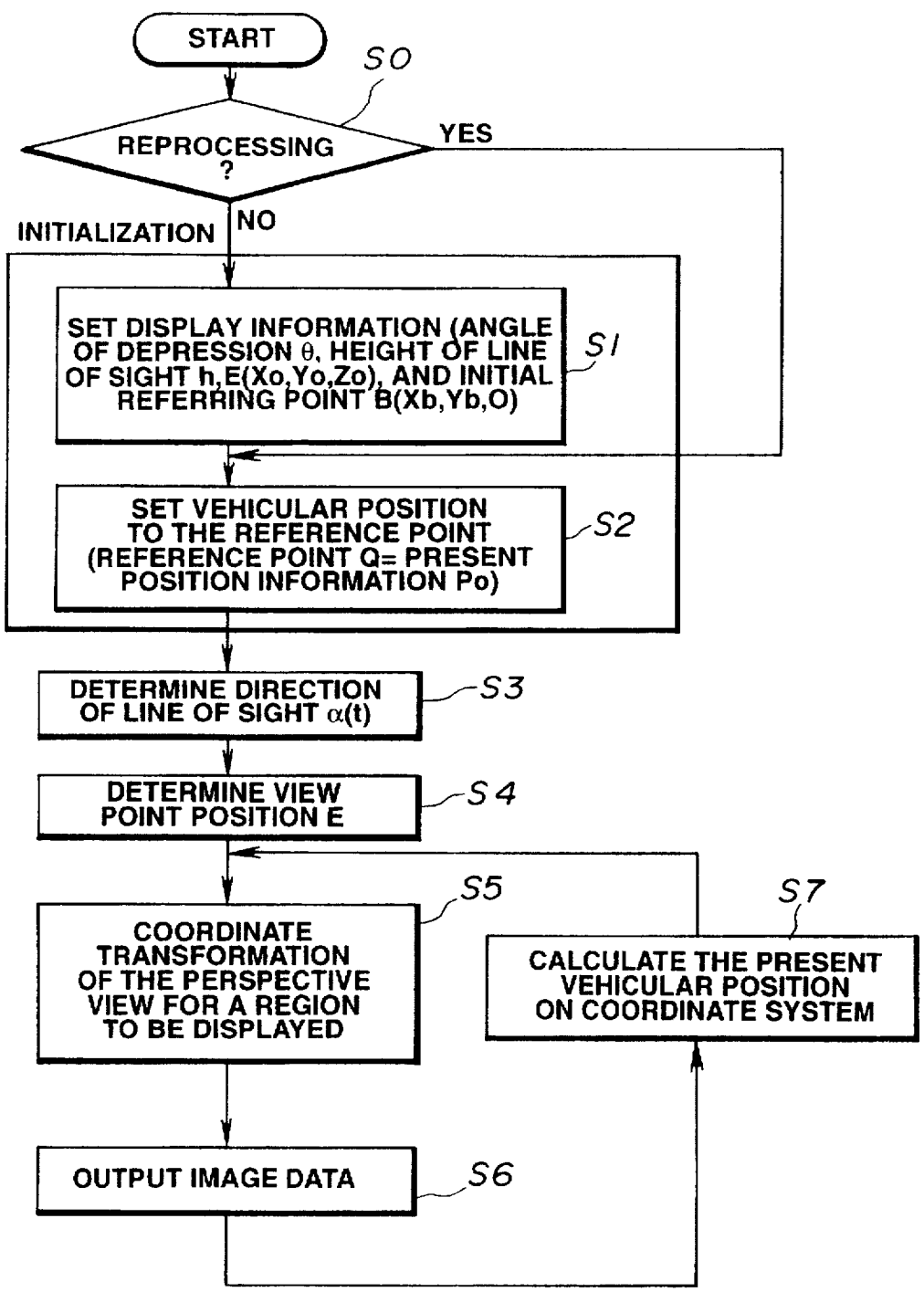
FIG. 6 is an operational flowchart of a processing operation in the first embodiment shown in FIGS. 5A and 5B.

FIG. 6 shows an operational flowchart executed by the bird's eye view display calculating block 2 in the first embodiment.

It is noted that the flowchart of FIG. 6 is executed for each predetermined period of time or for each predetermined interval of running distance and is executed by the CPU shown in FIG. 5B constituting the bird's eye view display calculating block 2.

At a step S0, the CPU determines whether this routine is the first time to process or a subsequent time to process (reprocessing routine). That is to say, the step S0 means that the CPU inquires itself whether this is the first time to execute this flowchart of FIG. 6.

Then, if the CPU determines that this is the first time to process the routine shown in FIG. 6 (NO at the step S0), the routine goes to a step S1 in which the initial value setting block 5, i.e., the CPU sets the series of bits of display information such as the angle of depression θ of the line of sight E, the height of the line of sight h, the coordinates of the view point position initial position E ($X_0$, $Y_0$, $Z_0$), and the coordinates of the initial referring point B ($X_b$, $Y_b$, 0) into corresponding registers.

At a step S2, the CPU reads the present position information $P_0$ derived by the present position detecting block 1 and sets the read information to be the reference point Q for the perspective projection as the information for the coordinate transformation to provide the perspective view.

It is noted that the series of operations at the steps S1 and S2 are an initialization and a distance from this reference point position Q to the referring point B is supposed to denote L.

If the CPU determines that this is not the first time to process (YES) at the step S0, the routine jumps from the step S0 to a step S3.

At the step S3, the CPU, i.e., the direction of line of sight determining block 6 determines the direction of line of sight $\alpha(t)$ on the basis of the forwarding direction $\delta$ at the present position according to the following equation:

$$\alpha(t)=w_i\times\delta+(1-w_i)\times\alpha(t-1) \quad (2),$$

wherein $0<w_i<1$ and wherein $\alpha(t-1)$ is a value of the direction of line of sight $\alpha(t)$ calculated before the predetermined period of time or before the predetermined interval of distance.

Furthermore, the CPU, i.e., the view point position determining block 7 determines the view point position E ($X_0$, $Y_0$, $Z_0$) on the basis of the following formulae:

$$x=X_p+L\cdot\cos\alpha(t),$$

$$y=Y_p+L\cdot\sin\alpha(t) \quad (3).$$

$X_p$ and $Y_p$ has been explained in the GPS with reference to the equation (1).

In more details, suppose that the referring point B denotes B (x, y, 0) on the X-Y plane. Since the present position information $P_0$ means the reference point Q on the perspective projection, the values of x and y are derived. Then, B (x, y, 0) can be derived using the following formulae from a relationship between B (x, y, 0) and the view point position E ($X_0$, $Y_0$, $Z_0$).

$$X_0=x-h\cdot\cos\alpha(t)/\tan\theta,$$

$$Y_0=y-h\cdot\sin\alpha(t)/\tan\theta,$$

$$Z_0=h \quad (4).$$

At a step S5, the coordinate transformation block 3, i.e., the CPU executes the coordinate transformation of the road map data stored in the road map storage block 3 into the bird's eye view according to the view point position E and direction of line of sight $\alpha(t)$.

The bird's eye view is derived by the CPU carrying out the following perspective projection transformation for the road map data stored in the road map data storage block 3. That is to say, suppose that a distance from the view point position E to the view plane G is $V_d$. The relationship of the coordinate transformation from a point M(x, y, z) on the X-Y plane (refer to FIG. 3) to the corresponding point S(x, y, z) on the view plane is expressed in the following matrix formulae:

When $$\begin{pmatrix} Ex \\ Ey \\ Ez \\ 1 \end{pmatrix} = \begin{pmatrix} 1 & 0 & 0 & 0 \\ 0 & \sin\theta & \cos\theta & 0 \\ 0 & -\cos\theta & \sin\theta & 0 \\ 0 & 0 & 0 & 1 \end{pmatrix} \begin{pmatrix} \sin\alpha(t) & -\cos\alpha(t) & 0 & 0 \\ \cos\alpha(t) & \sin\alpha(t) & 0 & 0 \\ 0 & 0 & 1 & 0 \\ 0 & 0 & 0 & 1 \end{pmatrix} \quad (5)$$

-continued $$\begin{pmatrix} 1 & 0 & 0 & -X_o \\ 0 & 1 & 0 & -Y_o \\ 0 & 0 & 1 & -Z_o \\ 0 & 0 & 0 & 1 \end{pmatrix} \begin{pmatrix} Mx \\ My \\ Mz \\ 1 \end{pmatrix}$$

$$S_x = E_x \cdot V_d / E_z,$$
$$S_y = E_y \cdot V_d / E_z,$$
$$S_z = 0.$$

Consequently, the road map data stored in the road map data storage block 3 and expressed with the X-Y plane as the reference is projected on the view plane G. Then, the image data are output to the image display block 4 at a step S6. At the step S6, the bird's eye view can be displayed on the liquid crystal display image screen of the image display block 4.

In order to display the bird's eye view which is moved in accordance with the running of the vehicle itself until the predetermined period of time has passed or until the predetermined interval of distance has run, the CPU reads the present vehicular position information (derived at the presently processing time) and carries out the coordinate transformation viewed from the present view point position E. When this step of the step S7 is repeatedly executed, the above-described display of the bird's eye view can be achieved. That is to say, this operation through the step S7 shown in FIG. 6 is the processing system such as to execute the display to vary the view point position in accordance with its movement of the vehicle only in the same coordinate system until the new execution of FIG. 6 is started whenever the predetermined period of time has passed or whenever the vehicle (mobile body) has run by the predetermined interval of distance. Thus, it is not necessary to calculate the coordinate transformations for all road map data in the storage block 3 and, thereby, a quantity of calculations can be reduced.

It is noted that, in the above-described processing routine, once the relationship of the present position to the view point position is calculated, a relative change quantity of the present position may be considered to the movement of the view point since the movement of the present position has the same phase as the movement of the view point. Consequently, a large number of times calculations needs to be carried out can be saved.

Hence, in the first embodiment, the direction of line of sight in the bird's eye view can smoothly be determined and varied utilizing the past information of the present position by means of the above-described processing routine shown in FIG. 6.

Namely, for example, referring to FIG. 7A, as shown by the no-hatched trapezoidal display region achieved in the case of comparative example, when the vehicle presently stands in front of each one of the intersections A, B, C, D, and E, the corresponding one of the intersections ahead of the vehicle is present and viewed in the upward direction from the vehicle position. However, when the vehicle has passed through the corresponding one of the intersections A, B, C, and D, the forwarding direction $\delta$ will be resulted in an instantaneous change in the vehicular forwarding direction in accordance with the direction of the road on which the vehicle is to be run. In addition, when the vehicle has turned on any road having a cornering angle of 90 degrees, the direction of field of view will be resulted in the instantaneous change of the field of view by 90 degrees.

Consequently, the continuity of the subsequently displayed images with those displayed up to the present time is lost in the case of the comparative example.

Furthermore, referring to FIG. 7B, when the vehicle runs on the letter-S shaped curved road, the direction of the line of sight at the letter-S shaped road is resulted in a continual (not continuous) change of the direction of line of sight toward right and left directions along the letter-S shaped road. Consequently, it becomes difficult for the viewer to understand the forwarding direction information.

On the other hand, since, in the first embodiment, the next direction of the line of sight is set on the basis of the past information of the line of sight, the direction of line of sight can smoothly be changed. For example, referring to FIG. 7A, when the vehicle has cornered through the road having the angle of 90 degrees, as shown by the hatched display regions, the change in the direction of the field of view by 90 degrees is not abrupt and the field of view becomes gradually coincident with the direction of the road. In addition, referring to FIG. 7A, as shown by the hatched display regions, even when the vehicle runs on the letter-S shaped road, the direction of the line of sight hardly changes and, thus, the clearly understandable road map information can be viewed since the direction of line of sight determining block 6 determines the direction of line of sight $\alpha(t)$ which is processed in a digital filter form using the equation (2).

(First Modification of the First Embodiment)

In the first embodiment, the direction of line of sight determining block 6 (the CPU) carries out the digital filtering form as the determination of $\alpha(t)$ in the equation (2). On the other hand, in a first modification of the first embodiment, the direction of line of sight $\alpha(t)$ is determined by a weight moving average of a plurality of positional data or forwarding direction data.

For example, suppose that the present value in the forwarding direction information is denoted by $\delta_0$, the calculated value $\delta_1$ before the predetermined period of time or before the predetermined interval of time is $\delta_1$, and the calculated value before an i-th number of times the predetermined period of time has passed or before the i-th number of times the predetermined interval of distance has passed is denoted by $\delta_i$. The direction of line of sight is determined from the following equation:

$$\alpha(t)=w_0\cdot\delta_0+w_1\cdot\delta_1+\cdots+w_i\cdot\delta_i, w_0+w_1+w_2+\cdots+w_i=1 \quad (6).$$

When the determination of the direction of line of sight is carried out at the step S3 using the equation of (6), the same advantage as the smoothing in the equation (2) in the first embodiment can be achieved.

(Second Modification of the First Embodiment)

In a second modification of the first embodiment, the determination of the direction of line of sight $\alpha(t)$ is alternatively carried out at the step S3 in place of the equation (2). That is to say, the positional information $P_r$ of one of the past positions which is remote from the present position by a distance R taken along the road through which the vehicle has passed is derived and the direction of line of sight $\alpha(t)$ is derived with a direction through which the present position $P_0$ is viewed from the point of the position $P_r$ supposed to be an angle $\beta_p$ through which the present position is viewed.

In more details, the direction of line of sight is determined in the second modification according to the following equation (7).

$$\alpha(t)=\beta_p=\arg|P_r-P_0| \quad (7).$$

Thus, when a magnitude of $|P_r-P_0|$ is enlarged, the variation (change) in the value of direction of line of sight $\alpha(t)$ becomes accordingly minor so that the same advantage of the smoothing operations in the first embodiment and the first modification thereof can be achieved in the second modification thereof.

Furthermore, in order to make a more smoother variation in the direction of line of sight, the angle of $\beta(\beta_p)$ may, at first, be derived and the digital filtering may be executed according to any one of the equations (2), (3), or (6) in which the value of angle of $\beta(\beta_p)$ is inserted in place of $\delta(\delta_i)$.

It is noted that the information on one of the positions which corresponds to the position which is remote from the present position by the distance R and through which the vehicle (or viewer) has passed may be a point of intersection between a circle having a radius of R from a center of the circle, i.e., the present position and one of the roads through which the vehicle (viewer) has passed or may alternatively be the positional information of any one of the intersections near to a range of the point of intersection.

(Second Embodiment)

In a second preferred embodiment of the navigating apparatus according to the present invention, a recommended route data to reach to the desired destination is input to the bird's eye view display calculating block 2.

Figure 8:
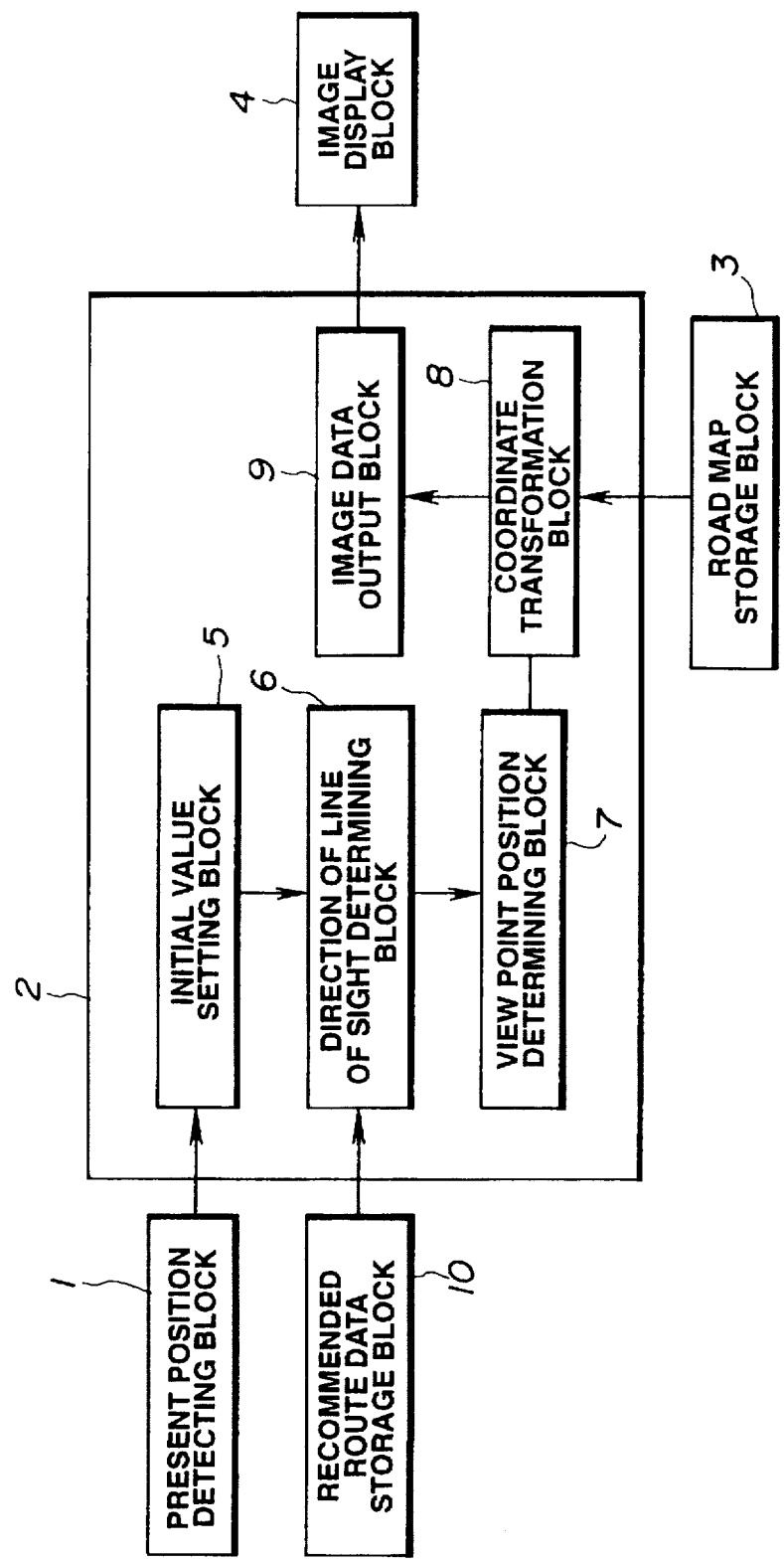
FIG. 8 is a functional block diagram of a second preferred embodiment of the navigating apparatus according to the present invention.

FIG. 8 shows a functional block diagram of the second embodiment of the navigating apparatus applicable to the vehicle guidance system.

As described above, a recommended route data storage block 10 is added and is connected to the bird's eye view display calculating block 2 whose structure is generally the same as that shown in FIG. 5A and FIG. 5B of the first embodiment.

The recommended route data serves as the input information of the bird's eye view display calculating block 2.

The direction of line of sight determining block 6 determines the direction of line of sight $\alpha(t)$ with the input recommended route data from the recommended route data storage block 10 and the present position information $P_0$ taken into consideration.

In operation, the present position determining block 1 derives the present position information $P_0$ ($X_0$, $Y_0$, $Z_0$) from, for example, the GPS (Global Positioning System) which is mounted in the vehicle. The forwarding direction $\delta$ at the present place (present position) is derived according to the vector's direction angle $\delta$ using the derived present position information $P_0$ and the past measured position information $P_p$ ($X_p$, $Y_p$, $Z_p$), namely, $$\delta=\arg|P_p-P_0| \quad (8).$$

The equation (8) is the same as the equation (1).

Figure 9:
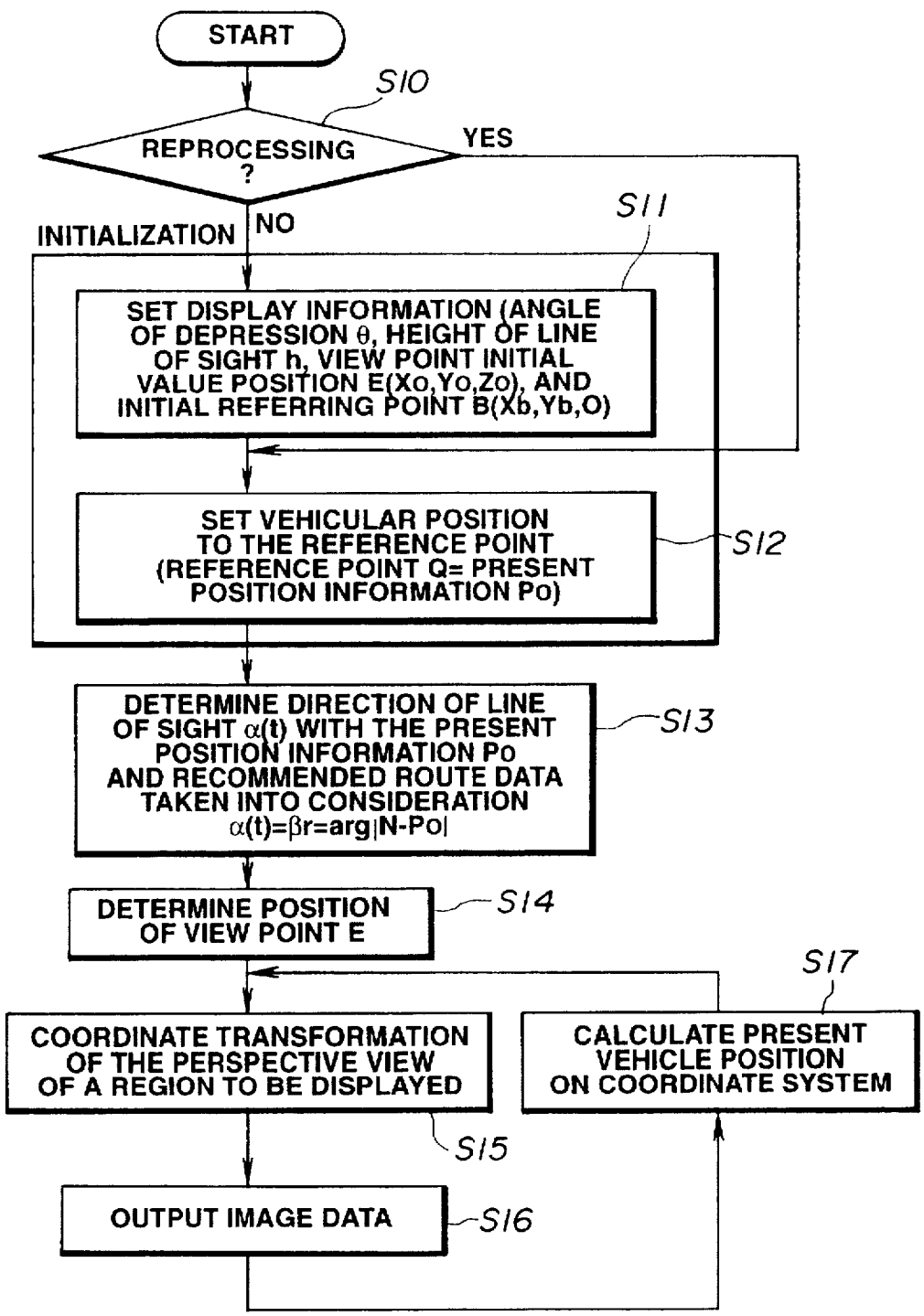
FIG. 9 is an operational flowchart of the second embodiment shown in FIG. 8.

FIG. 9 shows an operational flowchart executed in the second embodiment.

Since the contents of steps shown in FIG. 8 from a step S10 through a step S17 are generally the same as the steps S0 through S7 shown in FIG. 6 and described in the first embodiment, steps S13 and S14 will be explained herein.

At the step S13, the CPU (direction of line of sight determining block 6 shown in FIG. 8) determines the direction of line of sight with the present position $P_0$ derived from the present position detecting block 1 and the recommended route data fetched from the recommended route data storage block 10 taken into consideration, derives a recommended position N ($X_n$, $Y_n$, $Z_n$) which corresponds to a position of a point on the recommended route which is remote from the present position $P_0$ by the distance R taken along a road through which the vehicle (viewer) has passed, and supposes that a direction toward which the recommended route position N is viewed from the present place (present position) is an angle of $\beta_r$. It is noted that the information on the point of the recommended route which is remote from the present position by the distance R may be the point of intersection between the circle having the radius R and having the center, i.e., the present position and the recommended route or may alternatively be the position information of any one of the traffic intersections near to the range of the point of intersection.

At the step S13 in the second embodiment, the direction of line of sight $\alpha(t)$ is derived from the following equation (9).

$$\alpha(t) = \beta_r = \arg|N - P_0| \tag{9}$$

Thus, when the magnitude of $|N-P_0|$ is made large, the variation in the value of $\alpha(t)$ accordingly becomes minor.

At the next step S14, the CPU (view point position determining block 7) defines the view point position E ($X_0$, $Y_0$, $Z_0$) on the basis of the numerical equations (3) and (4) described above.

The equations (3) and (4) are described again as follows:

$$x = X_p + L \cdot \cos \alpha(t),$$

$$y = Y_p + L \cdot \sin \alpha(t) \tag{10}$$

$$X_0 = x - h \cdot \cos \alpha(t)/\tan \theta,$$

$$Y_0 = y - h \cdot \sin \alpha(t)/\tan \theta,$$

$$Z_0 = h \tag{11}$$

In the equation (10), L denotes the distance from the reference point Q position for the perspective projection and the referring point B shown in FIG. 3.

The contents of the subsequent steps S15 to the step S17 are the same as those of the steps S5 to S7 described in the first embodiment.

Thus, the information on the recommended route can be assured and can be viewed from the image screen of the image display block 4 shown in FIG. 8 so that it becomes easy to predict a future route of travel toward the destination and the direction of field of view can smoothly be varied (changed).

The advantage in the second embodiment is the same as that in the case of the first embodiment described with reference to FIGS. 7A and 7B.

Therefore, the advantage in the second embodiment is omitted herein.

However, in addition, for the perspectively viewing characteristic of the second embodiment, since the direction of line of sight is always determined with the recommended route of travel taken into consideration when the vehicle runs on the road having a plurality of corners (such the road shown in FIG. 7A that the vehicle needs to repeat the left and right turns), a good perspectively viewing characteristic can be provided.

Next, a best example of the second embodiment will be described with reference to FIG. 13A. In the best example, all recommended routes from the present position $P_0$ to the recommended point position N can always be displayed when the recommended position N which corresponds to the recommended route position, the recommended route position being remote from the present position by the distance R, is derived from the viewpoint of the perspectively viewing characteristic of the recommended route.

First, such a worst case that the direction of line of sight is always present in-between the forwarding direction of the vehicle and the direction to the reference point, if the recommended route point is placed on the reference point, occurs when the direction of line of sight is set as the direction to the reference point.

Figure 12A:
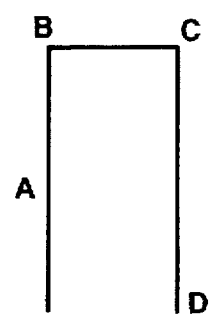
FIGS. 12A, 12B, 12C, 12D, 12E are explanatory views for explaining a change in displays of bird's eye views in the case of the above-described comparative example and in the case of the third embodiment, respectively.
Figure 13A:
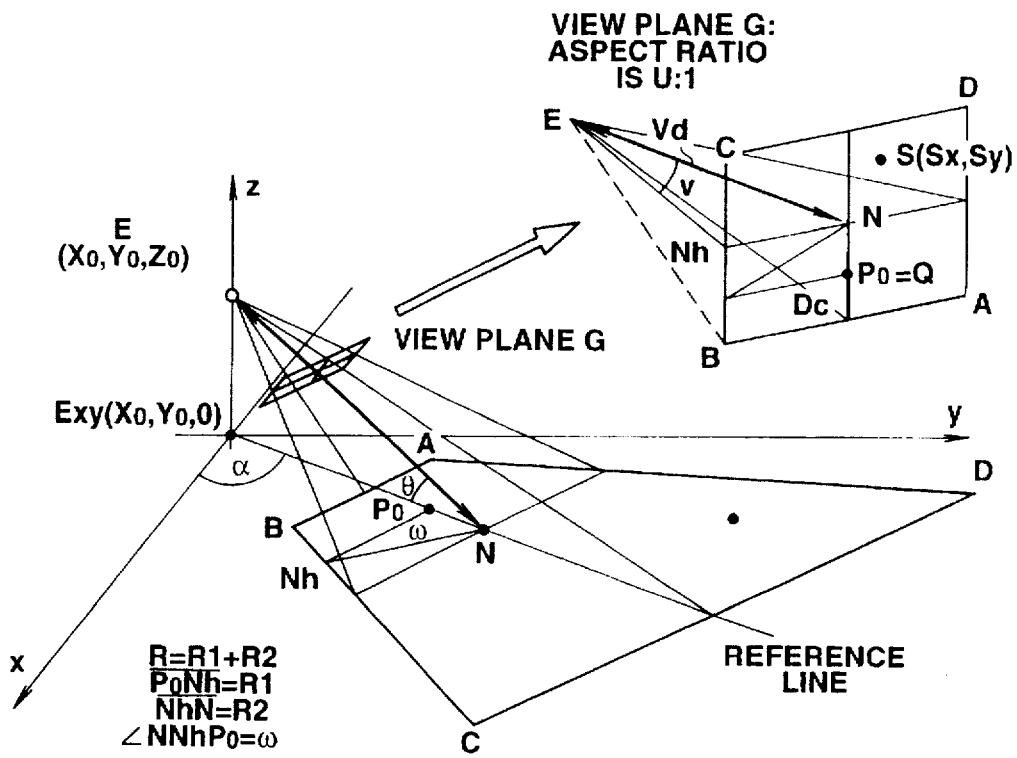
FIGS. 13A and 13B are explanatory views for explaining states of the bird's eye views to be displayed in the case of any two of the first, second, third, fourth, fifth, sixth, and seventh preferred embodiments of the navigating apparatus according to the present invention, respectively.

Suppose that the present position on the reference point is denoted by $P_0$, the recommended route point is denoted by N, an aspect ratio of the display screen is $\mu:1$, a tangent of a lateral (width) direction angle of field of view on the display screen is defined as $F=\tan v$, an angle crossing straight distances R1 and R2 (R1 denotes the straight distance from $P_0$ to Nh and R2 denotes the straight distance from Nh to N, Nh is a point located on a right end of the view plane G from the point N as viewed from the view point position E shown in FIG. 13A) is denoted by $\omega$, a sum of R1 and R2 is denoted by R, and the recommended route position which makes R1+R2 equal to R is denoted by N (refer to FIG. 12A).

Then, $R=R1+R2 \leq (1+\sec\omega)R1$ and R1 is derived as follows:

$$R1 = F/\sqrt{(1+\tan^2\theta)} \times \{(h \cdot (1+\tan^2\theta))/(\tan\theta + u \cdot F) + D_c\}. \tag{12}$$

In the equation (12), $D_c$ (refer to the view plane G of FIG. 13A) denotes the straight distance from the referring point, i.e., the reference point $P_0$ (=Q) to a vertically lowest point of a lowest side of the screen.

Suppose herein that a tightest corner (traffic intersection) has an angle of 45°.

At this time, in the above-described example wherein $\theta=18°$, h=390 m, u=0.75, F=tan 20°, $D_c$=300 m, and $\omega=45°$, $$R \leq (R1+R2) = 853 \text{ m} \tag{13}$$

Consequently, the navigating apparatus in the second embodiment can determine the smoothed variation in direction of line of sight utilizing the recommended route information toward the destination and can positively provide the view of the recommended route of travel, i.e., the information that the viewer is desired to forward.

In addition, since the present position is placed on the reference line shown in FIG. 13A, the present position or the position at which the vehicle is present is always displayed at a fixed location on the screen so that the road map which is easy to be viewed can be achieved.

(First Modification of the Second Embodiment)

In a first modification of the second embodiment, at the step S13 in which the direction of line of sight $\alpha(t)$ expressed in the equation (9) is determined, a more smoother variation of the direction of line of sight $\alpha(t)$ can be achieved.

That is to say, the angle $\beta_r$ is expressed as $\delta$ in the following equation.

$$\delta = \beta_r = \arg|N - P_0|,$$

$$\alpha(t) = w \cdot_r + (1-w) \cdot \alpha(t-1), \text{ wherein } 0 < w < 1 \tag{14}$$

Consequently, due to the above-expressed filtering effect, the bird's eye view of the road map in which the variation of the direction of field of view can hardly be found can be achieved even if the vehicle is to run on the curves as shown in FIG. 7B.

(Second Modification of the Second Embodiment)

In a second modification of the second embodiment, at the step S13 described in the second embodiment, the direction of line of sight $\alpha(t)$ can be determined by means of the weight moving average method using the series of positional information on the recommended route (N1, N2, N3, - - -, Ni) and the present positional information $P_0$.

This alternative processing of the step S13 may be carried out in the digital filter form.

$$\alpha(t)=w1\cdot\arg|N1-P_0|+w2\cdot\arg|N2-P_0|+\cdots w_i\cdot\arg|N_i-P_0| \quad (15).$$

(Third Modification of the Second Embodiment)

In a third modification of the second embodiment, at the step S13, the direction of line of sight is determined using the plurality of recommended route positional data (N1, N2, N3, - - -, Ni) and/or the past passed positional data (L1, L2, L3, - - -, Li) by means of the weight moving averaging technique as follows:

$$\alpha(t) = w1 \cdot \arg|N1 - P_0| + w2 \cdot \arg|N2 - P_0| + \quad (16)$$
$$\cdots w_i \cdot \arg|N_i - P_0| + u \cdot \delta + v1 \cdot \arg|P_0 - L1| +$$
$$v1 \cdot \arg|P_0 - L1| + v2 \cdot \arg|P_0 - L2| + \cdots +$$
$$v_j \cdot \arg|P_0 - Lj|, w1 + w2 + \cdots u + v1 + v2 + \cdots vj = 1,$$

wherein the past present position information is denoted by L1, the past present positional information is denoted by L2 which has been calculated before the predetermined period of time, and Lj (j=i−1) denoted the past positional value which has been calculated before the j-th number of times the predetermined time has passed or before vehicle has run the j-th number of times by the predetermined interval of distance.

Thus, in the third modification of the second embodiment, the more smoother variation in the direction of line of sight can be achieved in the same way as the case of the second modification as compared with the second embodiment.

Then, since the importance is placed on the past information when the vehicle (viewer) runs in the form of the left or right turn, the displayed image can smoothly be changed.

(Third Embodiment)

A third preferred embodiment has the same apparatus functional block diagram as in the case of the second embodiment shown in FIG. 8.

Figure 10:
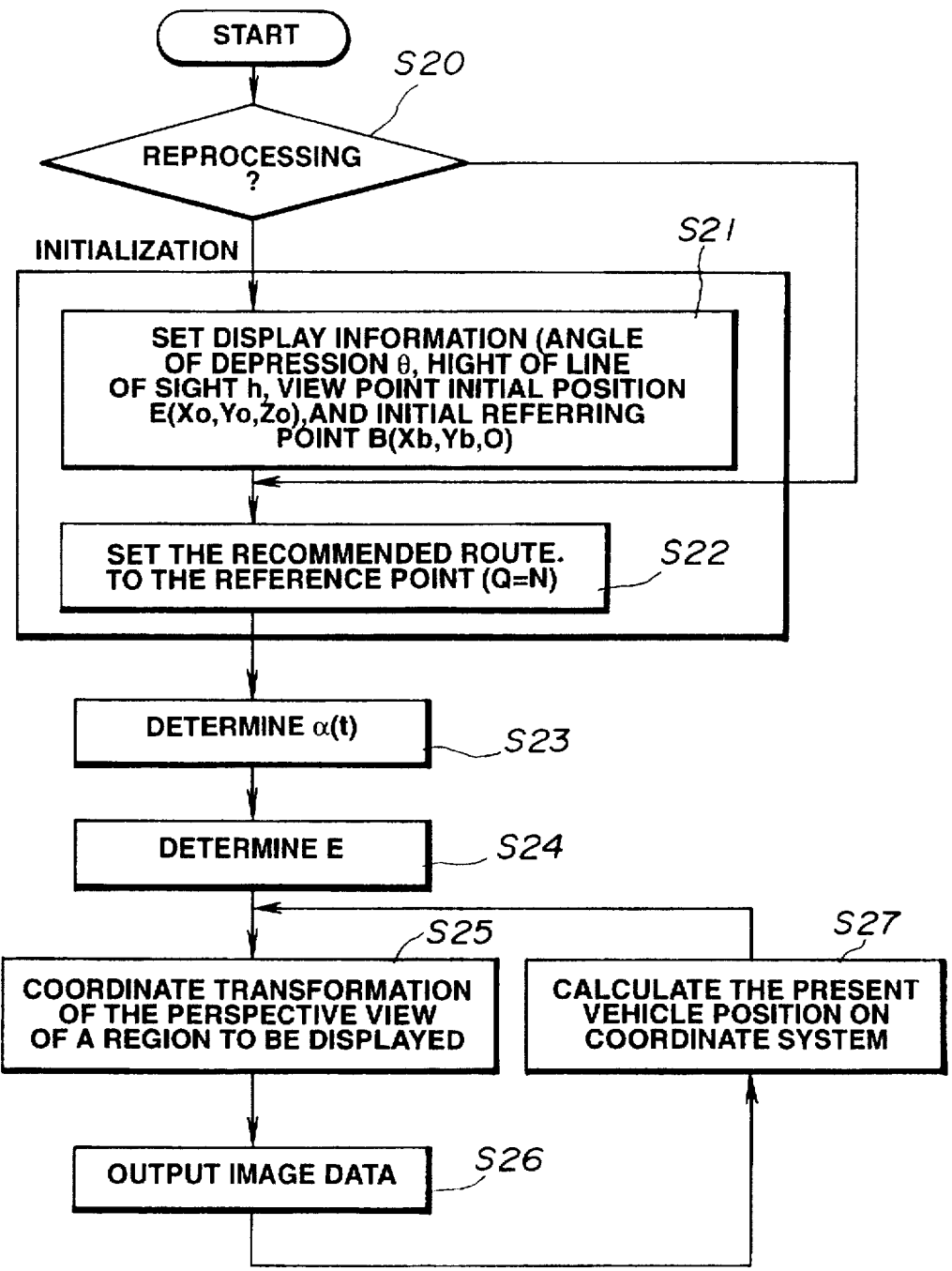
FIG. 10 is an operational flowchart of a third preferred embodiment of the navigating apparatus according to the present invention.

FIG. 10 shows an operational flowchart executed in the bird's eye view display calculating block 2 in the third embodiment.

As shown in FIG. 10, the contents of steps S20 through S27 are generally the same as those of the steps S10 through S17 shown in FIG. 9 (or those of the steps S0 through S7 shown in FIG. 6) provided that the content of a step S22 is different from neither the step S12 nor step S2, the content of a step S23 is different from neither the step S13 nor the step S3, and the content of a step S24 is different from neither the step S14 nor the step S4.

That is to say, at the step S22, the position of the vehicle in which the third embodiment of the navigating apparatus is mounted is set so that the recommended route point N derived from the present position detecting block 1 as the information to make the perspective view transformation provides the reference point Q for the perspective projection. In addition, the distance from the reference point position Q to the referring point position B is denoted by L.

At the step S23, the CPU (the direction of line of sight determining block 6) determines the direction of line of sight α(t) using the forwarding direction δ at the present position $P_0$ derived from the present position detecting block 1 and using the previously measured present position $P_p$.

That is to say, $$\alpha(t)=\delta=\arg|N-P_p| \quad (17).$$

At the step S24, the CPU (the view point position determining block 7) defines the view point position E ($X_0$, $Y_0$, $Z_0$) on the basis of the following equations:

That is to say, suppose that the referring point B is denoted by B (x, y, 0) placed on the X-Y plane. Then, the recommended route point position N ($X_n$, $Y_n$, 0) is the reference point Q for the perspective projection.

$$x=X_n+L\cdot\cos\alpha(t),$$
$$y=Y_n+L\cdot\sin\alpha(t) \quad (18).$$
$$X_0=x-h\cdot\cos\alpha(t)/\tan\theta,$$
$$Y_0=y-h\cdot\sin\alpha(t)/\tan\theta,$$
$$Z_0=h \quad (19).$$

The subsequent steps S25 through S27 are the same as the steps S15 through S17 shown in FIG. 9.

Hence, when the processing route shown in FIG. 10 is repeated for each predetermined period of time or for each predetermined interval of distance, the image screen center position provides the recommended route point through which the vehicle is desired to reach to the destination. Then, the vehicle position is varied on a lower part of the image screen according to the relationship of the vehicle position and the recommended route point as if the vehicle forwarding direction were varied as a pendulum so that the recommended route to be desired to pass can accurately be achieved and it becomes easier for the viewer to predict the road on which the vehicle is to run.

This advantage in the third embodiment will be described in details with reference to FIGS. 11A and 11B.

Figure 11A:
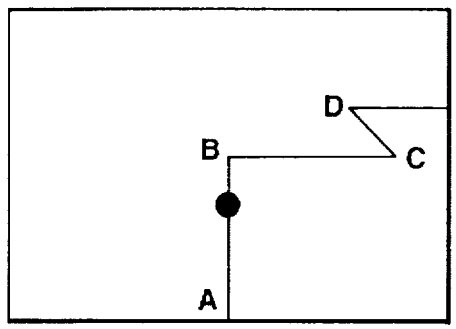
FIGS. 11A and 11B are explanatory views for explaining the bird's eye views in the case of the above-described comparative example and in the case of the third embodiment, respectively.

Since, in the case of FIG. 11A which corresponds to the comparative example, the forwarding direction is viewed from the vehicular position denoted by a black point, the route of travel toward the destination present on a right side of the screen cannot sufficiently be viewed.

Figure 11B:
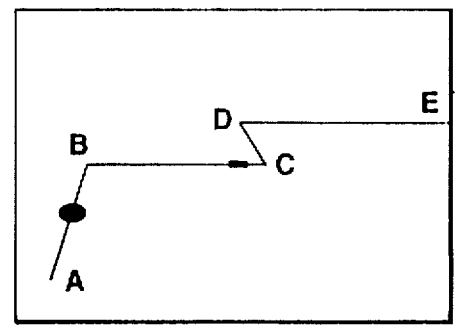

On the other hand, since, in the case of FIG. 11B in which the navigating apparatus in the third embodiment is used, the vehicular position is displayed on a right lower side with respect to the recommended route point positioned at the center of the screen so that the navigating apparatus in the third embodiment can provide the video image having a more preferable perspectively viewing characteristic toward the destination. Especially, even if any of the routes in the recommended route through which the vehicle needs to pass and which have a letter-U turning road segment or have a road segment needed to advance in an opposite direction to the vehicle position, the direction toward the destination can well be recognized from the bird's eye view achieved in the third embodiment.

Furthermore, suppose that the vehicle to which the third embodiment of the navigating apparatus is mounted would need to run on such a recommended route as shown in FIG. 12A.

Figure 12B:
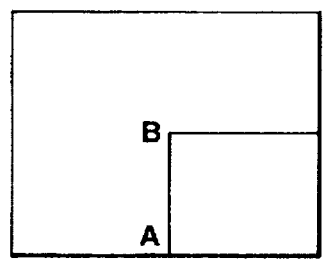
Figure 12D:
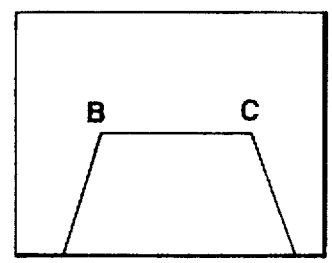
Figure 12C:
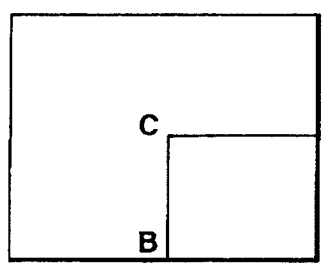
Figure 12E:
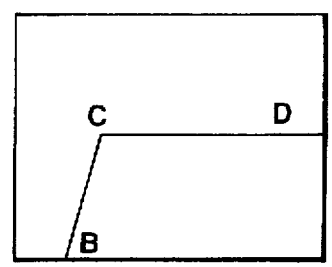

In the case of the third embodiment, at a point of A in FIG. 12A, the bird's eye view shown in FIG. 12D can be displayed and, at a point B shown in FIG. 12A, that shown in FIG. 12E can be displayed.

However, in the displayed case of FIG. 11A, the bird's eye views are displayed as shown in FIGS. 12B and 12C since the recommended route point is not placed on the reference point for the perspective projection, respectively, as against the corresponding cases of FIG. 12D and FIG. 12E.

Hence, a sufficiently satisfied perspectively viewing characteristic can be achieved.

(Fourth Embodiment)

In the third embodiment, the recommended route point is placed on the reference line.

In a fourth embodiment of the navigating apparatus according to the present invention, the following equations are used to determine the direction of line of sight α(t) at the step S23 described in the third embodiment further using the direction information of the vehicle:

$$\delta = \arg|N - N_p|,$$

$$\alpha(t) = w \cdot \delta + (1-w) \cdot \alpha(t-1),$$

wherein $$0 < w < 1 \quad (20).$$

It is noted that although the calculation of the value of α(t) is expressed in the digital filter form, the value of α(t) may alternatively be determined using the weight mean (averaging) and the past forwarding direction of the vehicle. The advantage in the fourth embodiment is generally the same as described in the third embodiment.

(Fifth Embodiment)

In a fifth preferred embodiment of the navigating apparatus, in order to minimize the variation in the value of α(t) at the step S23 of the third embodiment, a method of viewing the recommended route point N from the present position of the vehicle $P_0$ is utilized to determine α(t).

An angle through which the recommended route point N is viewed from the present position $P_0$ is denoted by $\beta_r$.

The value of α(t) is determined from the following equation:

$$\alpha(t) = \beta_r = \arg|N - P_0| \quad (21).$$

When the value of $\arg|N - P_0|$ is made large, the variation in the α(t) becomes minor.

In order to achieve a further smoother variation in α(t), the angle $\beta_r$ is set as δ and the value of α(t) is determined as follows:

$$\delta = \arg|N - P_0|,$$

$$\alpha(t) = w \cdot \delta + (1-w) \cdot \alpha(t-1),$$

wherein $$0 < w < 1 \quad (22)$$

Consequently, the variation in the value of α(t) can become smoother.

In the latter case, i.e., if the equation (22) is used, the displayed image when the vehicle turns left and right becomes smoothly changed since the importance is placed on the past information.

(Sixth Embodiment)

In a sixth preferred embodiment of the navigating apparatus according to the present invention, the value of α(t) is determined at the step S23 described in the third embodiment using the weight moving averaging equation as defined in the equation (16) from the plurality of recommended route point data including the recommended route which serves as the reference point Q and/or the past position data (L1, L2, L3, - - - , Lj).

(Seventh Embodiment)

In a seventh preferred embodiment of the navigating apparatus according to the present invention, in the same way as described in the example of the second embodiment with reference to FIG. 13A, all recommended routes extending from the present position $P_0$ to the recommended position N can always be displayed on the bird's eye view when deriving the recommended position N which is remote from the present position by the distance R.

Figure 13B:
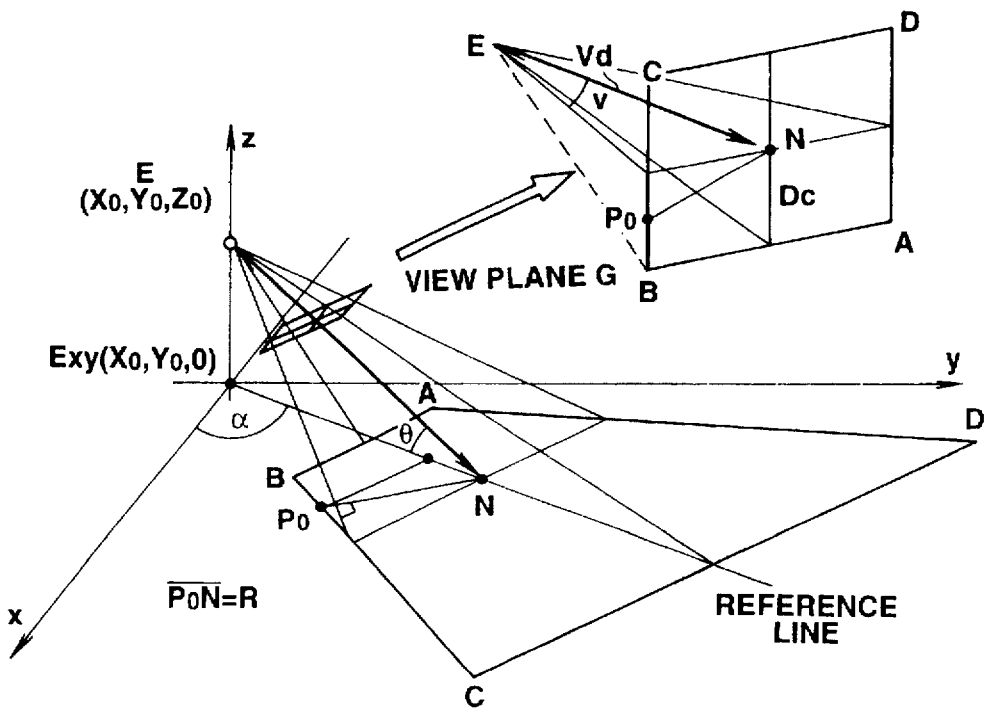

As shown in FIG. 13B, suppose such a requirement that the recommended position N is to be displayed at a position which is remote from a lower end of the screen (view plane G shown in FIG. 13B) by the straight distance Dc. Under this requirement, deriving the straight distance R from the vehicular present position $P_0$ to the recommended route position N gives a most strict requirement (refer to the following equation (23)).

Furthermore, such a requirement that the vehicle is not hidden below the lower end of the view plane G under the equation (23), namely, R<Dc is added to derive the equation (24).

$$R = F/\sqrt{(1+F^2+\tan^2\theta)} \times \{h \cdot (1+\tan^2\theta)/(\tan\theta + u \cdot F) + Dc\}. \quad (23)$$

$$Dc > F/\{\sqrt{(1+F^2+\tan^2\theta)} - F\} \cdot \{h \cdot (1+\tan^2\theta)/(\tan\theta + u \cdot F)\}. \quad (24)$$

When the above-described equations are executed to determine the direction of line of sight α(t), the recommended routes can be assured and can always be displayed in the bird's eye view.

(Eighth Embodiment)

Figure 14:
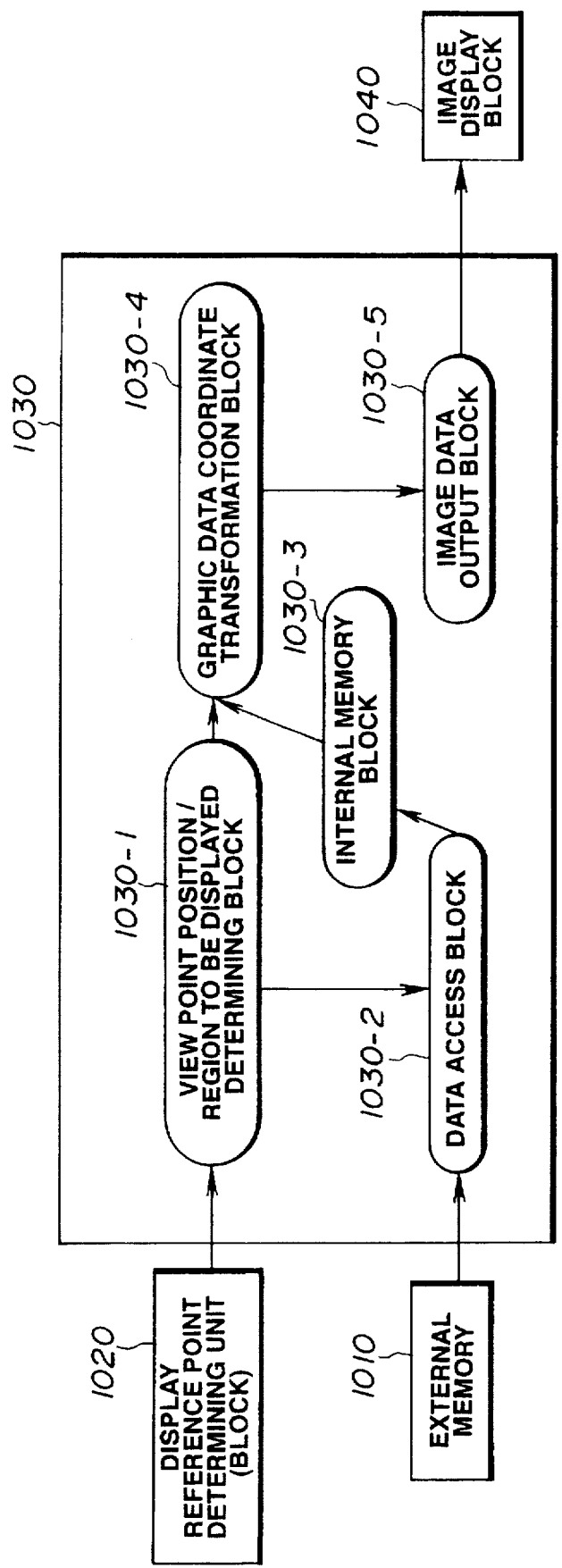
FIG. 14 is a functional block diagram of an eighth preferred embodiment of the navigating apparatus according to the present invention.

FIG. 14 shows a functional block diagram of an eighth preferred embodiment of the navigating apparatus according to the present invention.

The navigating apparatus includes: an external memory 1010, for example, the CD-ROM, which is so constructed as to store a map information; a display reference point determining unit 1020 which is so constructed as to determine a display reference point on the road map (the display reference point is described below); an arithmetic/logic operation unit 1030 which is so constructed as to execute various arithmetic operations (calculation processing) on the basis of the input information from the external memory 1010 and from display reference point determining unit (block) 1020; and an image display block 1040 which is so constructed as to display the road map information as a result of the calculation processing by the arithmetic/logic operation unit 1030.

The arithmetic/logic operation unit 1030 includes: a view point position/region to be displayed determining block 1030-1 which is so constructed as to determine the view point position and determine the region of the road map to be displayed; a data access block 1030-2 which is so constructed as to perform a data access to the external memory 1010; an internal memory block 1030-3, for example, the ROM and RAM, which is so constructed as to store an input information via the data access block 1030-2; a graphic data coordinate transformation block 1030-4 which is so constructed as to perform a coordinate transformation of the graphic data on the basis of the input information from the view point position/region to be displayed determining block 1030-1 and the internal memory 1030-3; and an image data output block 1030-5 which is so constructed as to output the graphic data which is coordinate transformed by means of the graphic data coordinate transformation block 1030-4 to the image display block 1040.

The display reference point is the reference point to determine the region to be displayed such as the vehicular position since the region on the road map to be displayed is limited to a constant range, for example, with the present position of the vehicle as a center of the range.

Figure 15:
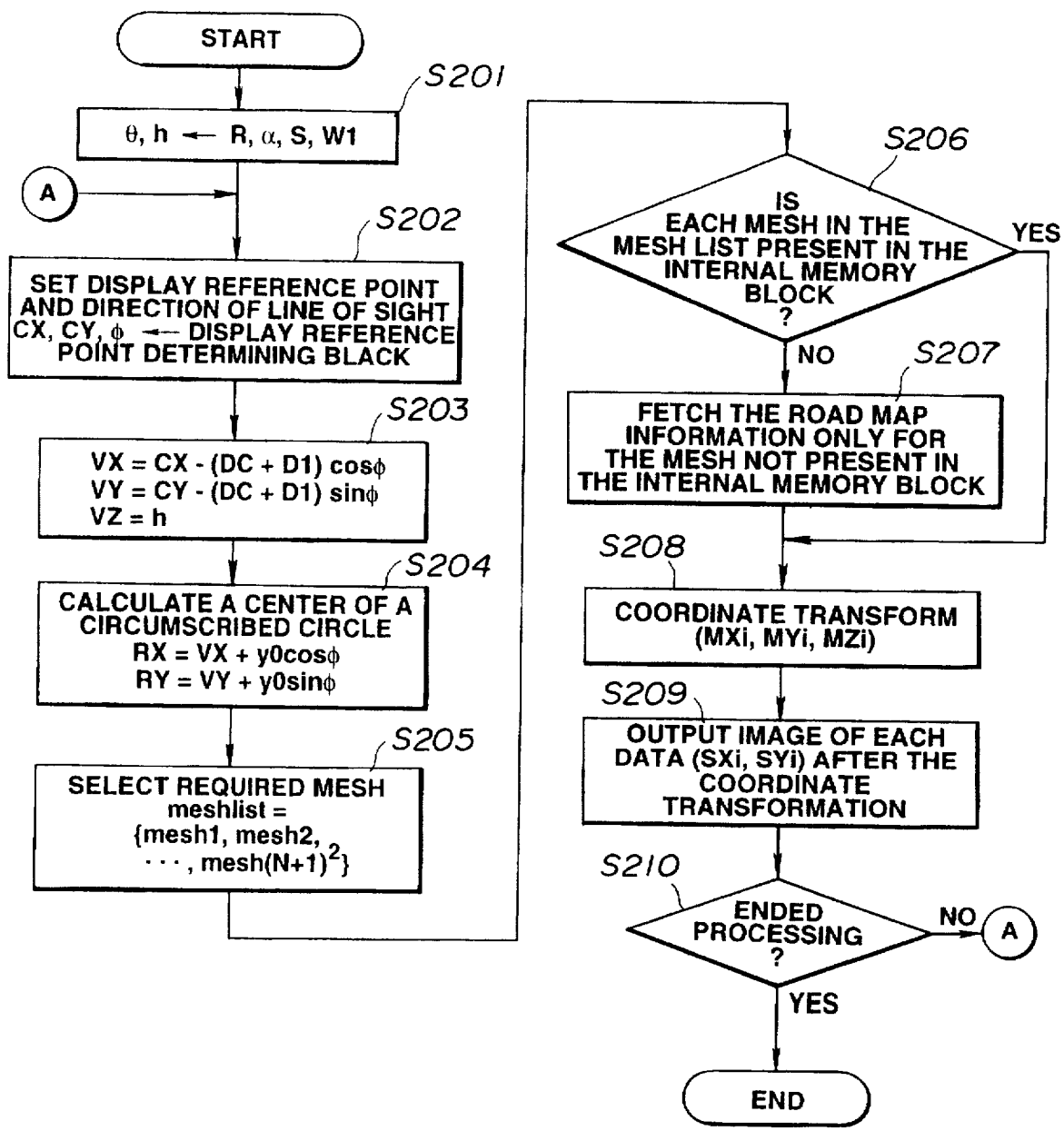
FIG. 15 is an operational flowchart of the eighth embodiment shown in FIG. 14.

FIG. 15 shows an operational flowchart processed by the navigating apparatus in the eighth embodiment.

First, at a step S201, the view point position/region to be displayed determining unit 1030-1 determines an angle of depression θ and a height h of the view point according to given display parameters (which will be described below). Numerical values for these parameters need to satisfy a condition required to simplify a mesh selection procedure stored in the external memory 1010. The required condition and a method of calculation on the basis of the required condition will be described below.

Figure 19:
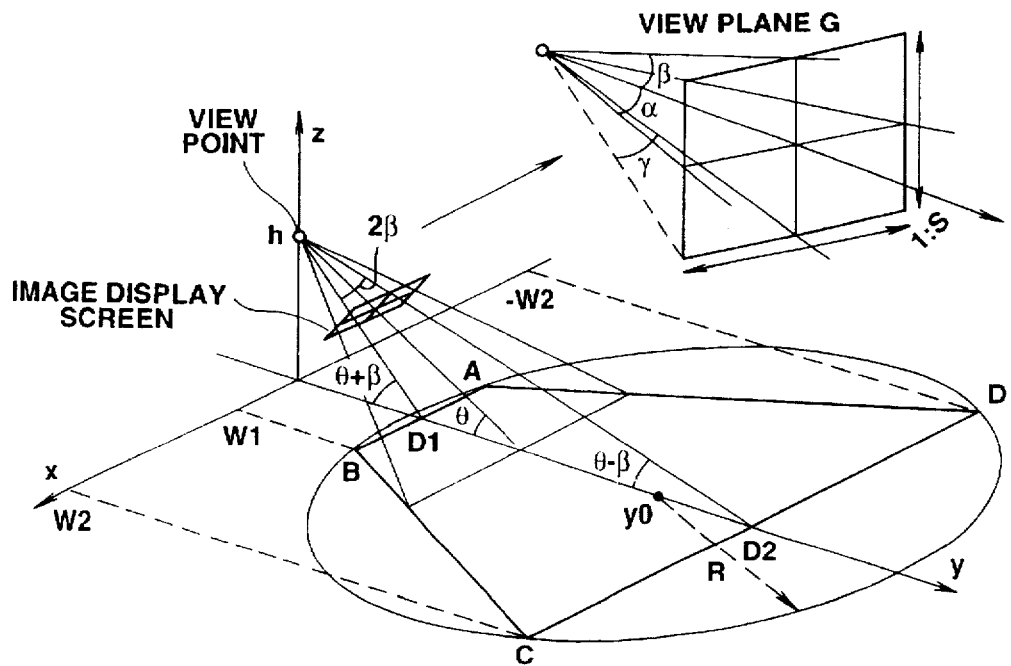
FIG. 19 is an explanatory view for explaining a relationship between a view point position, a display screen, and a region to be displayed in the case of the eighth embodiment.

FIG. 19 shows a schematic explanatory view representing a relationship between the displayed screen (view plane), view point, and the region to be displayed.

Figure 20:
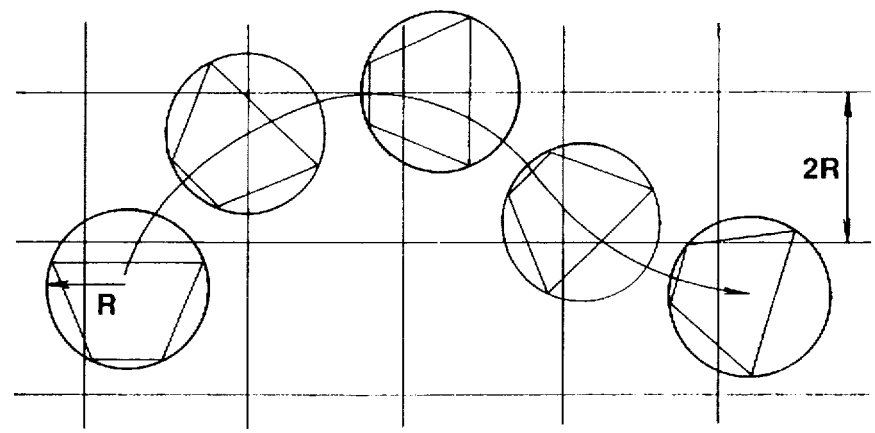
FIG. 20 is an explanatory view for explaining a state of movements of the region to be displayed and a circumscribed circle on the road map.

Referring to FIG. 19, the view point is present at point coordinates (0, 0, h) within a three-dimensional orthogonal coordinate system (x, y, z), the view point looking down the ground with a direction to +y and the angle of depression $\theta$. If the value of $\theta$ is larger than a half view angle in a vertical direction ($\beta$ in FIG. 19), the region to be displayed results in an internal of a trapezoid ABCD (BC=AD, i.e., having equal legs). Suppose a circular region circumscribing the trapezoid ABCD. A radius of the circumscribed circle is denoted by R. At this time, if a diameter 2 R is equal to a length of a side of one sheet of the mesh, the number of sheets of the meshes required to cover the circular region are at least four even if the circular region is moved on the road map, as shown in FIG. 20 (FIG. 20 is an explanatory view for explaining the movements of the circumscribed circle and the region to be displayed within the road map). In addition, the trapezoidal region to be displayed touching internally with the circular region is covered by the same number of sheets of the meshes.

Figure 18:
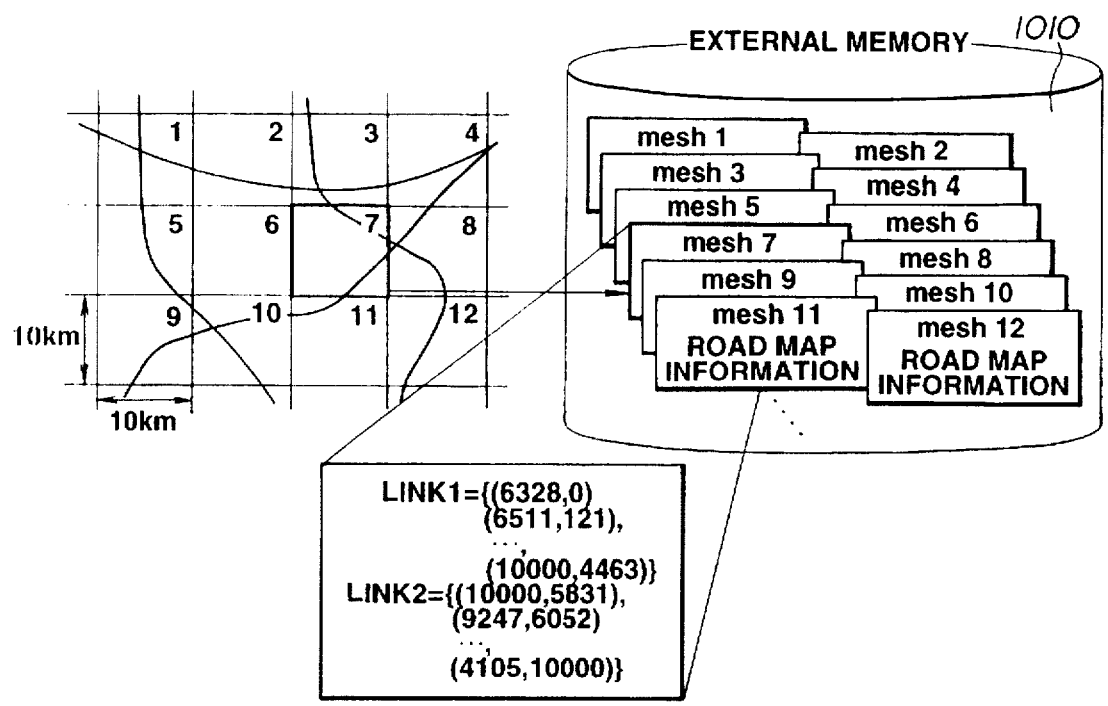
FIG. 18 is an explanatory view for explaining a stored state of a road map data in an external memory block in the case of, for example, the eighth embodiment.

It is noted that the mesh described above is defined as follows: That is to say, the external memory 1010 stores a plurality of constantly partitioned regions of the road map (refer to FIG. 18). Each of the constantly partitioned regions is a square partitioned region having equal sides of 10 Km and divided by a straight line in parallel to, for example, either a Longitude or Latitude. Then, each constantly partitioned region is herein referred to as a mesh.

More generally speaking, if the diameter 2 R of the circumscribed circle is set to be equal to N times (N herein denotes a natural number) as long as a length (10 Km) of the one side of the mesh, the number of sheets of meshes required to cover the circular region are at least $(N+1)^2$. Hence, the required condition to simplify the mesh selection procedure is to make the diameter of the circumscribed circle of the trapezoid ABCD as the region to be displayed equal to integer times as long as the length of the one side of the mesh. The multiple N is previously defined according to a memory capacity of the internal memory block 1030-3.

Referring back to FIG. 19, suppose that in the view plane of FIG. 19, a half view angle in a horizontal direction is herein denoted by $\alpha$, and the aspect ratio of the screen in the image display block 1040 is herein denoted by S.

Then, the half angle of field of view $\beta$ in the vertical direction and a one side estimation angle $\gamma$ in the horizontal direction at uppermost and lowermost ends on the screen are derived from the following equations:

$$\tan\beta = S \cdot \tan\theta, \quad \tan\gamma = \tan\alpha / \sqrt{(1 + \tan^2\beta)} \quad . \tag{25}$$

Suppose, herein, that four points A, B, C, and D of the trapezoid have the coordinates of (−W1, D1), (W1, D1), (W2, D2), and (−W2, D2), respectively.

W1, W2, D1, D2 are expressed as follows:

$$\begin{cases} W1 = \dfrac{h}{\sin(\theta + \beta)} \tan\gamma = \dfrac{h\tan\alpha \sqrt{1 + \tan^2\theta}}{\tan\theta + S\tan\alpha}, \\ D1 = \dfrac{h}{\tan(\theta + \beta)} = \dfrac{h(1 - S\tan\alpha\tan\theta)}{\tan\theta + S\tan\alpha} \\ W2 = \dfrac{h}{\sin(\theta - \beta)} \tan\gamma = \dfrac{h\tan\alpha \sqrt{1 + \tan^2\theta}}{\tan\theta - S\tan\alpha}, \\ D2 = \dfrac{h}{\tan(\theta - \beta)} = \dfrac{h(1 + S\tan\alpha\tan\theta)}{\tan\theta - S\tan\alpha}. \end{cases} \tag{26}$$

Hence, when y coordinate of the center of the circumscribed circle is denoted by y0 and its radius is denoted by R, the following equations are established:

$$\begin{aligned} y0 &= \dfrac{D1 + D2}{2} + \left(\dfrac{W2 - W1}{D2 - D1}\right) \dfrac{W1 + W2}{2} \\ &= \dfrac{ht((S^2 + 1)A^2 + 1)}{t^2 - S^2 A^2}. \end{aligned} \tag{27}$$

$$\begin{aligned} R &= \sqrt{W1^2 + (D1 - y0)^2} \\ &= \dfrac{hA \sqrt{(t^2 + A^2 + 1)((S^2 + 1)t^2 + S^2)}}{t^2 - S^2 A^2}. \end{aligned} \tag{28}$$

In the equations (27) and (28), $\tan\alpha \equiv A$ and $\tan\theta \equiv t$ in order to simplify the symbolic expressions.

If the radius R of the circumscribed circle, the angle of field of view in the horizontal direction $2\alpha$, and the aspect ratio S are given as the display parameters, the relationship between unknown variables h and t are defined as shown in the equation (28). However, since the values of the unknown variables cannot be determined from only the equation (28), it is necessary to introduce a further display parameter.

As one example, in the eighth embodiment, an actual size of the lower side of the display screen (length of a line segment AB in FIG. 19, namely, 2W1) is adopted as the further display parameter.

This actual size serves as an index indicating an approximate display reduced scale of a nearest region to the view point.

The calculation formula to derive W1 is expressed as follows using the method of simplified symbolic expressions described in the equation (28).

$$W1 = h \cdot A \sqrt{(t^2 + 1)/(t + SA)} \quad . \tag{29}$$

Hence, a real root of t (t>SA, i.e., $\theta = \beta$) is derived by substituting the display parameters R, A, S, and W1 derived from the equations (28) and (29) into the following equation (30), the real root t being substituted into the equation (28) or (29) to derive the value of h.

$$\dfrac{R}{W1} = \dfrac{\sqrt{(t^2 + A^2 + 1)((S^2 + 1)t^2 + S^2)}}{(t - SA)\sqrt{t^2 + 1}} \quad . \tag{30}$$

It is noted that to derive the value of t in the equation (30), an approximation solution such as a Neuton's method may be used and its strict solution of t can also be derived.

The real root of t as t>SA in the equation (30) gives the following equation (32) in the equation (31) and the derived t is substituted into the above-described described equation (29) to derive h.

$$\begin{cases} (R/W1)^2 \equiv K \\ K - 1 - S^2 \equiv L \\ (K-1)A^2 - 1 \equiv M \\ L + MS^2 - A^2 \equiv N \\ 12LMS^2 - 12A^2K^2S^2 + N^2 \equiv O \\ 108LA^2K^2S^2 + 108MA^2K^2S^4 - 36NA^2K^2S^2 - 72LMS^2 + 2N^3 \equiv P \\ \dfrac{A^2K^2S^2}{L^2} - \dfrac{2N}{3L} \equiv Q \\ \dfrac{\sqrt[3]{20}}{3L\sqrt[3]{P+\sqrt{P^2-40^3}}} + \dfrac{\sqrt[3]{P+\sqrt{P^2-40^3}}}{3\sqrt[3]{2}\,L} \equiv U \\ \sqrt{Q+U} \equiv V. \end{cases}$$ (31)

$$t = \dfrac{AKS}{2L} + \dfrac{V}{2} + \dfrac{1}{2}\sqrt{2Q - U + \dfrac{2AKS(A^2K^2S^2 + 2L^2 - LN)}{L^3V}}.$$ (32)

For example, suppose that each side length of the mesh is 10 Km and the radius of the circumscribed circle R is 500 m (N=1), the actual size of the lower side of the screen is 500 m (W1=250 m), the angle of field of view is 40° (A=tan 20°), and the aspect ratio is 3/4 (S=0.75). Then, if t is derived from the equations (31) and (32), t=0.317896 (θ=17.6°). This value is substituted into the equation (29) to derive h (h=386.78 m).

Referring back to FIG. 15, at the next step S202, the CPU (via the display reference point determining unit 1020) sets the display reference point (CX, CY) and a direction (φ) toward which the line of sight is directed (..i.e. the direction toward which the region to be displayed is viewed from the view point).

At a step S203, the CPU (the view point position/region to be displayed determining block 1030-1) determines the view point position in accordance with the display reference point output from the display reference point determining block (unit) 1020.

The display reference point determining unit 1020 is exemplified by a vehicular position measuring device which is so constructed as to measure the present position of the vehicle by means of the GPS sensing device and to output the display reference point as the measured present position. Alternatively, the display reference point determining unit 1020 may be constituted by a registered spot calling device which is so constructed as to select any one of the registered spot listings previously registered according to a user input and to output the one selected registered spot (road point) as the display reference point. Alternatively, the display reference point determining unit 1020 may be constituted by a scroll displacement input device which is so constructed as to add a predetermined displacement according to the user input to a previously determined display reference point and to output the newly determined display reference point as the display reference point.

Figure 21:
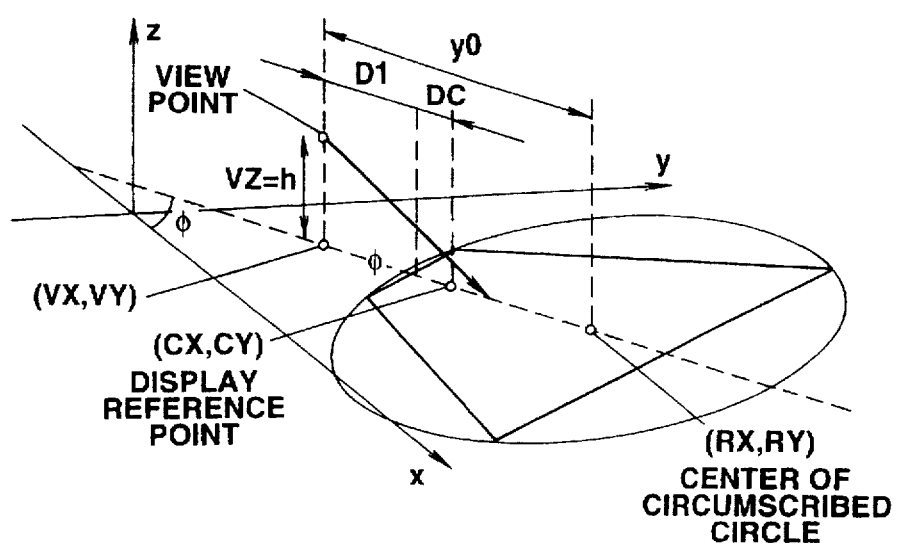
FIG. 21 is an explanatory view for explaining a positional relationship between the view point, a display reference point, and a center of the circumscribed circle in the case of the eighth embodiment.

FIG. 21 shows an explanatory view for explaining a positional relationship between the view point, the display reference point, and the center of the circumscribed circle.

Referring to FIG. 21, suppose that the display reference point is set as the point coordinates (CX, CY).

The method of calculation for the view point becomes different depending on which point on the screen the display reference point is placed. As one example in the eighth embodiment, suppose that the display reference point is displayed at the position which is remote from a lower side along a longitudinal center line with respect to the screen by a distance DC (refer to FIG. 21). In addition, various definitions are carried out for the direction of line of sight. As an example in the eighth embodiment, suppose that the direction of line of sight is given by the angle φ from the +x direction as the output information from the display reference point determining unit 1020 together with the coordinates of the display reference point.

Suppose that the view point position is (VX, VY, VZ).

From the above-described parameters, the following equations are established:

$$VX = CX - (DC + D1)\cos\phi,$$

$$VY = CY - (DC + D1)\sin\phi,$$

$$VZ = h$$ (33).

Next, at a step 204, the data access block 1030-2 derives center coordinates of the circumscribed circle. At a step S205, the data access block 1030-2 selects the number of sheets $(N+1)^2$ of meshes required to display the bird's eye view.

At the step S204, the center coordinates (RX, RY) of the circumscribed circle (region to be displayed) are derived as follows (refer to FIG. 21):

$$RX = VX + y0\cos\phi,$$

$$RY = VY + y0\sin\phi$$ (34).

Figure 22:
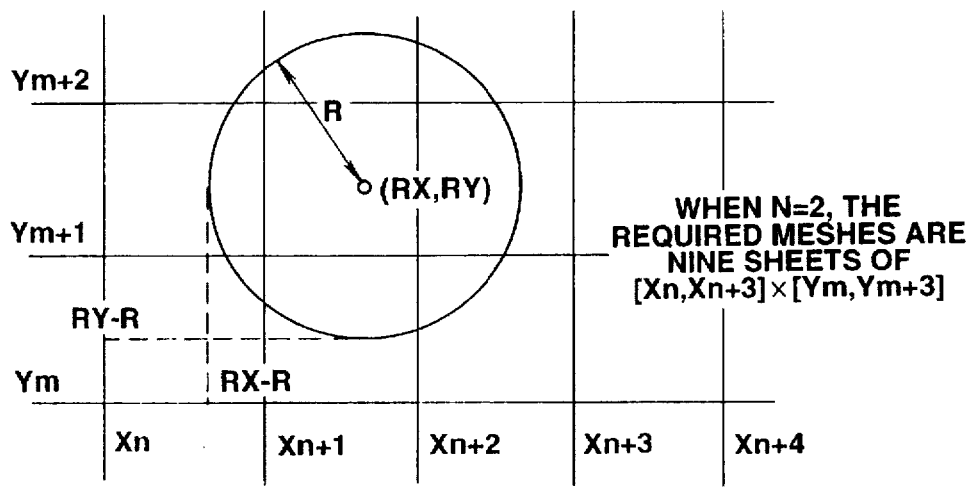
FIG. 22 is an explanatory view for explaining a method for selecting a required mesh from the center of the circumscribed circle in the case of the eighth embodiment.

FIG. 22 shows an explanatory view for explaining a method of selecting the required number of sheets of meshes from the center of the circumscribed circle.

Referring to FIG. 22, the required number of sheets of meshes are $(N+1)^2$ corresponding to $[X_n, X_{n+N+1}]\cdot[Y_m, Y_{n+N+1}]$ when the following inequalities are established:

$$X_n \leq (RX-R) < X_{n+1}$$

and $$Y_m \leq (RY-R) < Y_{m+1}.$$

Next, at a step S206, the data access block 1030-2 determines whether the information on the selected respective meshes is already fetched into (present within) the internal memory block 1030-3.

If NO at the step S206, the data access block 1030-2 (the CPU) fetches the corresponding number of sheets of meshes into the internal memory block 1030-2 at a step S207. That is to say, the CPU (data access block 1030-2) fetches only the number of sheets of meshes which is currently not present in the internal memory block 1030-3. Thus, the internal memory block 1030-3 holds, at all times, the road map data up to the required number of sheets of meshes $(N+1)^2$.

At the next step S208, after the road map data fetching operation is ended, the graphic data coordinate transformation block 1030-4 executes the coordinate transformation for the respective road map data and outputs the coordinate transformed data to the image data output block 1030-5.

In details, the road map data are, for example, stored into the internal memory block 1030-3 as a point set in a three-dimensional space $\{(MX_i, MY_i, MZ_i), i=1, 2, \text{- - -}\}$. Then, the graphic data coordinate transformation block 1030-4 transforms the stored point set described above into a two-dimensional transformed value $\{(SX_i, SY_i), i=1, 2, \text{- - -}\}$ fixed on the screen of the image display block 1040 in the following procedure.

FIGS. 23A through 23D show sequential explanatory views for explaining the coordinate transformation method of the road map data.

Referring to FIGS. 23A, 23B, 23C, and 23D, the point ($MX_i$, $MY_i$, $MZ_i$) described in the road map spatial coordinate system (x, y, z) is, first, transformed into a point ($EX_i$, $EY_i$, $EZ_i$) within the three-dimensionally extended spatial coordinate system (xe, ye, ze) to which the two-dimensional screen coordinate system is extended.

The three-dimensional spatial coordinate system (xe, ye, ze) is a right-hand coordinate system with the view point set as an origin, the rightward direction of the screen of the image display block 1040 set as +xe, and an upward direction thereof set as +ye.

A relationship between the two points in the two different spatial coordinate systems is expressed as follows:

$$\begin{pmatrix} EX_i \\ EY_i \\ EZ_i \\ 1 \end{pmatrix} = \begin{bmatrix} 1 & 0 & 0 & 0 \\ 0 & \sin\theta & \cos\theta & 0 \\ 0 & -\cos\theta & \sin\theta & 0 \\ 0 & 0 & 0 & 1 \end{bmatrix} \begin{bmatrix} \sin\phi & -\cos\phi & 0 & 0 \\ \cos\phi & \sin\phi & 0 & 0 \\ 0 & 0 & 1 & 0 \\ 0 & 0 & 0 & 1 \end{bmatrix} \begin{bmatrix} 1 & 0 & 0 & -VX \\ 0 & 1 & 0 & -VY \\ 0 & 0 & 1 & -VZ \\ 0 & 0 & 0 & 1 \end{bmatrix} \begin{pmatrix} MX_i \\ MY_i \\ MZ_i \\ 1 \end{pmatrix}. \quad (35)$$

The, a similar transformation for the derived point ($EX_i$, $EY_i$, $EZ_i$) is executed to derive the point ($SX_i$, $SY_i$) which corresponds to the above point perspectively projected onto the screen.

Figure 23C:
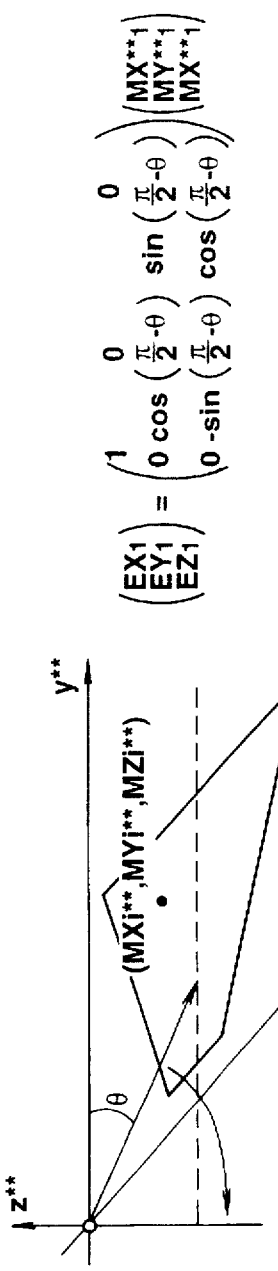
Figure 23D:
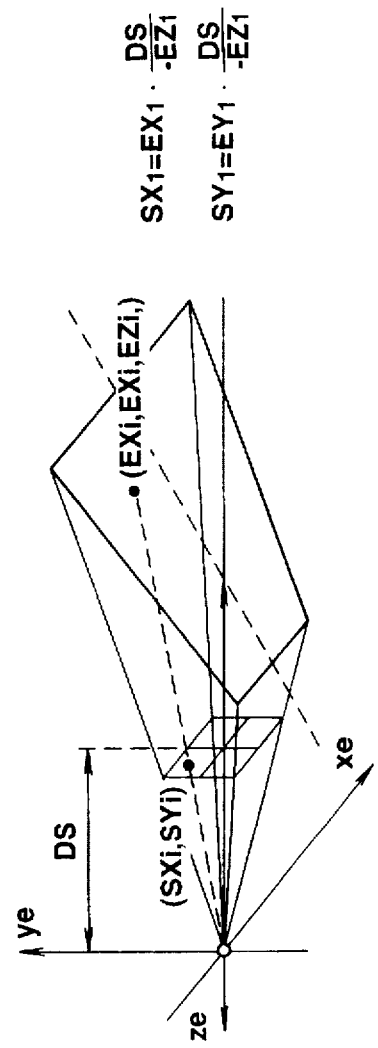

In details, a distance D from the view point (origin) to the screen is derived as follows using a width of the screen (DX) and the horizontal half angle of view ($\alpha$) (refer to FIG. 23D).

$$DS=DX/(2 \tan \alpha) \quad (36)$$

Consequently, the point ($SX_i$, $SY_i$) is derived using the following equation.

$$SX_i=EX_i \cdot DS/-EZ_i,$$
$$SY_i=EY_i \cdot DS/-EZ_i \quad (37)$$

Referring back to FIG. 15, the image data output block 1030-5 executes, for example, a clipping for the derived image coordinates ($SX_i$, $SY_i$) and outputs to the image display block 1040 as the image data at a step S209.

Then, after the steps of S208 and S209 are repeated, the CPU determines whether the current processing is ended at a step S210.

If No at the step S210, the routine returns to the step S202 so that the view point position is updated on the basis of the new display reference point. Thereafter, the mesh selection, (if necessary) the updating of the internal memory block 1030-3, the coordinate transformation, and display operation are repeated.

In the eighth embodiment, since, for each of the road map data which is divided into the constantly partitioned regions (meshes), the required calculation processing for the bird's eye view is executed and the road map information as the result of the calculation is displayed, both of the detailed road shape information placed in the proximity to the displayed reference point and wide regional road information can be grasped. In addition, a frequency of switchings of the display mode is reduced and operability of the navigating apparatus can be improved.

(Ninth Embodiment)

In a ninth preferred embodiment of the navigating apparatus according to the present invention, a display parameter input block 300 is added to the functional block diagram of FIG. 14 in the eighth embodiment.

Figure 16:
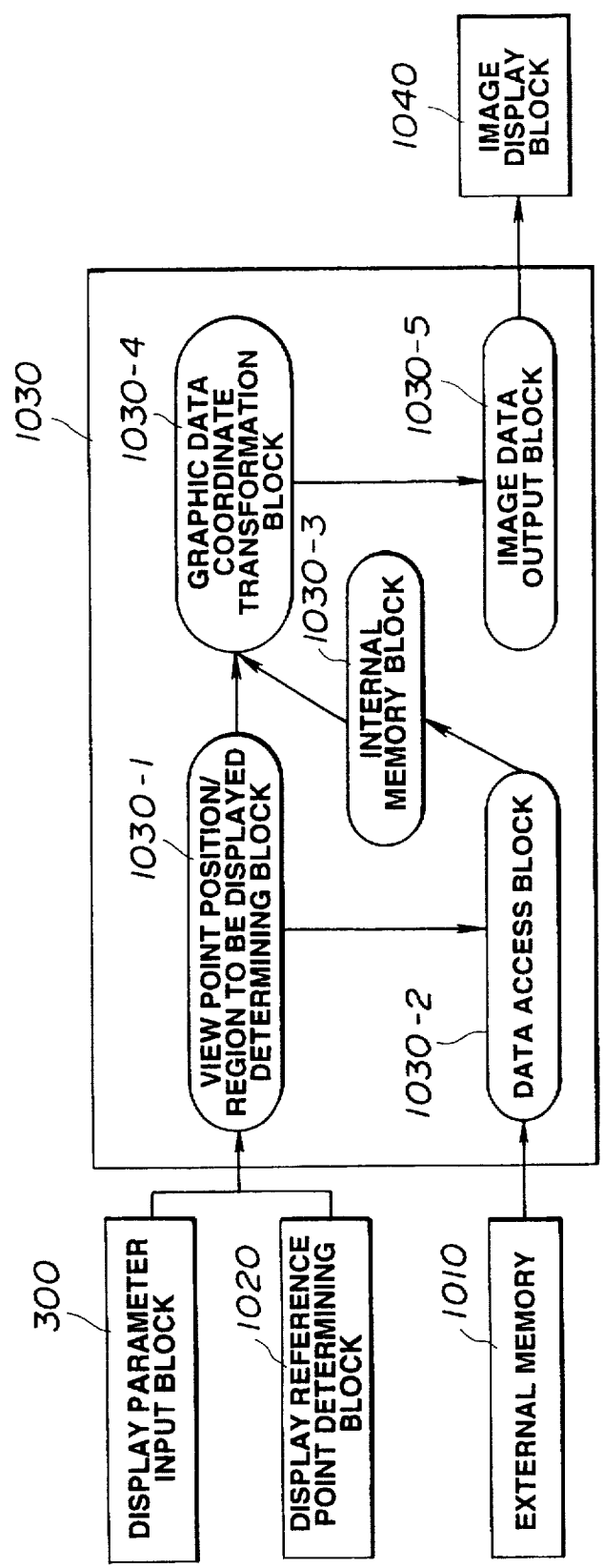
FIG. 16 is a functional block diagram of a ninth preferred embodiment of the navigating apparatus according to the present invention.

FIG. 16 shows the functional block diagram of the ninth embodiment of the navigating apparatus according to the present invention.

Since the respective blocks except the display parameter input block 300 are the same as those in FIG. 14 of the eighth embodiment, the detailed explanations of the functional blocks are omitted herein.

Figure 17:
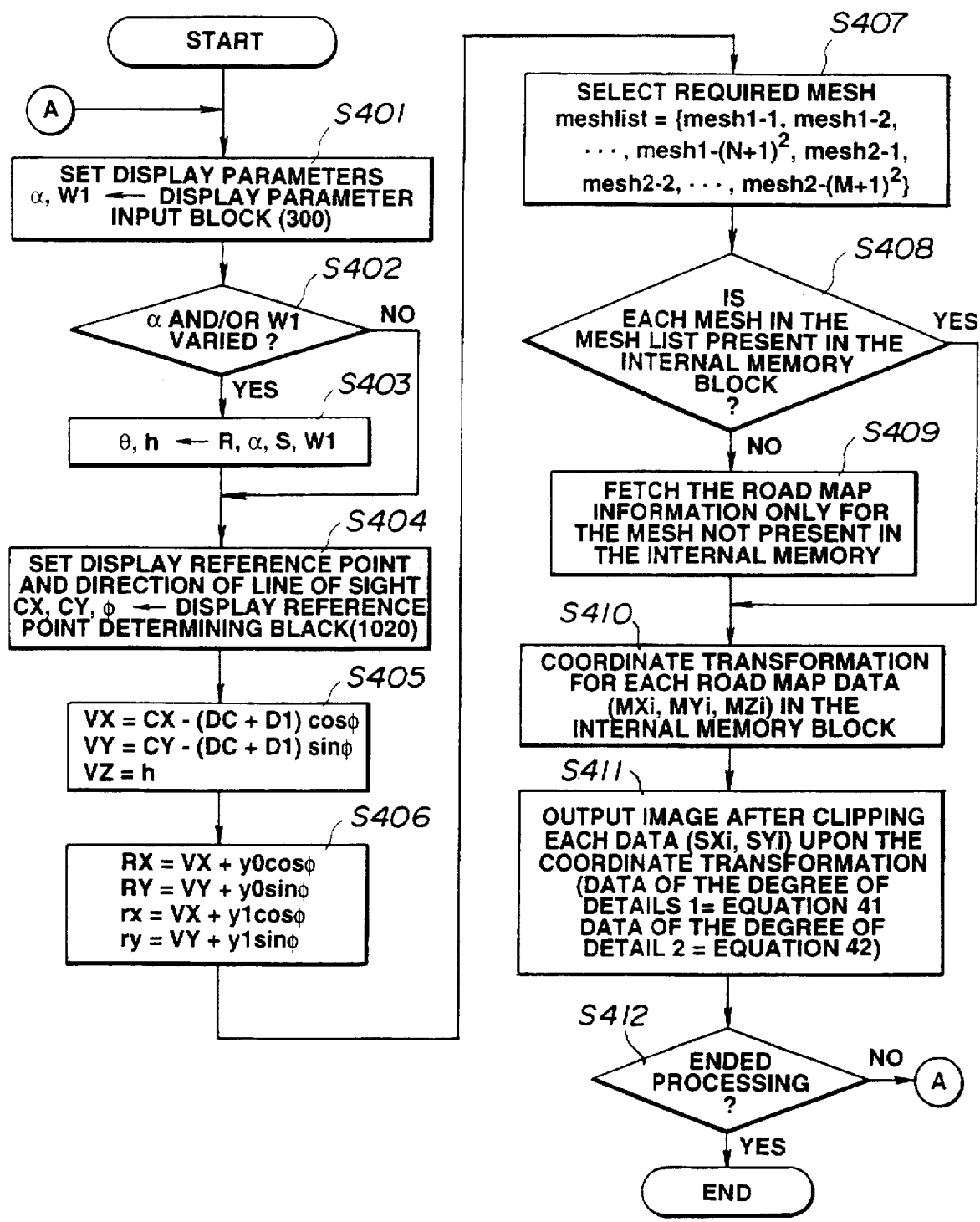
FIG. 17 is an operational flowchart of the ninth embodiment shown in FIG. 16.

FIG. 17 shows an operational flowchart executed in the arithmetic/logic operation unit 1030 in the ninth embodiment.

At a step S401, the user (viewer) appropriately can input the horizontal view angle $2\alpha$ and the screen lower side actual size 2W1 from among the plurality of display parameters which are given as constants as described in the eighth embodiment.

At a step S402, the CPU determines whether any one of variations in the values of these parameters occurs. If Yes at the step S402, the routine goes to a step S403 in which the view point position/region to be displayed determining block 1030-1 again calculates the angle of depression ($\theta$) and height (h).

Figure 24:
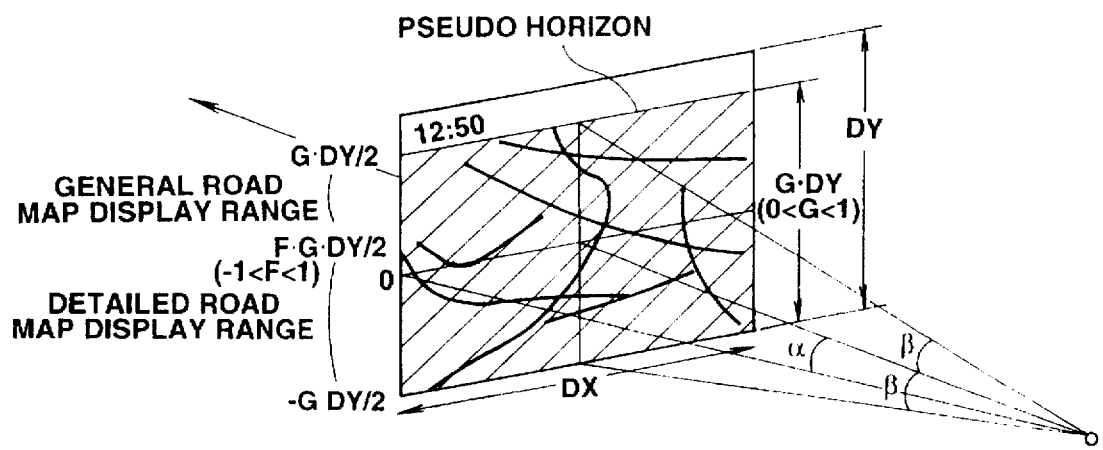
FIG. 24 is an explanatory view for explaining a pseudo horizon and limitation/division of a range of the displayed road map in the case of, for example, a ninth embodiment.

In the ninth embodiment, the aspect ratio S of the screen is $S=G \cdot DY/DX$ (0<G<1) (DY denotes a size of the longitudinal length of the screen and DX denotes a size of the width of the screen) so that a range of the road map display is limited as shown in FIG. 24 (FIG. 24 shows an explanatory view for explaining a limitation/division of the road map display range and pseudo horizon). Then, a pseudo horizon is placed as a boundary line of the screen and on its upper part of the screen is superimposed some information such as the present time (clock, in FIG. 24, 12:50).

Furthermore, in the ninth embodiment, the road map display range of the displayed image is divided into a plurality of regions so that a stepwise display processing is carried out such that a degree of details on the road map data to be displayed is varied according to the distance from the view point.

Figure 25:
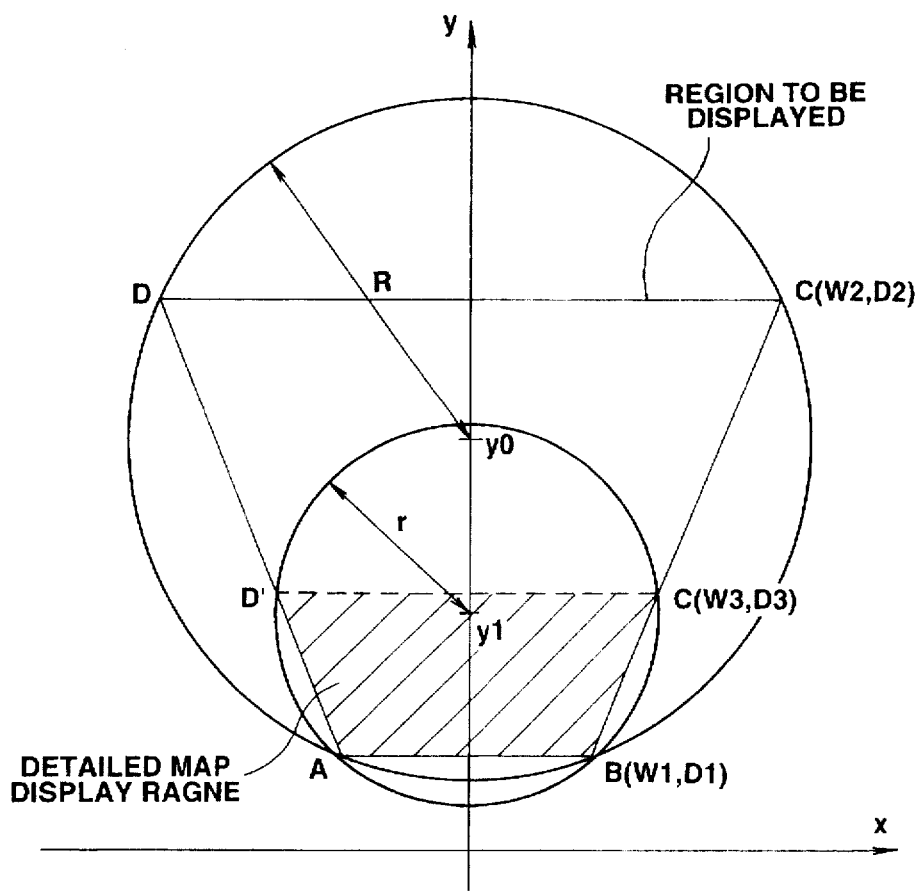
FIG. 25 is an explanatory view for explaining a relationship between the region to be displayed, the circumscribed circle, and a minor circle.

For example, the display range is divided into two regions, as shown in FIG. 25, its upper part (distant view) being a general road map display range and its lower part (close-range view) being a detailed road map display range.

In addition, a leveling on the degree of details is already provided for the individual road map data stored in the external memory block 1010.

For example, such principal roads as freeways and national roadways are leveled as the degree of details 1 and such regional roads as country roads or streets are leveled as the degree of details 2. Then, only the roads having the degree of details 1 are displayed on the general road map display range and all roads are displayed on the detailed road map display range irrespective of the degrees of details.

These road map data may be stored and managed for each of the common meshes in the same way as described in the eighth embodiment. Alternatively, the road map data may be stored in a unit of mesh having a size different according to the degree of details (in general, since the road map data having a higher degree of details becomes large number of roads, the mesh needs to be precisely set in details).

In the latter case, suppose that the principal roads are stored for each mesh having one side length of L1 and the detailed (degree of details are 2 or more) roads are stored for each mesh having one side length of L2 (L1>L2, for example, L1=10 km and L2=2 km).

Referring back to FIG. 17, the contents of steps S404 and S405 are the same as those of the steps of S202 and S203 described in the eighth embodiment.

It is noted that the diameter 2 R of the circumscribed circle is a previously defined value so as to make the diameter equal to the integer N times as long as the length L1 of the one side of the principal road mesh. That is to say, R=N·L1/2 (for example, if N=1 and L1=10 km, R=500 m).

Next, at a step S405, the CPU (data access block 1030-2) derives the center (RX, RY) of the circumscribed circle required to select the principal road mesh and derives center coordinates (rx, ry) of a minor circle required to select the detailed road mesh.

A diameter 2 r of the minor circle is a value previously set value so as to make the diameter thereof equal to the integer M times as long as the length L2 of one side of the detailed road mesh. That is to say, r=M·L2/2 (for example, if M=1, L2=2 km, r=1000 m).

FIG. 25 shows an explanatory view for explaining a relationship between the region to be displayed, the circumscribed circle, and the minor circle.

Suppose, in FIG. 25, the minor circle having the center placed on the y axis, the radius r, and its circumference passing through the points A and B.

The coordinate y1 of the center of the minor circle is expressed as follows:

$$y1 = D1 + \sqrt{(r^2 - W1^2)} \quad (38)$$

At this time, suppose that two points of intersections between the minor circle circumference and legs of the region to be displayed (trapezoid) are denoted by C' and D'. The minor trapezoid ABC'D' is sufficiently covered with at least $(M+1)^2$ number of sheets of the detailed road meshes only if such a condition as 2 r=M·L2 (M denotes a natural number) is satisfied.

The center coordinates of the minor circle are derived if y1 is given by the equation (38).

$$rx = VX + y1 \cos \phi,$$

$$ry = VY + y1 \sin \phi \quad (39).$$

At a step S407, the CPU (data access block 1030-2) executes the selection of the meshes stored in the external memory block 1010.

For the principal road mesh, the number of sheets $(N+1)^2$ of principal road meshes which correspond to $[X_n, X_{n+N+1}] \times [Y_m, Y_{n+N+1}]$ are selected when the equation (34) is established.

For the detailed road mesh, the number of sheets $(M+1)^2$ of meshes are selected which correspond to $[X_p, X_{p+M+1}] \times [Y_p, Y_{p+M+1}]$ when the following inequalities are established.

$$X_p \leq rx - r < X_{p+1},$$

$$Y_q \leq ry - 3 < Y_{q+1} \quad (40).$$

Then, the collation of the selected meshes to those in the internal memory block 1030-3 (at a step S408) and the fetching of the selected meshes into the internal memory block 1030-3 (at a step S409) are carried out in the same way as those steps (S206 and S207) shown in FIG. 15 (eighth embodiment). Thus, the internal memory block 1030-3 holds at all times the number of sheets $(N+1)^2$ of the general road map data and the number of sheets $(M+1)^2$ of the detailed road map data.

Next, when the road map data are completely stored in the internal memory block 1030-3, at a step S410, the graphic data coordinate transformation block 1030-4 executes the coordinate transformation from each road map data (MX$_i$, MY$_i$, MZ$_i$) using the equation (35), DS=DX/(2 tan α), and the equation (37) to derive the two-dimensional image coordinates (SX$_i$, SY$_i$) of the display image block 1040.

Finally, the image data output block 1030-5 outputs the two-dimensional image coordinates to the image display block 1040 as the image data.

At this time, at a step S411, the image data output block 1030-5 executes different clipping processings according to the degrees of details involved in the individual road map data.

For example, for the principal road image data having the degree of details of 1, when the image coordinates (SX$_i$, SY$_i$) are satisfied with the following conditions in accordance with FIG. 24, only the image data satisfied with the following conditions are displayed regions, the other image data except this region are clipped.

$$-DX/2 \leq SX_i \leq DX/2, - (G \cdot DY)/2 \leq SY_i \leq (G \cdot DY)/2. \quad (41)$$

On the other hand, for the detailed road map data having the degree of details of 2, the following conditions are the range to be displayed.

$$-DX/2 \leq SX_i \leq DX/2, - (G \cdot DY)/2 \leq \quad (42)$$

$$SY_i \leq F \cdot (G \cdot DY)/2 (-1 < F < 1).$$

It is noted that F in the equation (42) represents a ratio of the value of y (longitudinal coordinate value) on the boundary line between the general road map display region and the detailed road map region in FIG. 24 to the value of y in the pseudo horizon.

Then, suppose herein that the coordinates of the point C' is (W3, D3), a gradient of the straight line BC' is M. The following equations (43) and (44) are derived.

$$M = (D2 - D1)/(W2 - W1) = \sqrt{(r^2 + 1)}/A \quad (43)$$

$$D3 = M \cdot W3 - ht, \; W3^2 + \{(D3 - D1 - \sqrt{(r^2 - W1^2)}\}^2 = r^2. \quad (44)$$

When the above-equations (43) and (44) are solved, the following equation is established.

$$W3 = \frac{hA\sqrt{r^2+1}}{r^2+A^2+1} \left( \frac{r^2 - A^2 + 1}{t + SA} + 2\sqrt{\frac{r^2}{h^2} - \frac{A^2(r^2+1)}{(t+SA)^2}} \right) \quad (45)$$

Figure 26:
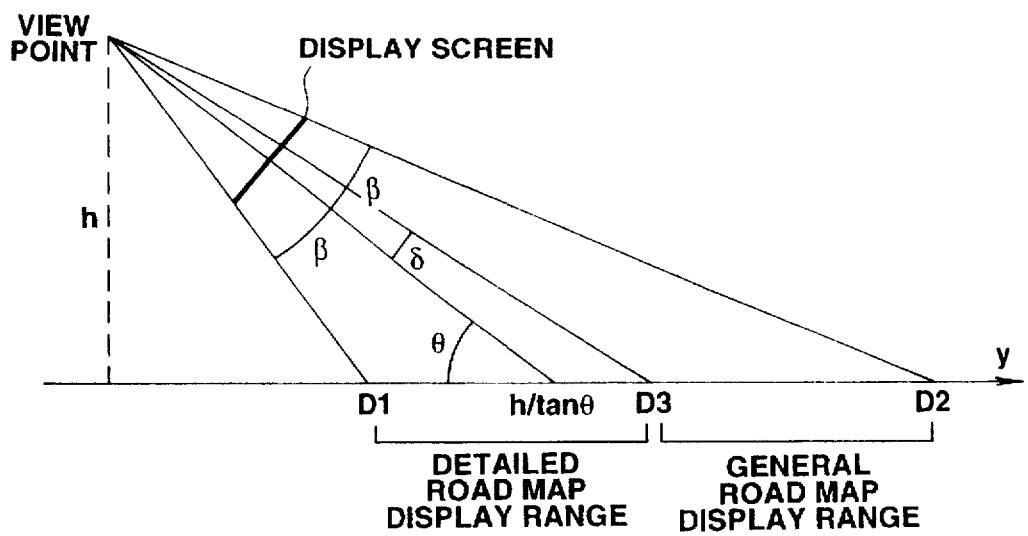
FIG. 26 is an explanatory view for explaining a position of a division boundary line of the range of the road map to be displayed in the case of, for example, the ninth embodiment.

The above-defined F is derived in accordance with FIG. 26.

FIG. 26 shows an explanatory view for explaining the position of the division boundary line of the road map displayed region.

$$F = \frac{\tan\delta}{\tan\beta} = \frac{1}{SA} \tan\left(\arctan(D3h) - \arctan\left(\frac{1}{t}\right)\right) = \qquad (46)$$

$$\frac{1}{SA} \cdot \frac{t \cdot D3 - h}{D3 + ht}$$

$$= \frac{1}{SA} \cdot \frac{t \cdot M \cdot W3 - h(t^2+1)}{M \cdot W3} = \frac{1}{SA}\left(t - \frac{hA\sqrt{t^2+1}}{W3}\right).$$

$$= \frac{1}{SA}\left(t - \frac{t^2 + A^2 + 1}{\frac{t^2 - A^2 + 1}{t + SA} + 2\sqrt{\frac{t^2}{h^2} - \frac{A^2(t^2+1)}{(t+SA)^2}}}\right)$$

Using the above-described numerical value example, $r=1000$ m supposing that the minor circle is covered with the four sheets of detailed road meshes each having one side of 2 km. At this time, $F=0.4846$. Hence, it is necessary to execute the clipping at a position of 48. 5% toward the uppermost side from the center of the region to be displayed when the detailed roads are displayed.

If, after all of the image data outputs are ended, the road map display is still continued, the routine returns to the step S401 to trigger the view point position/region to be displayed determining block 1030 and a checking of the updating of the display parameters is repeated and the processing is carried out.

In the ninth embodiment, although the degrees of details and its accompanying division of the range to be displayed are two steps, any number of the steps may be enabled in the same way.

Figure 27:
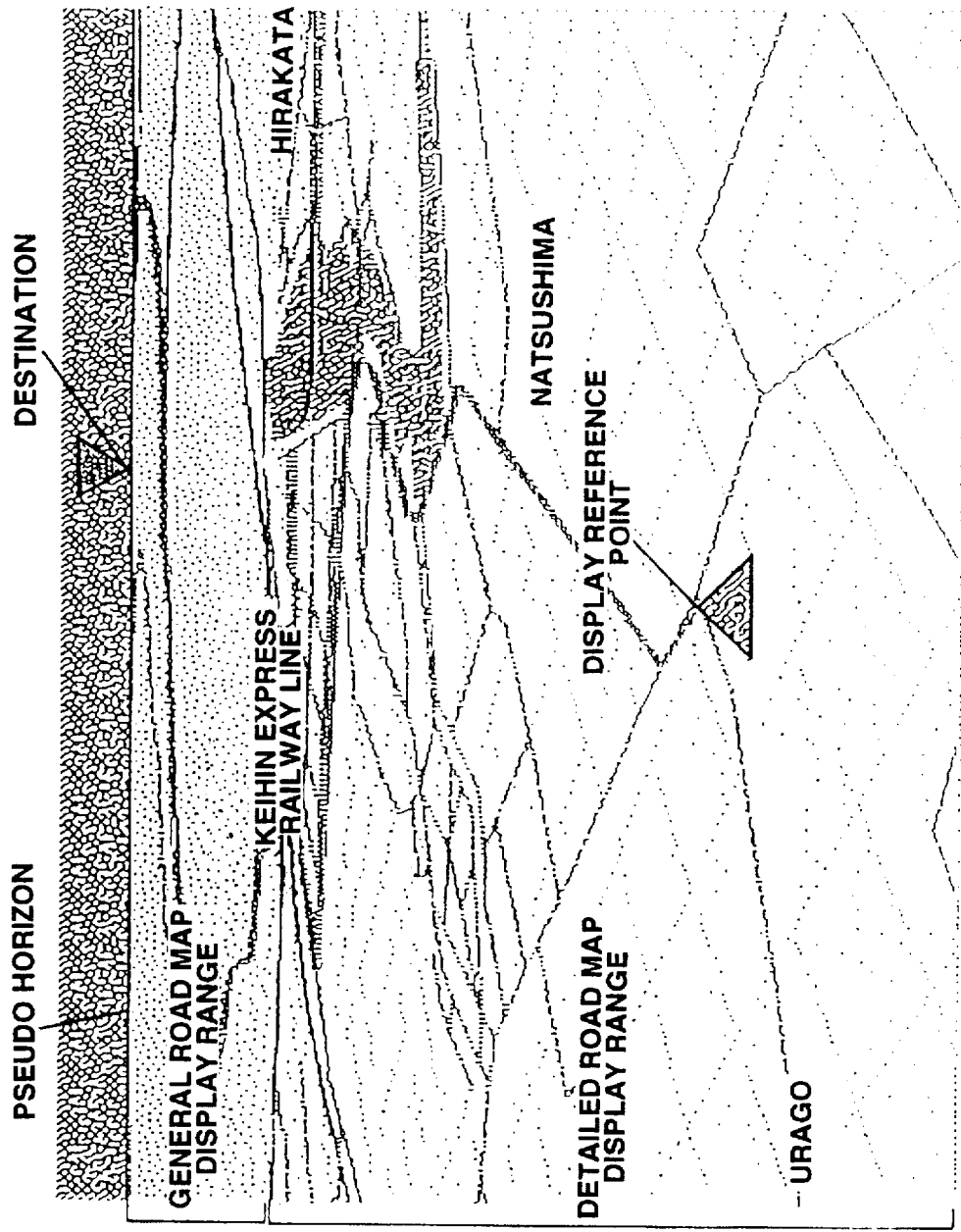
FIG. 27 is an explanatory view for explaining an example of a bird's eye view achieved in the ninth preferred embodiment of the navigating apparatus according to the present invention.

FIG. 27 shows an explanatory view of an example of the bird's eye view achieved in the ninth embodiment.

On the detailed road map display range, the detailed road situations are displayed.

On the other hand, the detailed roads are clipped out from the general road map display range.

In addition, as shown in FIG. 27, a triangular mark indicating the direction of the destination is displayed on the upper part with respect to the pseudo horizon.

(Tenth Embodiment)

Figure 28:
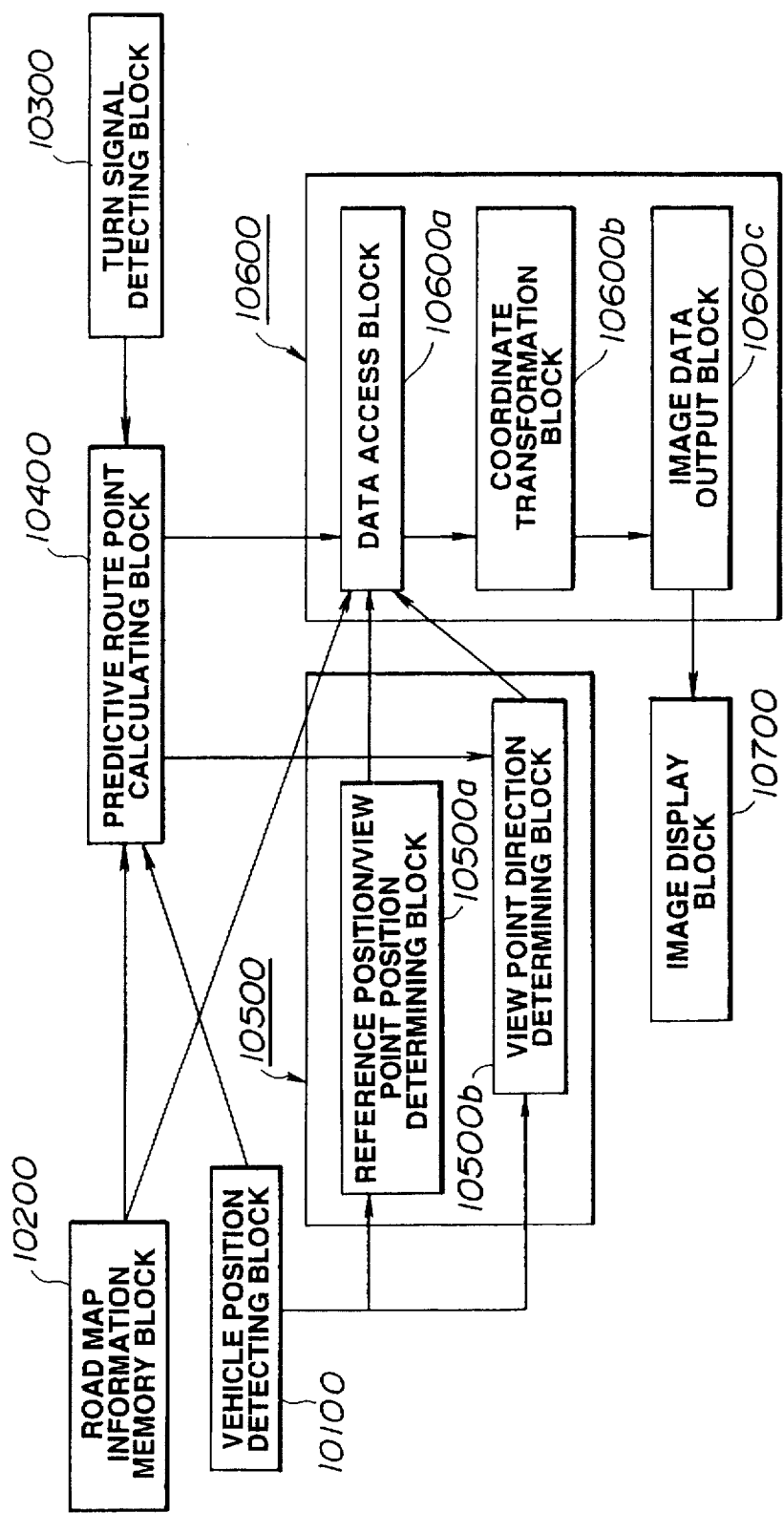
FIG. 28 is a functional block diagram of a tenth preferred embodiment of the navigating apparatus according to the present invention.

FIG. 28 shows a functional block diagram of a tenth preferred embodiment of the navigating apparatus according to the present invention.

As shown in FIG. 28, the navigating apparatus in the tenth embodiment includes: a vehicle position detecting block 10100 which is so constructed as to detect the present position and the information related to the forwarding direction at the present position; a road map information memory block 10200 which is so constructed as to store the road map data previously expressed with the X-Y plane as the reference and the road map information having intersections/ route road point information in the road map data; a turn signal detecting block 10300 which is so constructed as to detect an information related to a turn signal of the vehicle itself; a predictive route road point calculating block 10400 which is so constructed as to calculate a predictive route road point which is present toward the vehicular forwarding direction from the route road point corresponding to the present position of the vehicle and present toward the direction of a rotation indicated by the turn signal information on the basis of the present position detected by the vehicle position detecting block 10100, the information corresponding to the forwarding direction at the present position, the road information in the road map information memory block 10200, and the turn signal information detected by the turn signal detecting block 10200; a VIEW determining block 10500 which is so constructed as to determine the reference point position and direction of line of sight on the road map display on the basis of the present position detected by the vehicular position detecting block 10100, the information corresponding to the forwarding information at the present position, and the predictive route road point calculated by the predictive route road point calculating block 10400; and display calculating block 10600 which is so constructed as to perform the coordinate transformation of the road map data on the basis of the information from the VIEW determining block 10500 so as to generate the display information; and the image display block 10700 which serves to display the display information generated from the display calculating block 10600.

The VIEW determining block 10500 includes: the reference point position/view point position determining block 10500a which is so constructed as to determine the reference point position and view point position; and a direction of line of sight determining block 10500b which is so constructed as to determine the direction of line of sight from the view point.

The display calculating block 10600 includes: a data access block 10600 which is so constructed as to execute the access of various data; and an image data output block 10600c which is so constructed as to output the display information (image data) to the image data output block 10600c.

It is noted that the hardware structure of the tenth embodiment is generally constituted by the computer shown in FIG. 5B.

The vehicular position detecting block 10100 derives the present position of the vehicle denoted by $P_0$ (Px, Py, Pz) and the forwarding direction of σ at the present position.

That is to say,

σ=arg|$P_0 - P_p$|.

$P_p$ denotes the present position previously derived before the predetermined period of time or before the predetermined interval of distance by means of, for example, GPS.

The road map information memory block 10200 includes, for example, CD-ROM or floppy disc in which the road map data previously expressed with the X-Y plane as the reference and traffic intersection and route road point data are stored.

The road map data in the tenth embodiment includes node data N1, N2, N3 - - - Nn indicating the intersections and end points and link data (route) L1, L2, L3, - - - , Lm indicating connections between the node data Ni and the other node data Nj.

Figure 29:
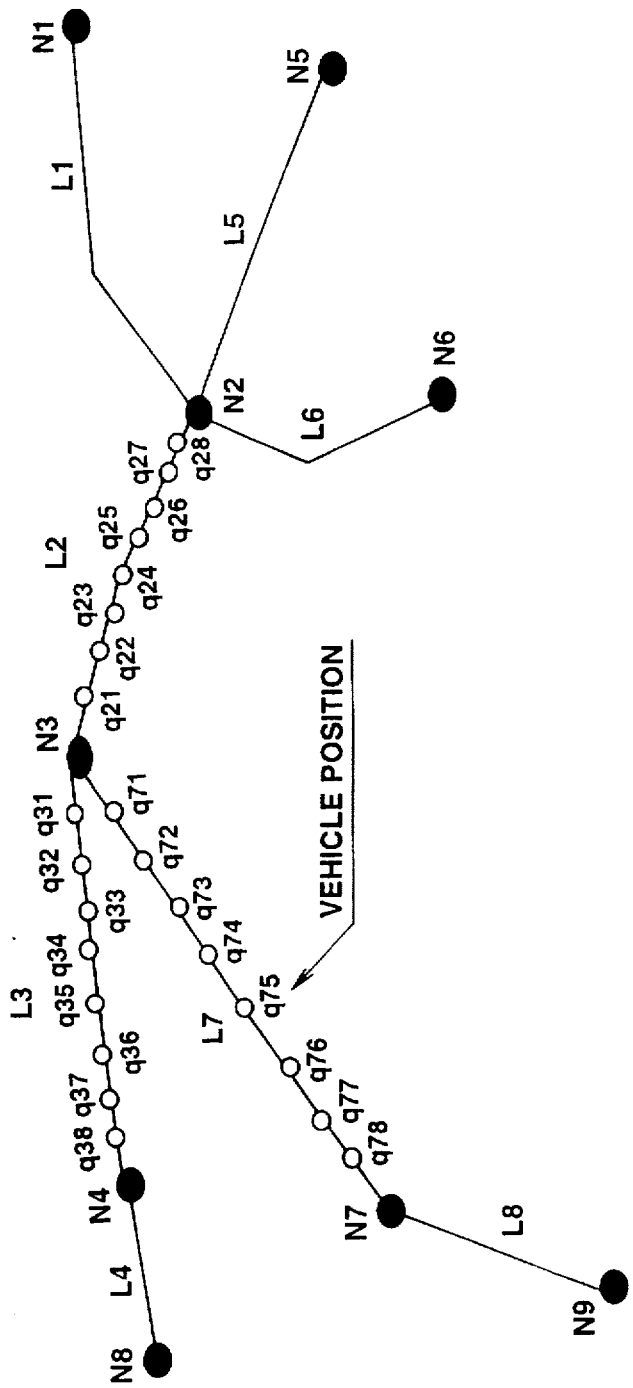
FIG. 29 is an explanatory view for explaining a road map data (running road information) stored in a road map information memory block 10200 shown in FIG. 28.

As shown in FIG. 29, the road map data are expressed with the X-Y plane as the reference, divided into meshes in the longitudinal and lateral directions, and stored in the road map information memory block 10200.

In addition, each road map data are accompanied with various data indicating attributes.

In the tenth embodiment, as shown in Table 1, the node data are accompanied with names of intersections, position coordinates, connection link number, and adjacent node data connecting the corresponding node via each one of the corresponding links.

Furthermore, as shown in Table 2, the link data are accompanied with the number of route points that the corresponding one of the links has, their position coordinates Q (qij), attributes indicating the ranks of roads such as freeways, national roadways, streets, and so forth, route names, and nodes to be connected.

For the road map shown in FIG. 29, the data shown in Tables 1 and 2 are intersection-route road point data. These road map data and intersection-route road points form the road map data.

Herein, suppose that, in FIG. 29, the vehicle is, at the present time, running at a spot of the route road point q75 in the route L7 toward the intersection N3, for easiness of explanation.

In addition, suppose that although each route road point distance in the link data is generally not constant, each route road point distance therein is constant (constant interval of distance), for example, 100 m interval.

Furthermore, suppose that a younger number of the route road point Q in the link data corresponds to a younger number node data. Hence, if the present position of the vehicle is changed from the route road point q75 to the route road point q74 in the route road L7, it means that the vehicle is directed toward the intersection N3 as shown in FIG. 29. If the present position is changed from the route road point q75 to the route road point q76, the vehicle is directed toward the intersection N7.

The turn signal detecting block 10300 serves to detect the turn signal information of the vehicle. When a combination lamp switch of the vehicle is turned on and off, the turn signal detecting block 10300 fetches the information whether the vehicular driver turns right or left according to the driver's input information.

Figure 30:
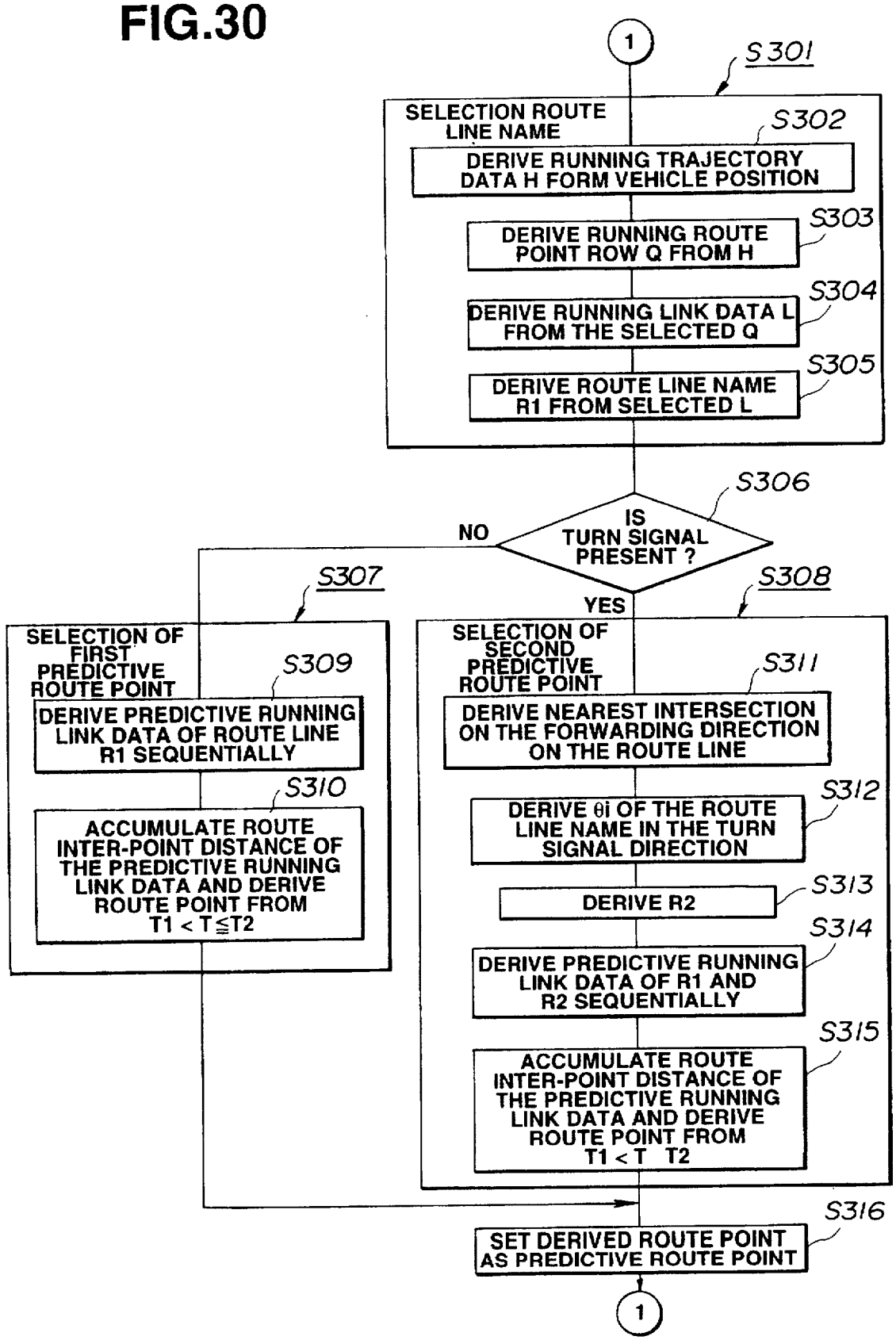
FIG. 30 is an operational flowchart for explaining a processing at a predictive route road point calculating block shown in FIG. 28.

Next, FIG. 30 shows an operational flowchart executed by the predictive route road point calculating block 10400 (generally constituted by the CPU).

At a step S301, the predictive route road point calculating block 10400 (hereinafter in the tenth embodiment, referred to as the CPU) selects a name of the route according to the present position data of the vehicle.

Specifically, the CPU prepares a running trajectory data H from the present position data $P_0$ and positional data registered for the constant interval of distance at a step S302. A subscript i is allocated to the running trajectory data H in the order from the present position toward the past positional data (H1, H2, H3, - - -, H8) (i=1, 2, 3, - - -, 8).

At a step S303, the CPU derives a running route road point row Q at which the vehicle is presently running according to the running trajectory H.

For example, the running route road point row Q (Q1, Q2, Q3, - - -, Q8) nearest to each data Hi of the running trajectory data H using the route road point coordinates of the link data is derived. This is numerically expressed as: min |Qj–Hi|, wherein Qj is derived for i=1 to i=8 of Hi.

At the next step S304, the CPU derives a running link data L according to the selected running route road point row Q.

At the step S304, the running route road point row Q is replaced and expressed with the running link data having Qj of the running route road point Q to derive a running link data row L (L1, L2, L3, - - -, L8).

Finally, at a step S305, the CPU searches for the name of the route stored in the link data of the road map data, for the derived running link data row L (L1, L2, L3, - - -, L8) to derive a route name data row R (R1, R2, R3, - - -, R8).

Herein, a specific example of the steps S302 to S305 will be explained.

Suppose that the running route road point Q (q75, q76, q77, q77, q77, q77, q78) is obtained for the past running trajectory data H (H1, H2, H3, - - -, H8). From this, the running link data row L (L7, L7, L7, L7, L7, L7, L7, L7) is obtained so that the running route name, i.e., the national roadway No. 123 is determined according to the road map (refer to Table 2). Then, the route name data row R is R (route 123, route 123, - - - route 123) so that the route name R1 is determined when fetching a theorem of majority.

At this example, the vehicle is presently running on the running route name R1=route 123. Although the plurality of running trajectory data are used and processed, this is because the correct result is obtained by reviewing these changes when a multiple of errors are included in the positional data. It is of course that the name of route of the running link data may be searched when the running route road point is found only from the present position of the vehicle and forwarding direction, for the explanation convenience purpose. Basically, the same processing is carried out.

Next, at a step S306, the presence or absence of the turn signal is searched from the turn signal detecting block 10300.

The turn signal detecting block 10300 determines that the information of the turn signal has been present when the right turn or left turn is continued for a constant time duration (for example, one second or more) and transmits the turn signal to the predictive route road point calculating block 10400.

The turn signal detecting block 10300 is specifically provided with a program timer. The program timer measures the time duration of the turning on and off of the right turn/left turn signal of the combination switch lamp and outputs the turn signal to the predictive route road point calculating block 10400.

In a case where the turn signal is not present, the CPU executes a selection of a first predictive route road point at a step S307. This selection processing is to find a predictive route road point which is ahead the constant distance on the same route as the running route R1 (Route 123). In a case where the turn signal is present, the CPU executes the selection of a second predictive route road point at a step S308. This selection processing is to find the predictive route road point which is ahead the constant distance from the present position and is on the same route or another route after the predicted right or left turn.

First, in a case where the turn signal is not present, at a step S309, the CPU refers to the road map data to derive the route road point which is ahead 800 m of the route road point of the present position from the route road point having the data on the same route data as the running route R1. Specifically, the predictive running link data of the running route R1 is derived in the order (sequence) of forwarding direction.

In details, first, the link data having the derived route name data R1 is derived and the link data are sequentially derived in the order of the forwarding direction by tracking back the connections of forward directed links according to the node data and connected link data.

In the example of FIG. 29 (the present position is on the route road point q75 and the forwarding direction is the intersection N3), the link data is derived having the derived route name R1. In this example, the link data are L2, L5, L7, and L8. Next, in this example, since the vehicle is running on L7, the node data are selected as N3 and L7. However, it can be appreciated that the vehicle is running toward N3 which is younger (lower) Q number according to the running trajectory data. Then, if the link data having the node data of L2 is derived, L2 is obtained. It is appreciated from a node identifier data of L2, namely, N2 and N3 that the next intersection is N2. In this way, the forwarding sequence of the link data; L7, L2, L1 (predicted running link data) can be derived.

Thereafter, the spot (road point) ahead about 800 meters is found by accumulating the route road point data from the route road point of the present position according to the predicted running link data. Specifically, with the predicted running link data replaced into the sequence of the route road points, an accumulated distance T from the present position is derived and the route road point of T1<T≦T2 is, thereby, derived.

In this example, T1=750 and T2=850.

That is to say, since an interval of distance between each road route point is 100 meters, it follows that any one of the route road points which is 8 numbers ahead of the route road point of the present position in the predicted running link data is searched. If the link data of the route road points are replaced into the sequence of the route road points, q75, - - -, q73, q72, q71, N3, q21, q22, q23, - - -, q28, N2, q11, q12, q13, - - -, q18 are obtained. It follows that any one of the route road points which satisfies such a condition that the accumulated distance T is 750<T≦850 is q23 on L2.

Thereafter, the derived route road point (q23) is the predicted route road point at a step S316.

On the other hand, in a case where the turn signal occurs, at a step S308, the CPU executes the selection of the second predictive route road point so as to search for the predicted route road point which is the constant distance ahead of the present position on the same route or any other route after the predicted right turn or left turn.

Specifically, at a step S311, the CPU searches any one of the intersections which is nearest to the present position on the running route. This intersection can be derived according to the information of an end (terminal) point identifier of the link data, information on the forwarding direction, and running trajectory data. In the example of FIG. 29, it can be appreciated from the running trajectory data of the link data L7 that the vehicle is running toward N3 which is a younger side of Q number. At this time, the nearest intersection on the running route is the intersection N3.

Next, at a step S312, the CPU derives the so-called angle of the intersection $\theta_i$ at the nearest intersection directed to the route name in the turn signal indicating direction.

This angle is derived as follows: That is to say, the node data is, at first, derived which is the next intersection from the adjacent intersection information of the nearest intersection. Then, the position coordinates of the node data derived are searched. Then, the angle formed between the node position coordinate data and the nearest intersection is finally derived.

Herein, suppose that the angle in the direction of the present position is zero degrees and the angle is limited to the clockwise direction.

Next, at a step S313, the CPU derives the predicted running route R2.

Although various types of methods of selecting the road during the vehicular right or left turn can be considered, the predicted route name is derived in the ways as ① and ② on the basis of turn right or turn left signal standing in front of the traffic intersections.

① When the vehicle is to be turned left, such a road as min |θ$_i$−90°| is selected as the predicted running route R2.

② When the vehicle is to be turned right, such a road as min |θ$_i$−270°| is selected as the predicted running route R2.

In the example of FIG. 29, suppose that the turn left signal is present.

In this example, the connecting link data (L2, N2), (L7, N7), and (L3, N4) and each node positional information N2, N7, and N4 is derived.

Next, the angle formed between N6 and each one of the intersections is derived to determine the direction when the vehicle is to be turned left.

Suppose that N4 is 30° in the clockwise direction, N7 is 0°, and N2 is 210°.

At this time, N4 is selected which is nearest when the vehicle is to be turned left. Hence, the link data L3 is selected.

Specifically, the predicted running link data having the route name data R1 or R2 is, at first, derived. Then, the connection to the link in the forwarding direction can be tracked back according to the node data in the forwarding direction and its connecting link data so as to derive the predicted running link data in the sequence of the forwarding direction. Thereafter, any one of the route road points which satisfies such a condition that the accumulated distance T of the distances between the route road points of the predicted running link data is T1<T≦T2.

In the example of FIG. 29 in which the turn left signal is present, L7, L3, and L4 are, at first, derived as the predicted running link data. Since the interval of distance between each route road point is 100 m, it follows that any one of the route road points which is 8 numbers ahead of the route road point indicating the present position is searched. If the route road point link data are replaced into the sequence of the route road points, q75, - - -, q73, q72, q71, N3, q31, q32, q33, - - -, q38, N4, q41, q42, q43, - - -, q48 are obtained. Then, it follows that any one of the route road points which satisfies the condition such that the accumulated distance T of the route road points is 750<T≦850 is q33 on L3.

Thereafter, the derived route road point (q33 in this example) is set as the predicted route road point at a step S316.

Next, an operation of the VIEW determining block 10500 will be described below.

The VIEW determining block 10500 determines the reference point of the road map display and the direction of line of sight from the view point on the basis of the present position data, the forwarding direction at the present position and the predicted route road point.

At first, the angle of depression θ and the height h of the view point are appropriately determined.

This determination methods of the angle of depression and height of the view point are already described in the previous embodiments.

The VIEW determining block 10500 is constituted by the CPU as in FIG. 5B of the first embodiment.

The direction of line of sight determining block 10500b determines the direction of line of sight α(t) as follows: α(t)=σ=arg|P$_q$−P$_0$|, wherein σ denotes the direction of the predicted route road point P$_q$ derived by the predictive route road point determining block 10400 - - - (47).

The reference point position/view point position determining block 10500a sets the present position P$_o$ derived by the vehicle position detecting block 10100 as the reference point Q of the perspective projection. Herein, the distance from the reference point Q to the referring point B is denoted by L.

The view point position E (X$_o$, Y$_o$, Z$_o$) is determined using the following equation:

Suppose that the referring point B is B (Xb, Yb, 0) on the X-Y plane. Since the present position P$_o$ is the reference point Q of the perspective projection.

$$X_b = P_x + L \times \cos \alpha(t),$$

$$Y_b = P_y + L \times \sin \alpha(t) \quad (48).$$

Then, the view point position E (X$_o$, Y$_o$, Z$_o$) is determined from the relationship between the referring point B (X$_b$, Y$_b$, 0) and the view point E.

$$X_o = X_b - h \cdot \cos \alpha(t)/\tan \theta,$$

$$Y_o = Y_b - h \cdot \sin \alpha(t)/\tan \theta$$

$$Z_o = h \quad (49).$$

Next, the display calculating block 10600 will be explained below.

The display calculating block 10600 has the data access block 10600a receives the data from the road map information memory block 10200, the predictive route road point calculating block 10400, and the VIEW determining block 10500 and outputs these data to the coordinate transformation block 10600b.

The coordinate transformation block 10600b generates the bird's eye view by performing the coordinate transformation of the road map data according to the view point position data E and the direction of line of sight α(t).

The generation of the bird's eye view is executed by the perspective projection transformation to the road map data as follows:

Suppose that a distance between the view point E and view plane G is denoted by $V_d$. The relationship in the coordinate transformation between a point M (x, y, z) and the view point S (x, y, z) is expressed as follows:

$$\begin{pmatrix} Ex \\ Ey \\ Ez \\ 1 \end{pmatrix} = \begin{pmatrix} 1 & 0 & 0 & 0 \\ 0 & \sin\theta & \cos\theta & 0 \\ 0 & -\cos\theta & \sin\theta & 0 \\ 0 & 0 & 0 & 1 \end{pmatrix} \begin{pmatrix} \sin\alpha(t) & -\cos\alpha(t) & 0 & 0 \\ \cos\alpha(t) & \sin\alpha(t) & 0 & 0 \\ 0 & 0 & 1 & 0 \\ 0 & 0 & 0 & 1 \end{pmatrix} \begin{pmatrix} 1 & 0 & 0 & -Xo \\ 0 & 1 & 0 & -Yo \\ 0 & 0 & 1 & -Zo \\ 0 & 0 & 0 & 1 \end{pmatrix} \begin{pmatrix} Mx \\ My \\ Mz \\ 1 \end{pmatrix}, \begin{aligned} Sx &= Ex \times Vd/-Ez, \\ Sy &= Ey \times Vd/-Ez, \\ Sz &= 0. \end{aligned} \quad (50)$$

In this way, the road map data expressed with the X-Y plane as the reference is perspectively projected on the view plane G. This perspective projection information is output to the display block 10700 via the image data output block 10600c so that the bird's eye view is displayed on the image display block 10700.

It is noted that if the relationship to the view point position is calculated from the present position data, the relative displacement of the present position may be grasped as the movement of the view point since the movement of the present position is in phase with the movement of the view point position.

Thus, the image display block 10700 provides the bird's eye view having the good perspective projection characteristic.

Figure 31:
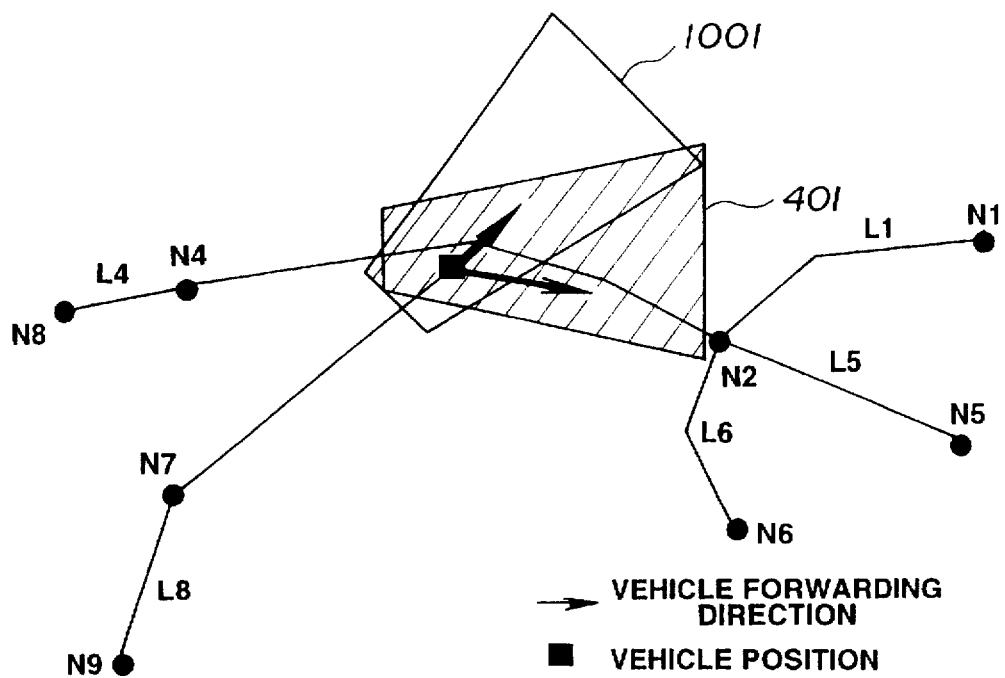
FIG. 31 is an explanatory view for explaining the region to be displayed in a case of a method (a step S307 in FIG. 30) in which no turn signal information is used in the tenth embodiment.

FIG. 31 shows the displayed road map region (dotted marked region 401) in the case of no use of the turn signal (step S307 in FIG. 30, the selection of the predicted route road point).

As shown in FIG. 31, even if the route is largely curved, the display in the direction of the route for the vehicle to run can be obtained since the predicted route road point is supposed to be placed on the same route (refer to a numeral 401 in FIG. 31.). In other words, the good perspective projection characteristic for the running road can be achieved. It is noted that a region denoted by 1001 is the region to be displayed in the case of the comparative example described in the first embodiment for comparison purpose.

Figure 32:
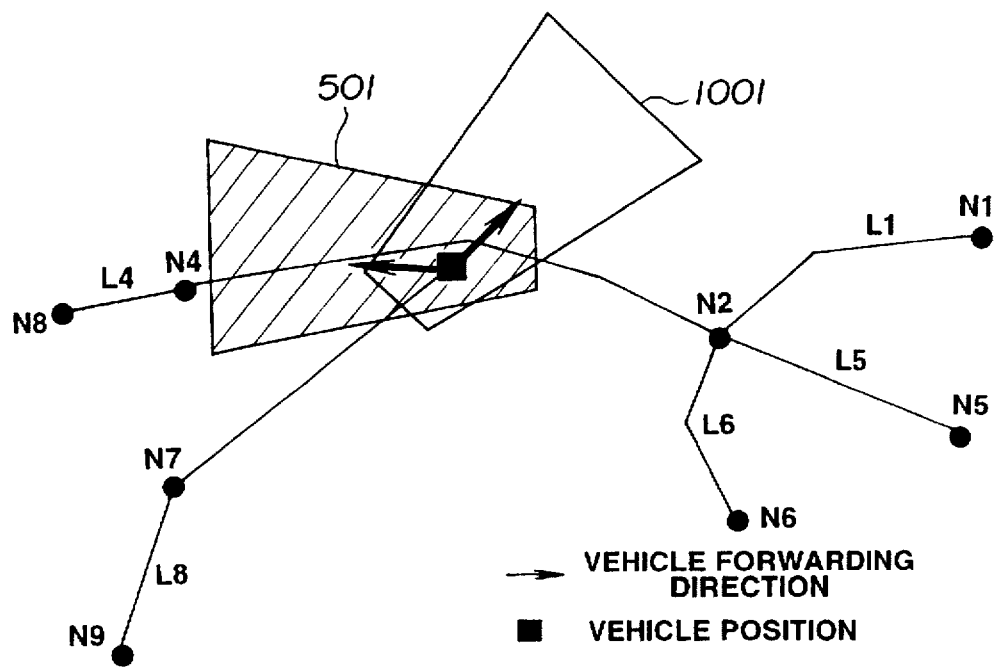
FIG. 32 is an explanatory view for explaining the region to be displayed in a case of a method (a step S308 in FIG. 30) in which an information on a turn signal is used in the tenth embodiment.

FIG. 32 shows the region to be displayed (dotted region 501) on the image display block 10700 (in FIG. 28) in the method of using the turn signal information (step 308 in FIG. 30; selection of the predicted route road point).

In the case of FIG. 32, whenever the turn signal is issued, a point of the route for the vehicle to run is instantaneously selected as the predicted route road point so that the information on the point ahead of the curved road can instantaneously be displayed and the good perspective projection viewing characteristic for the running road can be achieved.
(Modification of the Tenth Embodiment)

As the modification of the tenth embodiment, an alternative method of determining the direction of line of sight α(t) of the view point position determining block 10500b may be the form of the digital filtering:

$$\alpha(t)=w_i \cdot \sigma + (1-w_i) \cdot \alpha(t-1), \text{ wherein } 0<w_i<1, \quad (51).$$

Thus, the variation in the direction of line of sight can become smooth.

Since the direction of line of sight always takes the predicted route into consideration, the good perspective projection viewing characteristic for any roads which repeat the right/left turns can be achieved.

The same effect can be achieved for the portable navigating apparatus in the tenth embodiment although the detailed explanation for the vehicular navigating apparatus has been made.

In addition, although the detailed explanation of the bird's eye view as the image displayed on the image display block 10700 has been made, the same effect can also be achieved by the generally available top view display.

Furthermore, although the road map information is input from the road map information memory block 10200, the road map information may be input from an external radio (wireless) communication apparatus. In this case, the road map data may include a traffic congestion data and/or traffic accident data. These data may be displayed via the image display block 10700.
(Eleventh Embodiment)

Figure 33:
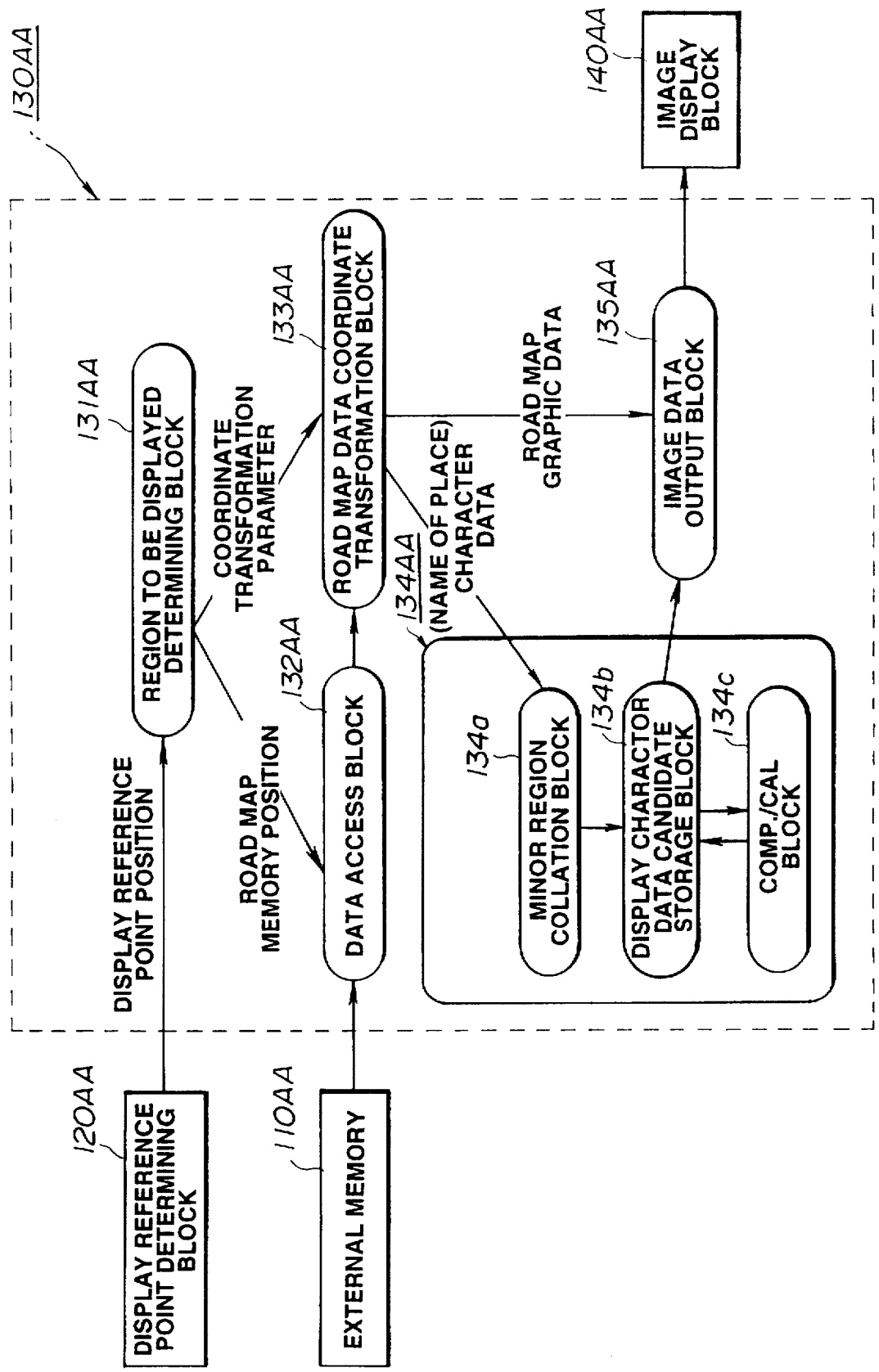
FIG. 33 is a functional block diagram of an eleventh preferred embodiment of the navigating apparatus according to the present invention.

FIG. 33 shows a functional block diagram of the navigating apparatus in an eleventh preferred embodiment according to the present invention.

As shown in FIG. 33, the navigating apparatus in the eleventh embodiment includes: an external memory 110AA which is so constructed as to store the road map data and road map concerned data; a display reference point determining block 120AA which is so constructed as to determine the display reference point on the road map; a calculation processing block 130AA which is so constructed as to execute various calculation series of processings; and image display block 140AA which is so constructed as to display the road map information.

Furthermore, the calculation processing block 130AA includes a region to be displayed determining block 131AA; a road map coordinate transformation block 133AA; a display character data selection block 134AA; and an image data output block 135AA.

The display character data selection block 134AA includes: a minor region collation block 134a; a display character candidate data storage block 134b; and comparison calculating block 134cc.

It is noted that the hardware structure of FIG. 33 is generally the same as that shown in FIG. 5B.

Next, an operation of the navigating apparatus in the eleventh embodiment will be described.

Figure 34:
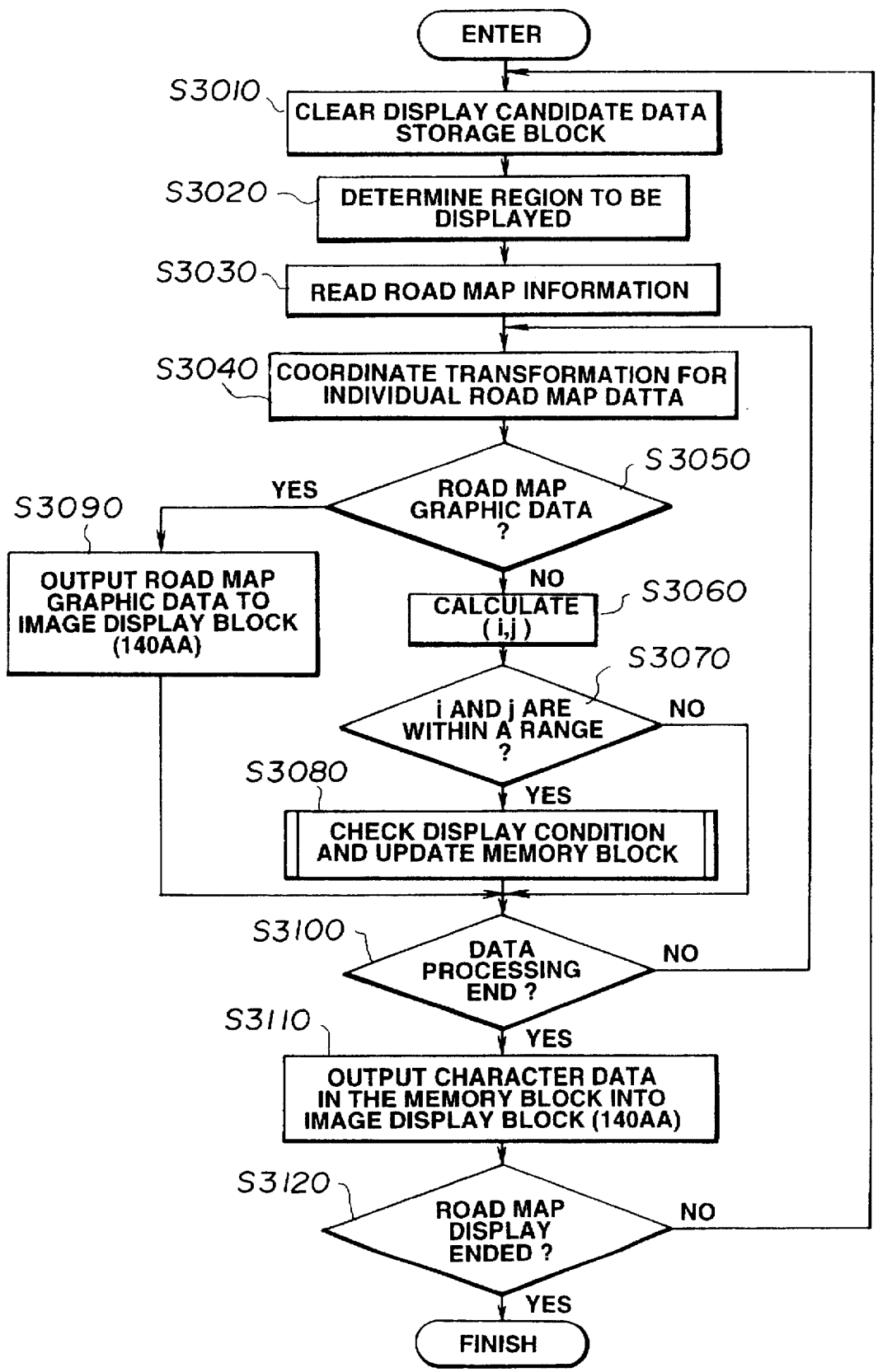
FIG. 34 is an operational flowchart of the eleventh embodiment shown in FIG. 33.

FIG. 34 shows an operational flowchart of the navigating apparatus in the eleventh embodiment.

At a step S3010, the display character data selection block 134AA (since the function of the character data selection block 134AA is carried out actually by the CPU, hereinafter referred to as the CPU) clears the content of the internal display character candidate storage block 134b to perform the initialization.

At a step S3020, the determination of the region to be displayed is carried out.

At a step S3030, the CPU reads the road map information from the external memory 110AA.

At a step S3040, the CPU performs the coordinate transformation for the road map. The steps S3010 through S3040 are the same as those steps in the previous embodiments.

Next, at a step S3050, the CPU sends the road map graphic data as the coordinate transformed data to the image data output block 135 in which the graphic data are clipped. The image clipped is output to the image display block 1400 at a step S3090.

Figure 43A:
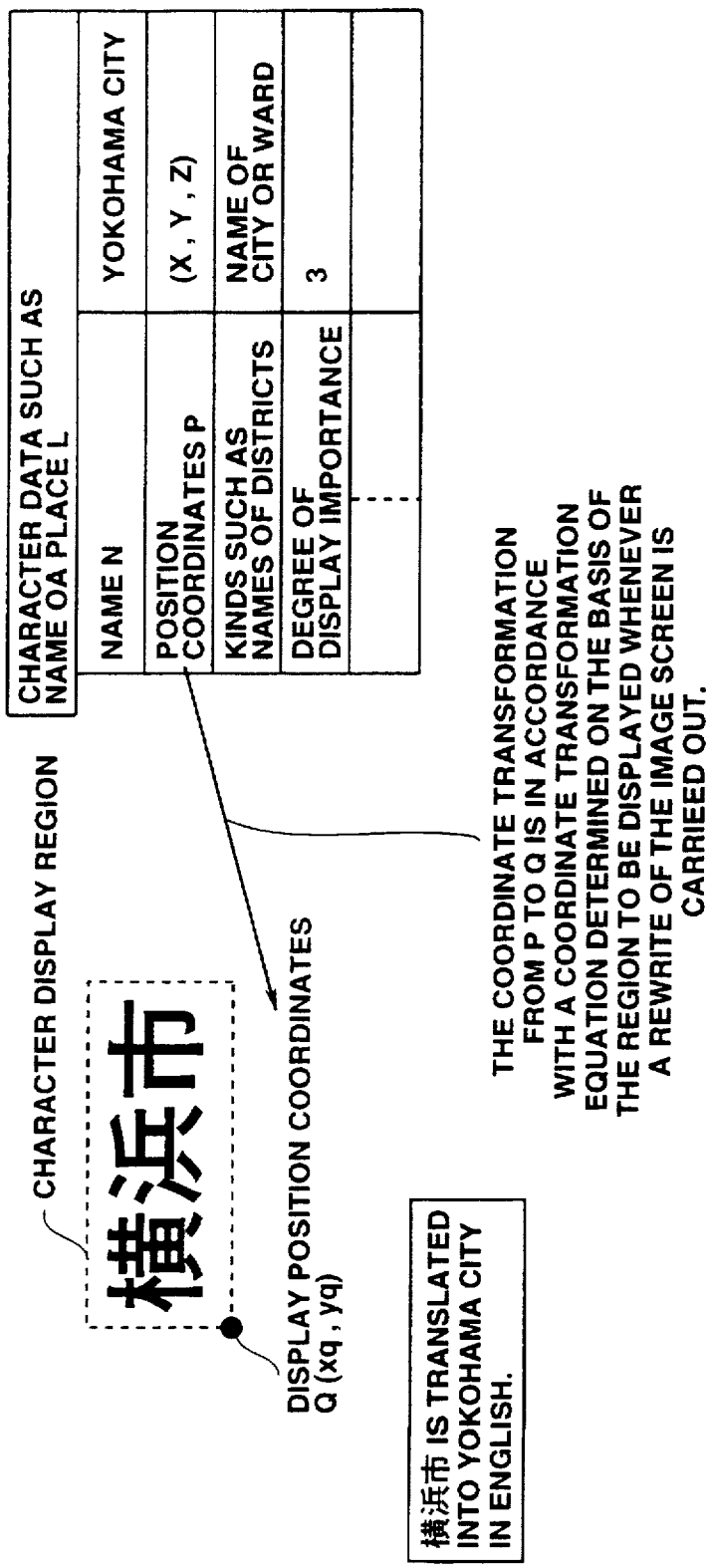
FIG. 43A is an explanatory view for explaining a content of information that a character data such as a name of place has.

On the other hand, if a character data L such a place of name as in FIG. 43A is present at the step S3050A (No), the CPU then sends the character data L to the minor region collation block 134a in which the CPU determines whether the character data such as the name of place is to be displayed to which region on the display image screen, namely, to which one of the minor regions the character data belongs at a step S3060.

Figure 43B:
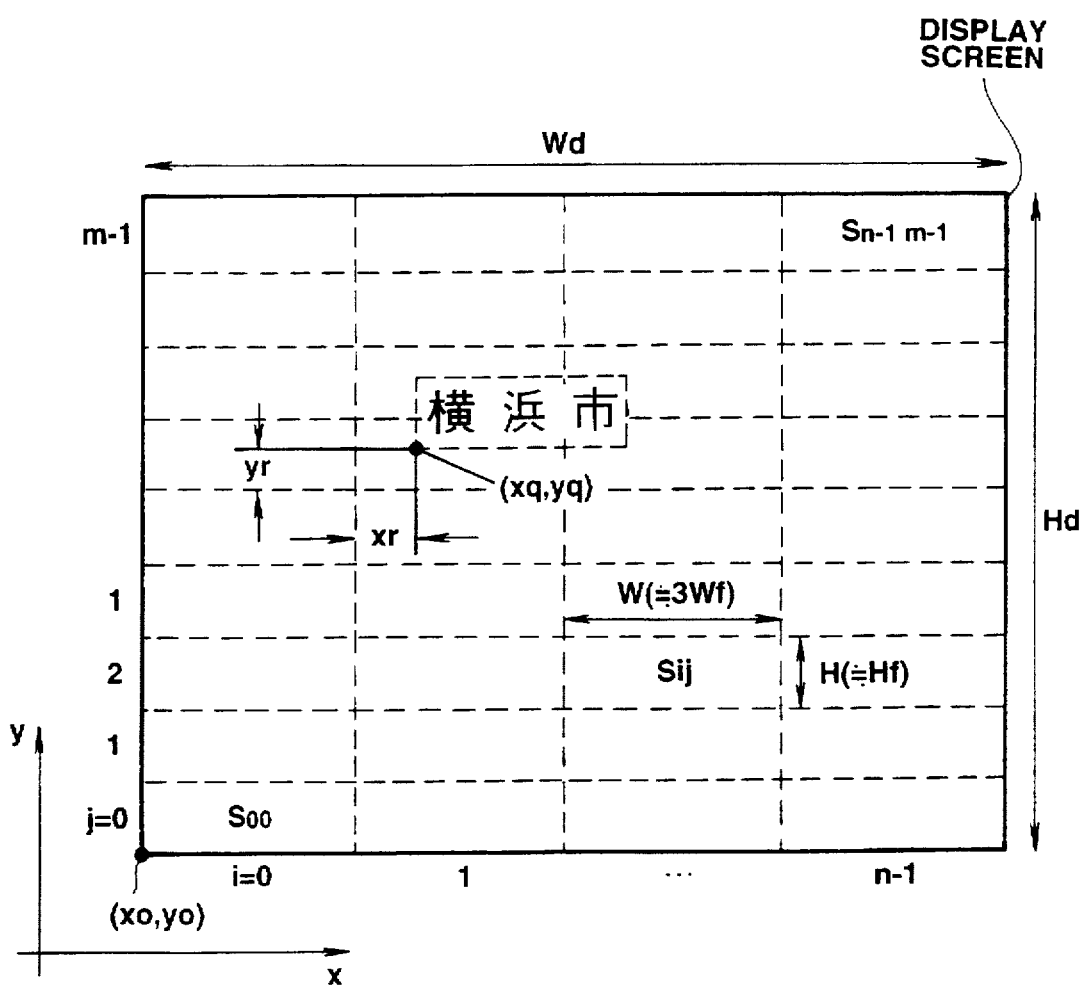
FIG. 43B is an explanatory view for explaining a division of the display screen into a plurality of minor regions and an image screen coordinate system.

Suppose herein that the displayed image screen is divided into minor regions having rectangular shapes of equal lengths (hence, hereinafter referred to as the minor region) as shown in FIG. 43B. In addition, each dimension of the respective minor regions is defined so that one name of place can be displayed within one of the minor regions, i.e., one name place for one minor region. For example, a height of each minor region denoted by H is made equal to a height Hf of a font displaying the name. For a width W of each minor region, a rough supposition is placed such that the name of almost all places are within three characters and the width W is made equal to three times as long as the font width Wf. However, this supposition is applicable to Chinese characters (kanji). In English characters, this supposition may be changed so that the width W can be made equal to three times or more as long as the font width Wf.

Furthermore, in the eleventh embodiment, in order to divide the whole display image screen into the sufficient quantities of minor regions having equal lengths in widths and heights, suppose that the width of the whole display image screen is Wd and the height thereof is Hd. Then, the width H and height H of each minor region is defined as follows:

$$W = Wd / \lfloor Wd/3Wf \rfloor \text{ and } H = Hd / \lfloor Hd/Hf \rfloor \tag{52}$$

In the equation (52), $\lfloor x \rfloor$ denotes a maximum integer which is not greater than x.

Thus, it is guaranteed that the displays of the character data such as the name of places belonging to the respective minor regions are not overlapped (superimposed) on each other for the two minor regions (not adjoined) between which one or more of the minor regions are inserted provided that each of the name of places are within the above-described supposition (,i.e., three characters in Chinese characters).

The character data L such as the name of place supplied to the minor region collation block 134a is provided with the display position coordinates Q (xq, yq) which are transformed in the image coordinate system. The image coordinate system is a two-dimensional coordinate system in which a right direction of the screen is denoted by x and an upper direction of the screen is denoted by y. And, suppose that a point of the left-handed lowest corner is represented by (x0, y0).

In addition, suppose that the minor regions are aligned by n-th numbers in the x direction and are aligned by m-th numbers in the y direction and the total number of the minor regions are n×m.

As appreciated from the equation (52), $$n = \lfloor Wd/3Wf \rfloor, \ m = \lfloor Hd/Hf \rfloor \tag{53}$$

Suppose herein that one of the minor regions which is located at an (i+1)-the number on the left direction and at a (j+1)-the number on the upper direction is denoted by $S_{ij}$ (0≤i≤(n−1), 0≤j≤(m−1)).

Thus, at the step S3060, the position of the minor region $S_{ij}$ to which the given character data L such as the name of place belongs is derived in the following equation:

$$i = \lfloor (xq-x0)/W \rfloor, \ j = \lfloor (yq-y0)/H \rfloor \tag{54}$$

It is noted that in a case where either of the position index of i or j is not within a range of 0≤i≤(n−1) or (0≤j≤(m−1) (at a step S3070), the corresponding character data L such as names of places are ignored in the eleventh embodiment since these character data L are not displayed on the screen.

At a step S3080, when the position of one of the minor regions to which the character data L such as the name of place belongs is determined by the minor region collation block 134a, the position described above on the minor region is stored at a memory location corresponding to the display character data candidate storage block 134b.

The display character data candidate storage block 134b is a temporary register which is so constructed as to temporarily store the character data such as name of place corresponding to one sheet of the images to be displayed at once of image framing operation and its content of the temporary register is cleared and initialized.

Table 3 shows a structure of the display candidate character data storage block 134b in the eleventh embodiment.

As shown in Table 3, the display candidate character data storage block 134b stores a name N corresponding to one character data such as the name of place, a relative display position (xr, yr), and an attribute of the name of place, these data belonging to each of the n×m number of the minor regions.

The attribute of the name of place is a kind of information previously given to the character data such as the name of place in the external memory 110AA and indicates a kind such as the name of place represented by the character data and a degree of importance as the displayed character data (degree of display importance).

The relative display position coordinates (xr, yr) represent relative coordinates of the display position coordinates (xq, yq) to the left lowest point of the minor region $S_{ij}$ to which the character data L such as the name of place belongs (refer to FIG. 43B) and are derived as follows:

$$xr = xq - xo - i \cdot W,$$
$$yr = yq - yo - j \cdot H \tag{55}$$

Referring to FIG. 34, at a step S3080, in order to store the character data L such as name of place whose minor region position (i, j) is derived by means of the minor region collation block 134a into the display character candidate data storage block 134b, the comparison/calculation block 134c (the CPU) determines whether the character data L such as name of place satisfies a previously given display condition. If satisfies the condition, the comparison/calculation block 134c stores it into the corresponding memory location of the display character data candidate storage block 134b.

It is noted that the previously given display condition is such a selection criterion as to select one of the character data such as name of place belonging to the same minor region, the selected one being actually displayed on the image screen. For example, various conditions such as a) through f) are considered:

a) A partial region is defined within each of the minor regions $S_{ij}$ so that the display position coordinates (xq, yq) represent only the character data such as name of place present in this partial region.

For example, suppose that the name N of the character data L such as the name of place is displayed within the rectangular shaped region with the display position coordinates (xq, yq) as the left lowest corner (left lowest point). Then, if a left lower quarter of each minor region $S_{ij}$ is considered to be the partial region and only the character data such as the name of place having the display position coordinates is displayed, the superimposed displays of the character data L can be reduced.

b) The display position coordinates (xq, yq) are displayed with the selection of their coordinates as a nearest to the left lowest corner of the minor regions $S_{ij}$, for example, a minimum one of a sum of the values of the x, y coordinates (xr+yr) of the relative display position (xr, yr) or of a square ($xr^2+yr^2$) of the relative display positions which indicates the distance thereof from the left lowest corner.

c) The minimum one of the y coordinate value yr of the relative display position is selected and displayed. For example, in a case where the navigating apparatus in the eleventh embodiment displays the bird's eye view to which the road map is perspectively projected, the smaller value in the y coordinate means that the relative display position comes nearer to the view point of the bird's eye view.

d) On the contrary to the case of c), the maximum one of the y coordinate values yr of the relative display position is selected and displayed. For example of the bird's eye view, the larger value in the y coordinate means that the relative display position comes remoter from the view point.

e) One of the character data which has the highest degree of importance of display given to the individual character data such as names of places as the attribute of the name of place is selected and displayed.

f) The character data which satisfies the plurality of conditions is displayed, the conditions including an arbitrary combination of the two or more conditions described in the items a) through e) or another condition.

The algorithm which achieves the step S3080 is varied according to the definitions of the display conditions. However, in the eleventh embodiment, the algorithm at the step S3080 is in accordance with an operational flowchart of FIG. 35.

That is to say, at a step S4010, the comparison/calculating block 134c calculates the relative display position (xr1, yr1) to the given character data L1 such as the name of place using the equation (55).

At a step S4020, the comparison/calculation block 134c determines whether the calculated relative display position (xr1, yr1) is present at the left lowest quarter of the minor region $S_{ij}$ according to $xr1 \leq W/2$, $yr1 \leq H/2$.

If neither xr<W/2 nor yr1≦H/2 at the step S4020, the subroutine is ended since the character data L is not displayed and is not stored in the display character data candidate storage block 134b.

If Yes at the step S4020, the subroutine goes to a step S4030 in which the comparison/calculating block 134c determines whether character data such as the name of place already stored within the same minor region $S_{ij}$ as the display candidate is present or not in the corresponding memory location of the display character data candidate storage block 134b.

If no character data such as the name of place already stored is present at the step S4030, the subroutine goes to a step S4070 supposing that the character data L1 such as the name of place is displayed.

At the step S4070, the comparison/calculation block 134c commands to store the name of place N, the attribute of the name of place, and relative display position (xr1, yr1) into their corresponding memory locations.

If the character data such as the name of place L2 already stored is present at the step S4030, the subroutine goes to a step S4040 in which a sum of the relative display position coordinate values (xr1+yr1) and (xr2+yr2) are compared for the character data L1 and L2 such as name of places.

That is to say, at the step S4040, xr1+yr1>xr2+yr2, xr1+yr1=xr2+yr2, and xr1+yr1<xr2+yr2. In details, three series of comparisons described above are made at the step S4040. Specifically, at a first step of the step S4040, a first comparison whether xr1+yr1>xr2+yr2 is made, at a second step of the step S4040, a second comparison whether xr1+yr1<xr2+yr2 is made, and, at a third step of the step S4040, a third comparison whether xr1+yr1=xr2+yr2 is made.

If xr1+yr1<xr2+yr2 at the step S4040, the comparison/calculation block 134b rewrites the information of the character data L1 such as the name of place as the display candidate into the corresponding memory location of the display candidate character data storage block 134b at a step S4070. In addition, if xr1+yr1>xr2+yr2 at the step S4040, the processing is ended with the character data L2 maintained as the display candidate and without updating of the display candidate character data storage block 134b. Furthermore, if xr1+yr1=xr2+yr2 at the step S4040, the subroutine goes to a step S4050 in which the comparison/calculation block 134b determines whether three times comparisons are made such as yr1=yr2, yr1>yr2, and yr1<yr2.

Specifically, if not yr1=yr2, yr1>yr2. Then, if not yr1>yr2, yr1<yr2.

Then, if yr1<yr2 at the step S4050, the display candidate character data storage block 134b is updated by the information of the character data L1 such as the name of place. If yr1=yr2 at the step S4050, the subroutine goes to a step S4060.

Figure 35:
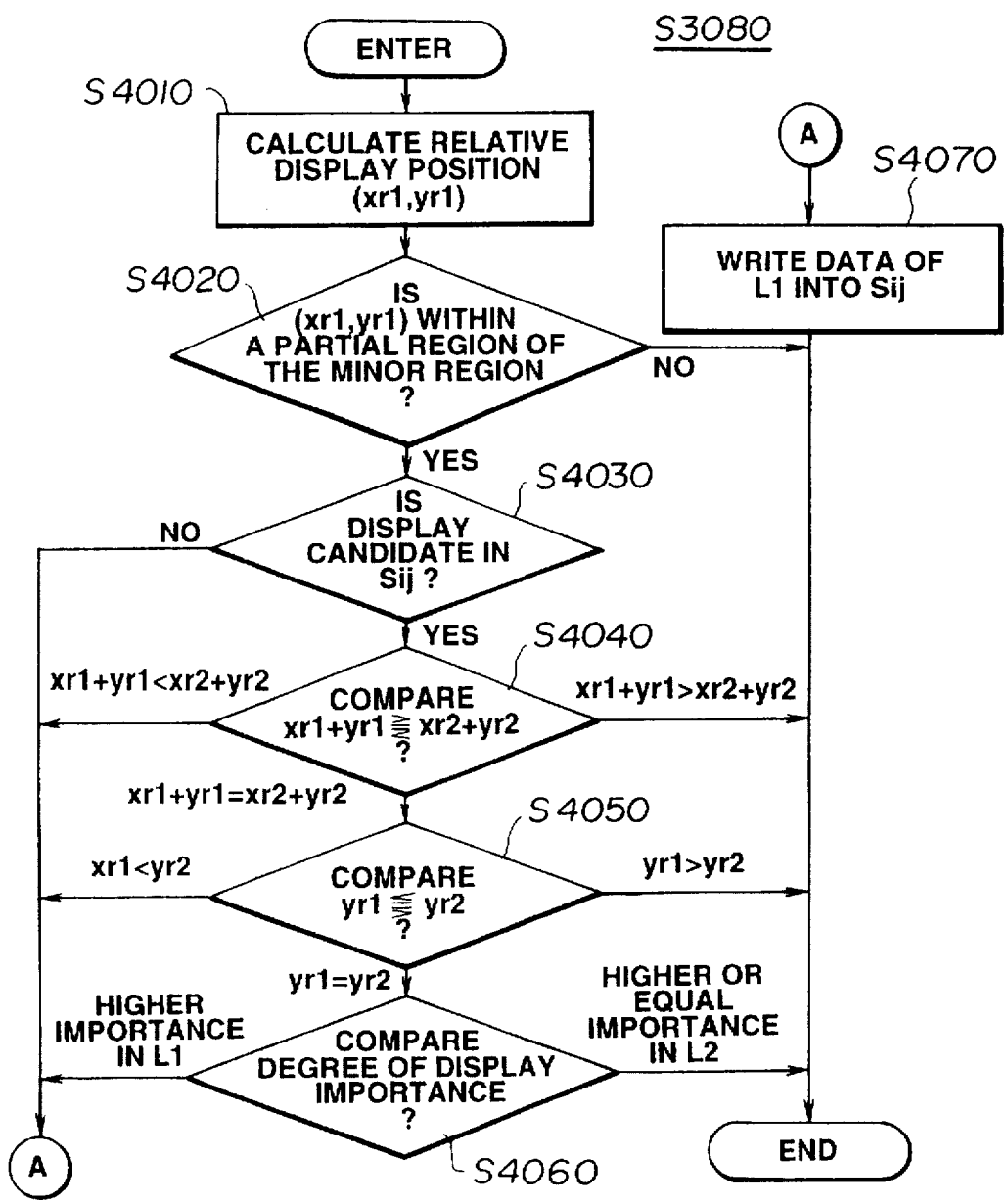
FIG. 35 is an operational flowchart for explaining a subroutine at a step S3080 shown in FIG. 34.

At the step S4060, if the degree of display importance of the character data L1 is higher than that of the character data L2, the display character candidate storage block 134b is updated. It is noted that if no difference between the character data L1 and the character data L2 is admitted at all series of comparisons described above, the display candidate is maintained as the character data L2 and no updating is carried out for the display candidate character data storage block 134b in order to suppress the reduction of the processing speed and then the processing of FIG. 35 is ended.

Referring back to FIG. 34, at a step S3090, the road map graphic data is output to the image display block 1400. At a step S3080, the updating of the display candidate character data storage block 134b is carried out for the character data such as the name of place according to its necessity.

Next, at a step S3100, the CPU determines whether the series of processing in FIG. 34 has been carried out for all data held in the data access block 132AA.

If an one of unprocessed data is left at the step S3100, the routine again returns to the step S3040 and the processing (steps S3040 through S3090) after the coordinate transformation is repeated. If the data to be displayed are not left at the step S3100, the display character data selection block 134AA transmits the individual character data such as names of places stored in the display candidate character data storage block 134b sequentially to the image data output block 135AA so as to output the image data to the image display block 140AA at a step S3110.

At this step S3110, the relative display position (xr, yr) is transformed into the display position coordinate (xq, yq) in the image screen coordinate system according to an inverse calculation of the equation (55).

Alternatively, the display character data candidate storage block 134b may have the memory structures in which (xq, yq) are stored previously together with (xr, yr) so that only (xq, yq) are supplied to the image data output block 135AA when required.

Next, at a step S3120, such an image processing as the clipping is carried out for all of the display character data candidates transmitted via the image data output block 135AA.

At the step S3120, the CPU simultaneously confirms whether the road map display processing is continued or not when all display character data candidate are transmitted to the image display block 140AA. If the CPU confirms that the road map display processing is continued, the routine returns to the first step S3010 to update the image screen and the clearing of the display candidate character data storage block 134b is repeated and the main routine process of FIG. 34 is repeated.

As described above, the navigating apparatus in the eleventh embodiment selects and displays one of the character data such as the names of places present in the same minor region on the basis of the division of the image screen into the previously defined plurality of the minor regions. Since no change in the character displayed positions occurs to avoid the superimposition of the displayed characters and no calculation of the mutual superimposition (overlapping) of the individual character data such as the names of places is carried out, the quantity of calculations can remarkably be reduced so that a high system performance of easy grasping of the road map display in the bird's eye view mode can be achieved.

In addition, since the degree of importance as the attribute of the character data such as names of places is taken into consideration when the determination of the overlapping (superimpose) of the character data such as names of places is carried out, the display of a more required road map information can be assured and a more effective road map display can be achieved.

(Twelfth Embodiment)

Figure 36:
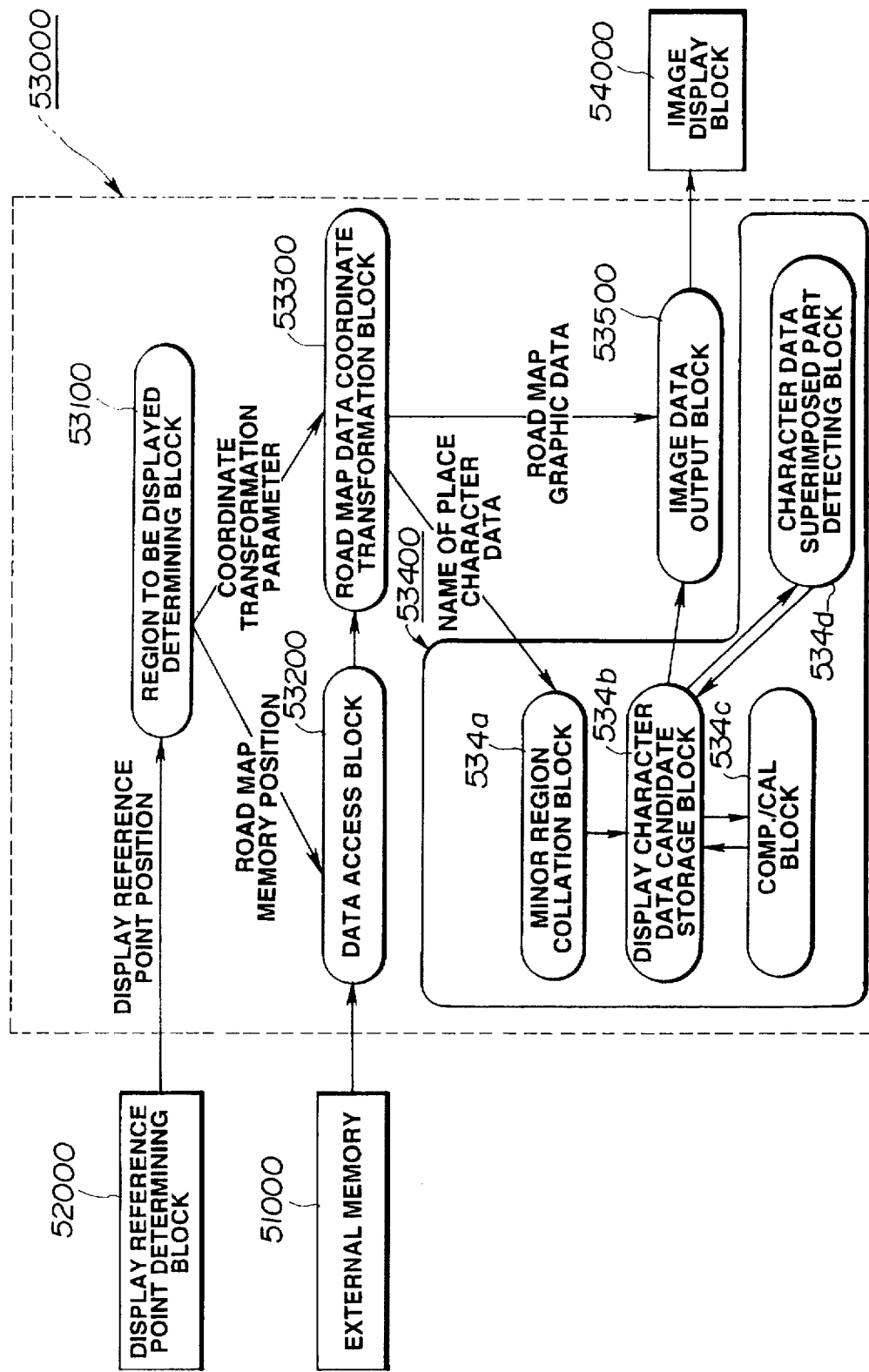
FIG. 36 is a functional block diagram of a twelfth preferred embodiment of the navigating apparatus according to the present invention.

FIG. 36 shows a functional block diagram of a twelfth preferred embodiment of the navigating apparatus according to the present invention.

The navigating apparatus in the twelfth embodiment includes: the external memory block 51000; the display reference point determining block 52000; the calculation processing block 53000; and image display block 54000.

The calculation processing block 53000 includes: the region to be displayed determining block 53100; the data access block 53200; the road map data coordinate transformation block 53300; the display character data selection block 53400; and the image data output block 53500.

In the navigating apparatus of the twelfth embodiment, a character data superimposed part detecting block 534d is added in the display character data selection block 53400. The other functions of the respective blocks are the same as those in the eleventh embodiment (as shown in FIG. 33).

The display character data selection block 53400 includes: the minor region collation block 534a; the display character data candidate storage block 534b; the comparison/calculation block 534c; and the character data superimposed part detecting block 534d.

The memory structure of the display character data candidate storage block 534b in the twelfth embodiment is shown in Table 4.

As shown in Table 4, the display character data storage block 534b stores the name N of one of the individual character data such as the names of places belonging to the corresponding one of the minor regions having the numbers of n×m, the relative display position (xr, yr), the attribute of the name of place, the number of superimpositions; and degrees of superimpositions thereof onto the respectively remaining character data such as the name of place placed at the left side, upper and lower sides, and the right side minor regions.

The details of the memory contents in the display character data candidate storage block 534b will be described later.

Figure 37:
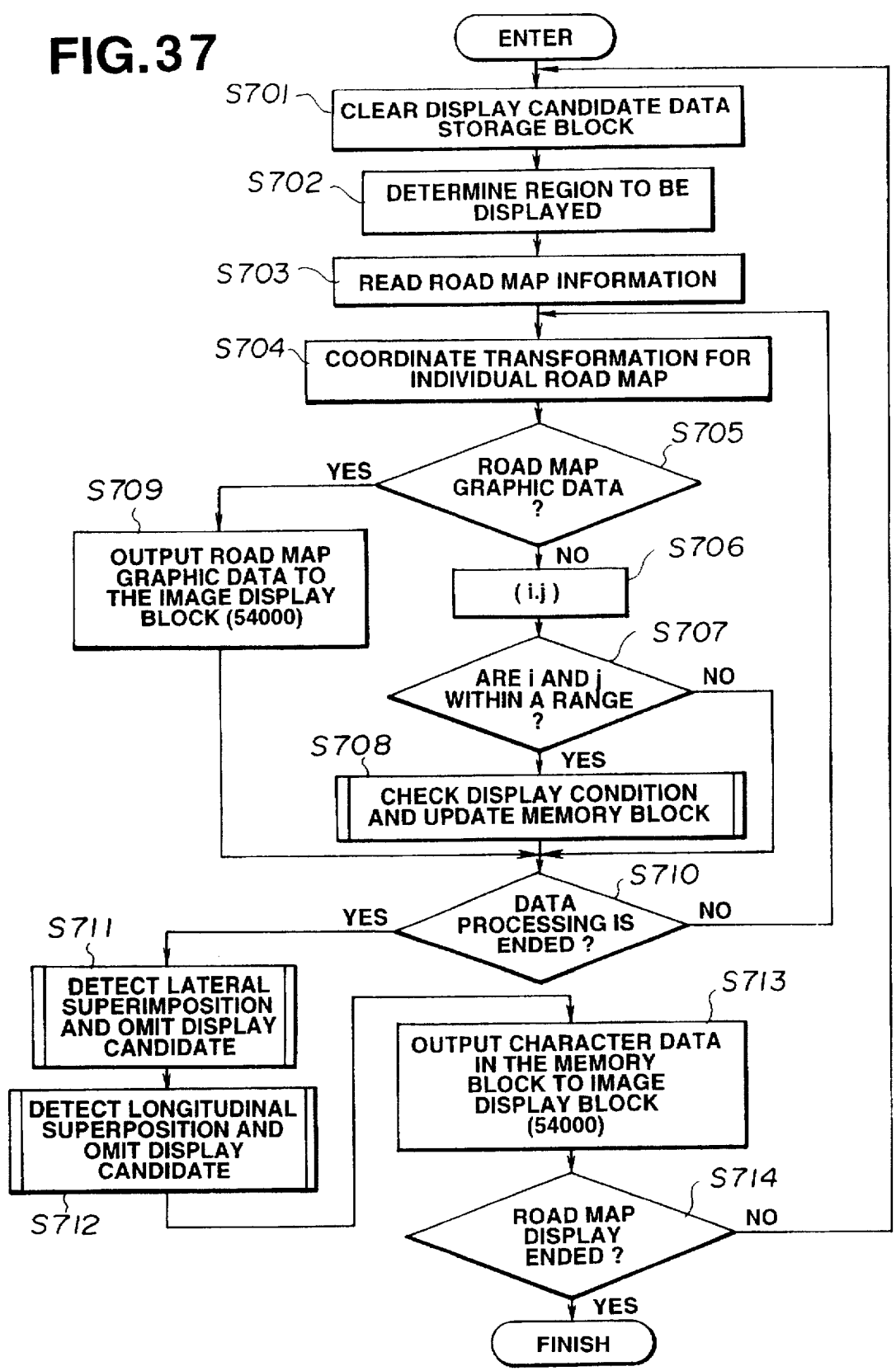
FIG. 37 is an operational flowchart for explaining an operation in the twelfth embodiment shown in FIG. 36.

FIG. 37 shows an operational flowchart for explaining an operation of the navigating apparatus in the twelfth embodiment.

The contents of steps S701 through S710 shown in FIG. 37 are the same as those of the steps S3010 through S3100 shown in FIG. 34 in the previous eleventh embodiment.

Figure 38:
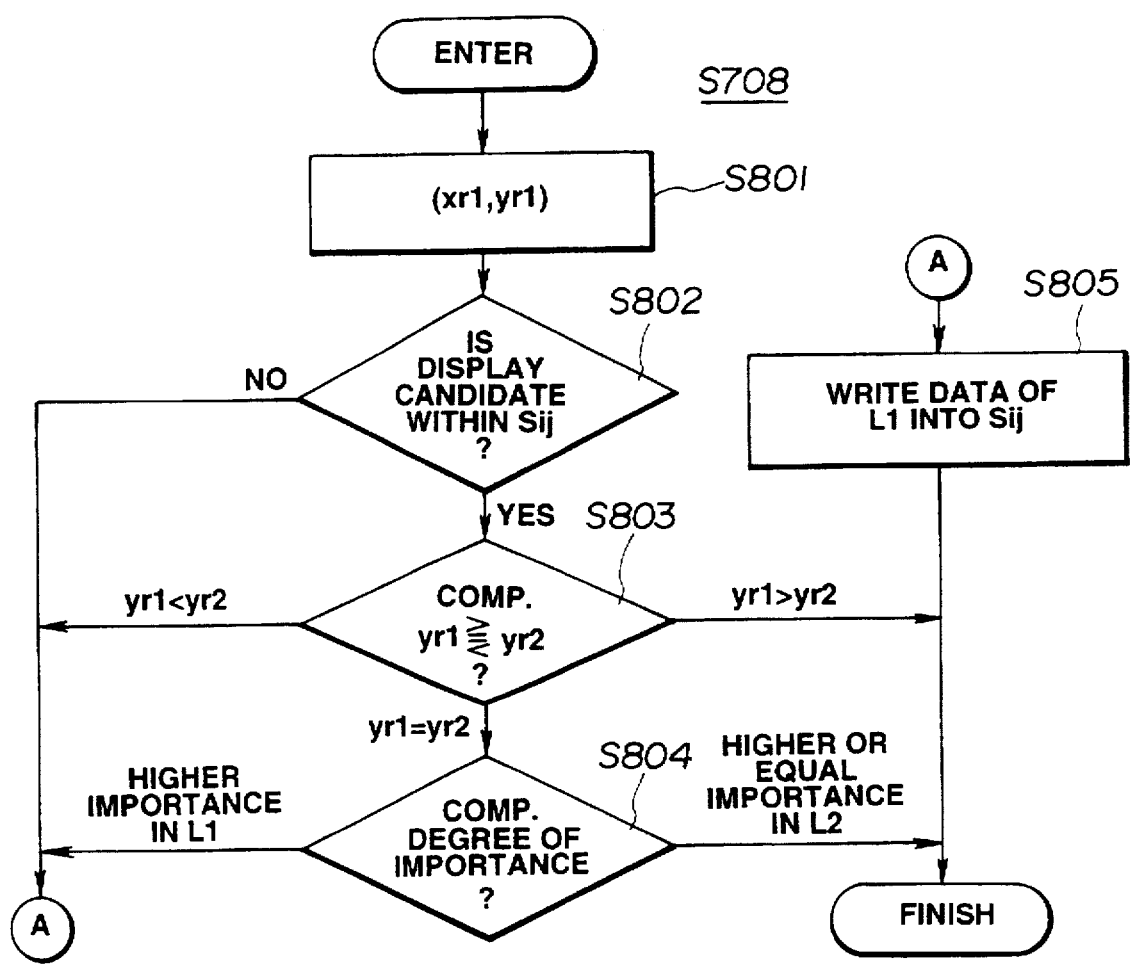
FIG. 38 is an operational flowchart for explaining a subroutine at a step S708 shown in FIG. 37.

However, it is noted that in the twelfth embodiment the comparison calculation at the step S708 is executed in the procedure indicated by the flowchart of FIG. 38 which is simpler than FIG. 35 in the eleventh embodiment.

This is because in order to detect the overlapping (superimposition) of the mutual character data between the adjacent minor regions (this detection is not carried out in the eleventh embodiment), the display conditions of the character data such as the names of places are relaxed (less strict) (the conditions to be stored into the display character data candidate storage block 534b) so as to reduce the quantities of calculations and as to suppress the reduction of the processing speed. It is of course that the execution at the step S708 may be in accordance with the procedure of FIG. 35 in the same way as in the eleventh embodiment.

Hence, the explanations of steps S801 through S805 are omitted herein.

Referring to FIG. 37, the graphic data coordinate transformation block 533 carries out the coordinate transformation. If it is the road map graphic data, the road map graphic data are output to the image display block 54000 via the image data output block 53500. If it is the character data, for such a procedure that the contents of the display character data candidate storage block 534b are updated according to the necessity, all of the road map information held by the data access block 53200 are ended. At a step S711, then, the character data superimposition detecting block 534d detects the superimposition of the laterally aligned character data such as the name of place which are the display candidates.

If necessary, the comparison/calculation block 534c erases a part of the superimposed character data from the contents of the display character data candidate storage block 534b.

Figure 39:
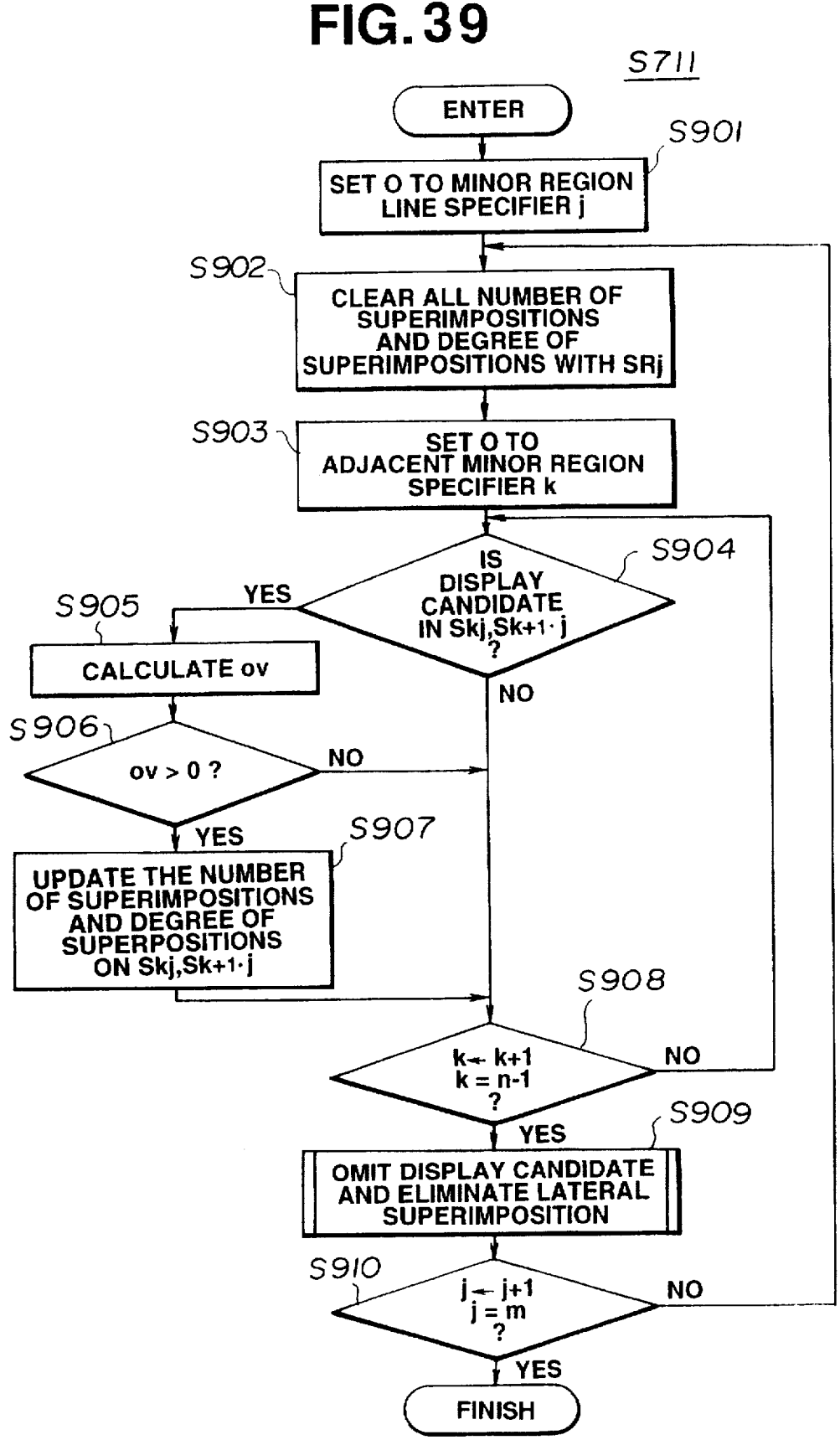
FIG. 39 is an operational flowchart for explaining a subroutine at a step S711 shown in FIG. 37.

FIG. 39 shows an operational flowchart for explaining the procedure in a step S711 shown in FIG. 37.

Hereinafter, the n numbers of the minor regions $S_{0j}$, $S_{1j}$, - - -, $S_{(n-1)j}$ located at the (j+1)–the number position on the lower direction are integrally referred to as a minor region row, i.e., $SR_j$. Since the detection of the character data superimposition in the lateral direction and omission (erasure or decimation) in display of the display candidates are carried out independently of each of the m number of the minor region rows, 0 is set to a minor region row identifier j at a step S901.

Next, at a step S902, the character data superimposition detecting block 534d clears the number of superimpositions (superpositions) on respective remaining character data and the degree of superimpositions thereof within the corresponding memory locations of the display character data candidate storage block 534b corresponding to the n number of the minor regions for the given minor region row $SR_j$ to 0s.

At a step S903, a specifier (designator) k is set to 0 in order to search for the presence or absence of the superimposition for each ($0 \leq k \leq (n-2)$) of the combination of the adjacent two minor regions ($S_{kj}$, $S_{(k+1)j}$). Thereafter, at a step S904, the CPU searches for the memory locations corresponding to ($S_{kj}$, $S_{(k+1)j}$) of the display character data candidate storage block 534b for determining whether the character data such as the name of place which is the display candidate belonging to both mutually adjacent minor regions ($S_{kj}$, $S_{(k+1)j}$).

If, at the step S904, the character data is not present in at least either one of the two adjacent minor regions, 1 is added to the specifier k to shift the same processing to the subsequent two adjacent minor regions at a step S908.

If, at the step S904, the character data $L_k$ is present in the minor region $S_{kj}$ and the character data $L_{k+1}$ such as the name of place is present in the minor region $S_{(k+1)j}$, respectively, the degree of the superimposition ov is calculated on the basis of x coordinate values $xr_k$, $xr_{k+1}$ of their relative display positions at a step S905.

Figure 44:
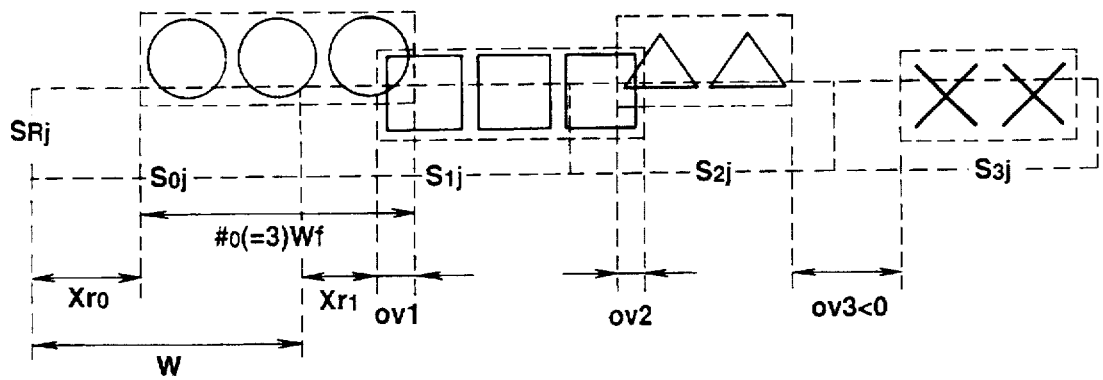
FIG. 44 is an explanatory view for explaining a method for calculating a degree of superimpositions in a detection of a lateral direction superimposition of character data.

FIG. 44 shows an explanatory view for explaining a method for calculating the degree of the superimposition at the detection of the lateral superimposition and the content of the display character data candidate storage block 534b.

As shown in FIG. 44, reference origins of the x coordinate values $xr_k$, $xr_{(k+1)}$ of the relative display positions are remote from each other by the width W of one of the minor regions, the difference in the x coordinate of the display position of the two character data such as the names of places is ($xr_{(k+1)}+W$)−$xr_k$. On the other hand, if the number of characters for the name $\#_k$ is derived from the name $N_k$ of the character data $L_k$ such as the name of place, suppose that the difference between both x coordinate values is the degree of the superimposition ov since the display width of the name $N_k$ is $\#_k \cdot Wf$ using the font width Wf.

That is to say, $$ov = (\#_k \cdot Wf - W) + (xr_k - xr_{(k+1)}) \quad (56).$$

Alternatively, on the basis of the rough supposition when the minor region width W is determined, i.e., "the most name of place is within three consecutive characters" (this rough supposition is applicable to the Chinese characters as described in the eleventh embodiment), the number of characters of the name #=3 for all character data L such as the name of place. Then, since W≈3Wf according to the equation (52), the first term of the equation of (56) is deleted and then the following equation is established:

$$ov = xr_k - xr_{(k+1)} \quad (57).$$

It is noted that the calculation of the degree of superimposition ov may be carried out using either of the equation (56) or (57).

Next, if the calculated degree of the superimposition ov is 0 or less (No) at the step S906, the character data superimposition detecting block 534d determines that no superimposition is provided for the character data $L_k$ and $L_{(k+1)}$ and shifts the processing to the subsequent adjacent minor regions at a step S908.

If, at the step S906, the degree of the superimposition is positive, the character data superimposition detecting block 534d updates the content of the corresponding memory locations of the display character data candidate storage block 534b at a step S907 since the character data $L_k$ is mutually superimposed on the right side character data $L_{(k+1)}$ and, on the contrary, the character data $L_{(k+1)}$ is mutually superimposed on the left character data $L_k$, respectively.

That is to say, the number of superimpositions is increased by one for the minor region $S_{kj}$ and ov is written into the degree of the superimposition at the right side. In addition, the number of the superimpositions is increased by one for the minor region $S_{(k+1)j}$ and ov is written into the degree of the superimposition at the left side.

At a step S908, the above-described procedure of detection of the superimposition is repeated for the combination of the minor regions ($S_{kj}$, $S_{(k+1)j}$) whose specifier range is $0 \leq k \leq (n-2)$.

The result of this repetition is, for example, as shown in FIG. 44.

In this case of FIG. 44, the number of superimpositions for each minor region is 2.

Next, at a step S909, the comparison/calculation block 534c appropriately deletes the character data such as the names of places from the display character data candidate storage block 534b on the basis of previously given non-display conditions and sets the numbers of the superimpositions of all of the character data such as the names of places within the minor region row $SR_j$ to 0's.

The non-display (display inhibit) conditions described above are such.selection criteria as to select one of the character data which is not actually displayed on the image screen from among the character data such as the names of places which are display candidates having the number of superimposition of not 0.

For example, the non-display conditions are described below:

a) The display of any one of the character data which has the maximum number of the superimpositions is to be inhibited (not displayed);

b) The display of any one of the character data which has a maximum sum of the degree of superimpositions ov is to be inhibited (not displayed);

c) The display of any one of the character data which has a maximum of the maximum value of the degree of superimpositions ov, of the minimum value of the degree of superimpositions ov, or of an average value thereof ov is to be inhibited (not displayed);

d) The display of any one of the character data such as the names of places which has the maximum or minimum of the y coordinate values yr of their relative display positions is to be inhibited (not displayed). In the case of the bird's eye view, this means that it is far way from the view point or nearest to the view point;

e) The display of any one of the character data such as the names of places which has the lowest degree of importance of display previously given as the attribute of the name of place is to be inhibited (not displayed).

f) Any one of the character data which is selected from an arbitrary combination of two or more non-display conditions of a) to e) and/or other non-display conditions is to be inhibited (not displayed).

Figure 40:
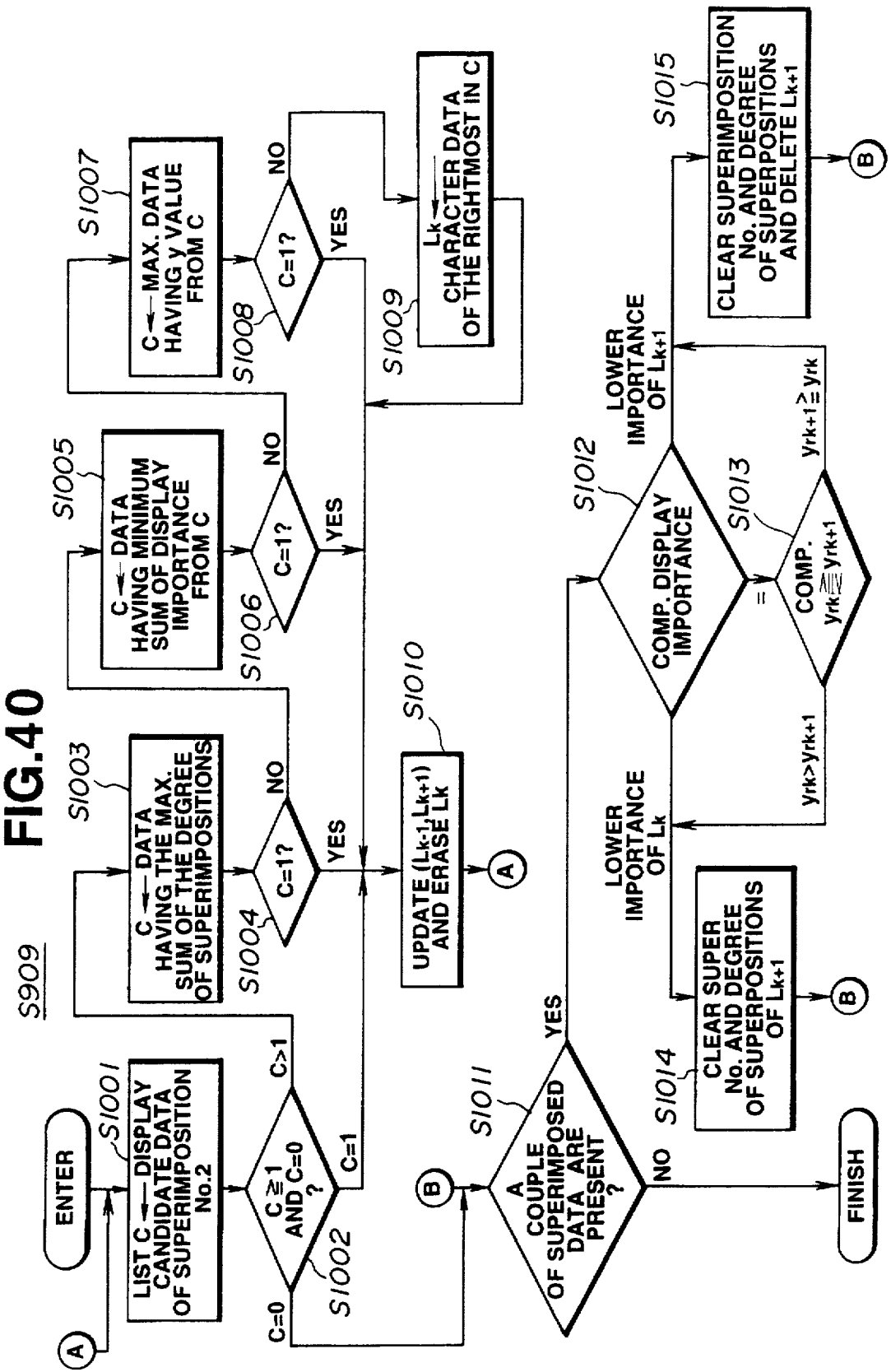
FIG. 40 is an operational flowchart for explaining a subroutine at a step S909 shown in FIG. 39.

FIG. 40 shows a subroutine of the step S909 shown in FIG. 39.

At a step S1001, the comparison/calculating block 534c (the CPU) selects any of the character data such as the names of places having the number of superimpositions of 2s from among all of the display candidate character data within the minor region row SR and prepares a non-display candidate list C.

Then, at a step S1002, the CPU (comparison/calculation block 534c) searches for a number of elements in the non-display candidate list C to determine whether the number of the elements in the list C is 0, 1, or plural. The number of elements is the number of character data included in the list C.

If the number of elements is zero (empty) at the step S1002, the routine shifts the processing of deletions of the character data such as the names of places having the number of superimpositions of is after a step S1011.

If the number of elements, i.e., the character data such as the names of places indicates only 1 in the list C at the step S1002, the subroutine goes to a step S1010 in which the CPU (comparison/calculation block 534c), at a step S1010, deletes (erases) the character data such as the name of place $L_k$ from the display character data candidate storage block 534b.

If the number of elements, i.e., the character data such as the names of places indicate the plurality of character data such as the names of places includes in the non-display candidate list C at the step S1002, the CPU (comparison/calculation block) selects any one of the listed character data which has the maximum sum of the degree of the superimpositions ov and incorporates the selected character data in the list C to prepare again the non-display candidate list C at a step S1003.

Again, at a step S1004, the CPU (comparison/calculation block 534b) searches for the number of the elements in the non-display candidate list C to determine whether the number of the character data included in the new non-candidate list C is 1 or not.

If not 1 at the step S1004, i.e., the plurality of the character data such as the names of places which have equally the maximum sums of the degrees of the superimpositions ov, the CPU (comparison/calculation block 534b) selects any one of the listed character data which has a lowest degree of importance and incorporates again the selected character data in the non-display candidate list C to prepare again the non-display candidate list C at a step S1005.

In the same way, if the number of the elements are determined to be the plurality of character data such as names of places in the non-display candidate list C at a step S1006, the CPU (comparison/calculation block 534b) selects any one of the character data such as the names of places whose y coordinate values yr of relative display positions are at the maximum and incorporates the selected character data into the list C to prepare again the non-display candidate list C at a step S1007.

If the plurality of character data such as the names of places are left in the non-display candidate list C (No) at a step S1008, these character data are to be displayed at a rightmost of the image screen. That is to say, the subroutine goes to a step S1009 in which the CPU (comparison/calculation block 534c) selects the character data such as the name of place belonging to the minor region $S_{kj}$ whose lateral directional position k is the maximum.

In the above-described procedures of the steps S1002, S1004, S1006, and S1008, when the character data such as the name of place included in the non-display candidate list C is only 1, i.e., only $L_k$, the subroutine goes to the step S1010 in which this character data $L_k$ is erased from the display character data candidate storage block 534b.

At the step S1011, in order to erase the character data such as the name of place, the memory content of any of the character data which are superimposed on the character data $L_k$ is updated. Since the number of superimpositions of the character data $L_k$ indicates 2, the character data on which the above-described character data $L_k$ is superimposed are two of $L_{k-1}$ and $L_{k+1}$. Therefore, the number of superimpositions of the minor region $S_{(k-1)j}$ to which the character data $L_{k-1}$ belongs are reduced by one and the degree of its superimposition at the right side is cleared to 0. In addition, the number of the superimpositions of the minor region $S_{(k+1)j}$ to which the character data $L_{k+1}$ belongs are reduced by one and the degree of superimposition at the left side thereof is cleared to 0. Thereafter, the character data $L_k$ is erased from the display character data candidate storage block 534b. That is to say, the memory contents corresponding to the minor region $S_{kj}$ are all cleared and the number of the superimpositions are cleared to 0s.

Referring back to the step S1001 of FIG. 40, the above-described procedures are repeated until the character data having the number of the superimpositions of 2 within the minor region row $SR_j$ are eliminated and the erasure (deletion) of the character data having the number of the superimposition of 1 is thereafter carried out. If all of the character data have the number of superimposition of 1s, a couple ($L_k$ and $L_{k+1}$) of the mutually superimposed character data are independent of each other and have no common element. Then, at a step S1011, the comparison/calculation block 534c searches for such a couple of the character data as described above (determines whether such a couple of the character data as described above are present).

If no couple is present at the step S1011, this means that all of the character data such as the names of places have 0 number of superimposition. The comparison/calculation block 534c ends the processing of the subroutine and returns to the step S910 of the main routine shown in FIG. 39 in which 1 is added to the specifier k to execute the detection of the superimposition in the lateral direction of the next minor region row and a decimation (erasure) (skipping) of the display candidates of the next minor region row.

In details, if, at the step S1011, the couple of the character data such as the names of places ($L_k$ and $L_{k+1}$) on which the other character data is superimposed (Yes), the comparison/calculation block 534c compares the degrees of display importance of both of the couple at a step S1012 with each other.

If one of the degrees of display importance is lower than the other degree of display importance, the subroutine goes to a step S1014.

If each degree of display importance is equal, the subroutine goes to a step S1013 to select one of the character data whose y coordinate value yr of the relative display positions is larger. However, if, at the step S1013, yr(k+1) =yrk, the character data $L_{(k+1)}$ is the data to be deleted (erased).

If the character data to be deleted are determined at either of the steps S1012 or S1013, at both steps of S1014 and S1015, for either one of the character data $L_{(k+1)}$ or $L_k$, the number of the superimposition and the degree of the superimposition is cleared to 0 and the memory contents of the character data to be deleted are cleared to 0s.

Then, the subroutine returns to the step S1011.

At the step S1011, after the processing such that the number of the superimpositions of all of the character data within the minor region row $SR_j$ indicates 0s is repeated, the comparison/calculation block 534c (the CPU) ends their series of functions described above and the routine returns to the step S910 in which 1 is added to the specifier k and returns to the step S902 in order to execute the detection of the lateral direction superimposition of the next minor region row and the decimation (skipping) thereof.

In this way, when the lateral direction superimposition detection and decimation (erasure) of the character data for all of the minor region rows $SR_j$ ($0 \leq j \leq (m-1)$) are ended, the routine returns to the step S712 of FIG. 37.

Next, at the step S712, the detection of the superimposition of the character data such as the names of places as the display candidates in the longitudinal direction and the erasure thereof from the display character data candidate storage block 534b are carried out.

Figure 41:
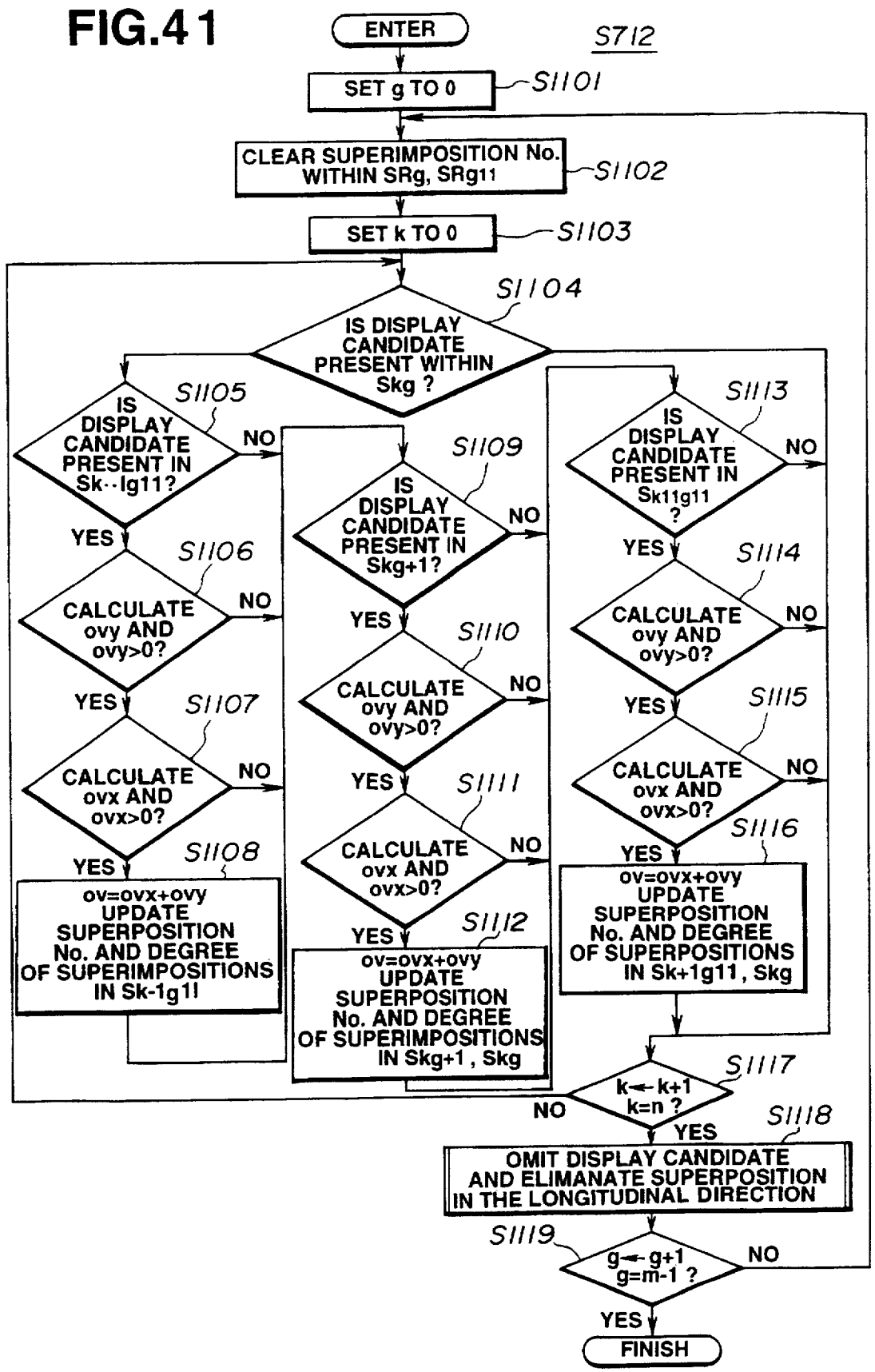
FIG. 41 is an operational flowchart for explaining a subroutine at a step S712 shown in FIG. 37.

FIG. 41 shows a subroutine of the step S712 of FIG. 37.

At a step S1101, the comparison/calculation block 534c (the CPU ), at first, sets another specifier g to 0 since the detection of the superimposition in the longitudinal direction is carried out independently of each couple of two vertically adjacent minor region rows ($SR_g$ and $SR_{(g+1)}$) ($0 \leq g \leq (m-2)$).

At the next step S1102, the CPU (character data superimposition detection block 534d) clears the number of superimpositions and the degrees of the superimpositions within the memory contents of the display candidate character data storage block 534b corresponding to a 2n number of the minor regions $S_{0g}$, $S_{1g}$, - - - , $S_{(n-1)g}$, $S_{0(g+1)}$, $S_{1(g+1)}$, - - - , $S_{(n-1)(g+1)}$ in the given minor region row $SR_g$ and $SR_{(g+1)}$ to 0's. The specifier g is herein called the couple specifier.

At the next step S1103, in order to search for the superimposition(s) of the character data such as the name of place as the display candidate belonging to the minor region $S_{kg}$ on those of the display candidates belonging to the upper side three minor regions $S_{(k-)(g+1)}$, $S_{k(g+1)}$ and $S_{(k+1)(g+1)}$ for each of the minor regions $S_{kg}$ ($0 \leq k \leq (m-1)$) in the lowest side minor region row $SR_g$, the specifier k is set to 0.

A a step S1104, the CPU (comparison/calculation block 534c) determines whether the character data such as the name of place is present within the minor region $S_{kg}$.

If not present (No) at the step S1104, the subroutine goes to a step S1117 in which 1 is added to the minor region specifier k and the subroutine shifts the same processing as described above to the right-handed minor region. If the character data of the display candidate $L_{kg}$ is present in the minor region $S_{kg}$ (Yes) at the step S1104, the subroutine goes to a step S1105 to detect the superimposition in the longitudinal direction for each of the three adjacent minor regions $S_{(k-1)(g+1)}$, $S_{k(g+1)}$, and $S_{(k+1)(g+1)}$.

In order to simplify the above symbolic expression, these three adjacent minor regions are, herein, integrally denoted by the minor regions $S_{k(g+1)}$.

At steps S1105, S1109, and S1113, the CPU determines whether the character data such as the name of place as the display candidate is present within the minor region $S_{k(g+1)}$.

If not present (No) at each step of S1100, S1109, and S1113, the subroutine shifts the same processing to the next lower minor region $S_{kg}$ to the present K (namely, if K=k−1, K=k; if K=k, K=k+1) or K=k+1.

On the other hand, if the character data such as the name of place $L_{k(g+1)}$ as the display candidate is present therewithin, the subroutine goes to steps S1106, S1110, or S1114 in which the degree of the superimposition in the longitudinal direction denoted by ivy between the character data such as the names of places $L_{kg}$ and $L_{K(g+1)}$ is calculated on the basis of the y coordinate values $yr_{kg}$ and $yr_{k(g+1)}$ of the relative display positions.

Figure 45:
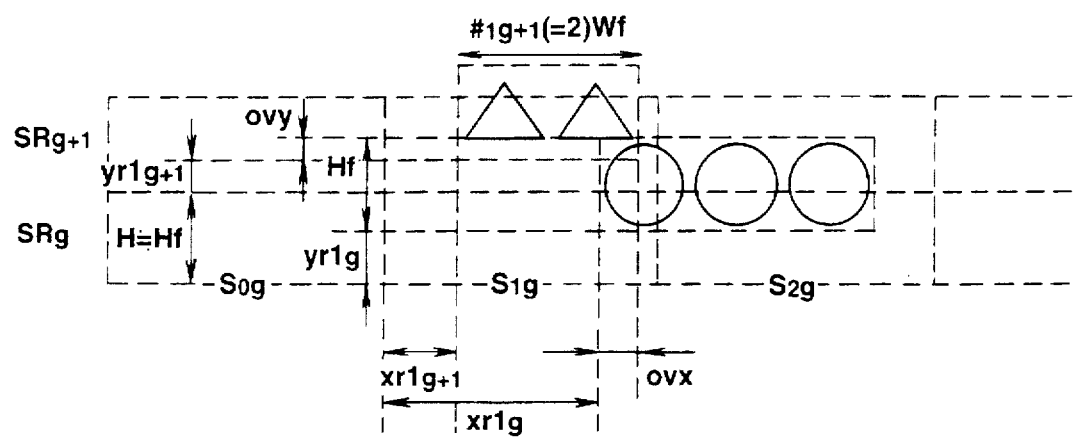
FIG. 45 is an explanatory view for explaining a method for calculating a degree of superimpositions in a y direction in a detection of a longitudinal superimposition.

Referring to FIG. 45 (k=K=1), the reference origins in the relative display position coordinates of the two character data such as the names of places are remote from each other in the y direction by the height H of each minor region. Since H is approximately equal to the display font height Hf according to the equation (52), the degree of the superimposition in the longitudinal direction ivy is calculated in the same way as that of (57) using the following equation.

$$ivy = yr_{kg} - yr_{k(g+1)} \qquad (58)$$

If, at steps S1105, S1110, and S1113, ivy is 0 or below 0, the CPU processes the next K or next lower minor region $S_{kg}$. On the other hand, if ivy indicates positive thereat, the degree of superimposition in the lateral direction ovx is calculated on the basis of the x coordinate values of the relative display positions $xr_{kg}$ and $xr_{k(g+1)}$ at steps of S1107, S1111, and S1114, respectively.

Figure 46:
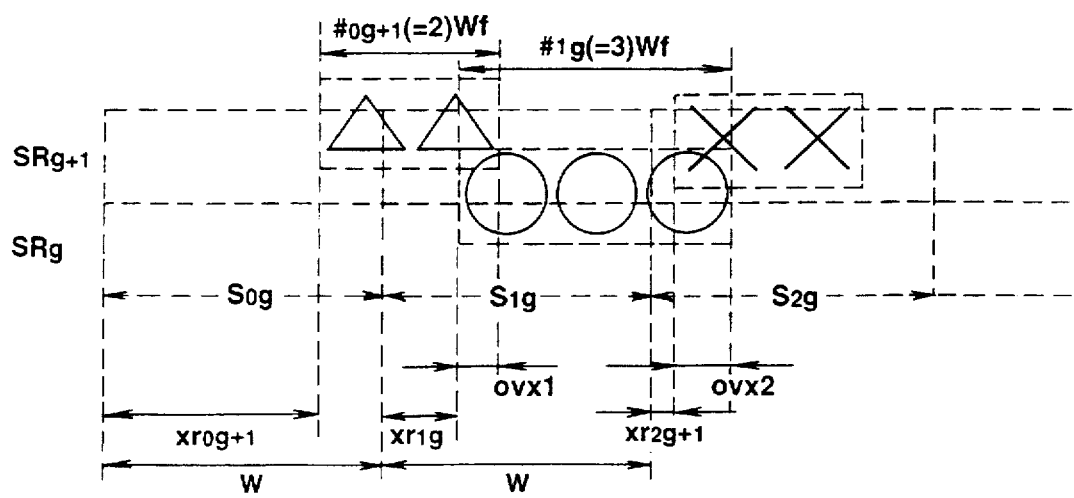
FIG. 46 is an explanatory view for explaining a method for calculating a degree of superimpositions in an x direction in a detection of a longitudinal superimposition.

In order to calculate the degree of the superimposition in the lateral direction between the character data $L_{(k-1)(g+1)}$ and $L_{kg}$ at the step S1107, the number of characters constituting the name of the character data $L_{(k-1)(g+1)}$ is denoted by $\#_{(k-1)(g+1)}$ since a length of the name of the character data as the display candidate $L_{(k-1)(g+1)}$ is extended in the right from the x coordinate value $xr_{kg}$ of the relative display position is ovx (refer to FIG. 46 in which k=1). Hence, the following equation is established:

$$ovx = (\#_{(k-1)(g+1)} \cdot Wf - W) + (xr_{(k-1)(g+1)} - xr_{kg}) \qquad (59)$$

Alternatively, if the number of characters of the name of all of the character data such as the names of places are 3 and $W \approx 3Wf$, the following equation may also be established:

$$ovx = xr_{(k-1)(g+1)} - xr_{kg} \qquad (60)$$

As the value of ovx, either of the equation (59) or equation (60) may be used.

In order to calculate ovx (degree of superimposition in the lateral direction) between the character data such as the names of places $L_{(k+1)(g+1)}$ and $L_{kg}$ at the step S1115, a length of the name of the character data $L_{kg}$ is extended in the right from the x coordinate value $xr_{(k+1)(g+1)}$ of the relative display position is ovx (refer to FIG. 44). Hence, the following equation is established:

$$ovx = (\#_{kg} \cdot Wf - W) + (xr_{kg} - xr_{(k+1)(g+1)}) \qquad (61)$$

Alternatively, if the number of characters for all of the character data are 3 and $W \approx 3Wf$, $$ovx = xr_{kg} - xr_{(k+1)(g+1)} \qquad (62)$$

Hence, as the value of ovx, either of the equation (61) or equation (62) may be used.

In order to calculate the degree of superimposition ovx in the lateral direction between the character data $L_{k(g+1)}$ and $L_{kg}$ at the step S1111, the following equation is established when the x coordinate value of the relative display position $xr_{kg}$ is larger than $xr_{k(g+1)}$:

$$ovx = \#_{k(g+1)} \cdot Wf + xr_{k(g+1)} - xr_{kg} \qquad (63)$$

On the contrary, if $xr_{k(g+1)}$ is larger than $xr_{kg}$, $$ovx = \#_{kg} \cdot Wf + xr_{kg} - xr_{k(g+1)} \qquad (64)$$

Alternatively, if the number of characters constituting the name for all of the character data such as names of places are 3 and $W \approx 3Wf$, the following equation is established from the equations (63) and (64):

$$ovx = W - |xr_{k(g+1)} - xr_{kg}| \qquad (65)$$

In the equation of (65), |x| denotes an absolute value of x.

Hence, depending on the magnitude of the x coordinate values of the relative display positions of $xr_{kg}$ and $xr_{k(g+1)}$, either of the equations (63) or (64) is used to calculate ovx, or alternatively, to derive ovx, the equation (65) may representatively be used.

Referring to FIG. 41, if the value of ovx (degree of superimposition in the lateral direction) is equal to 0 or below 0 at the steps of S1107, S1111, and S1115, the CPU shifts the same processing to the next K or next lower minor region $S_{kg}$ since no superimposition between the character data $L_{kg}$ and $L_{k(g+1)}$ as the display candidates is present.

If the value of ovx (degree of superimposition in the lateral direction) is positive at the steps S1107, S1111, and S1115, respectively, the degree of superimposition ov for both character data such as names of places $L_{kg}$ and $L_{k(g+1)}$ is derived as a sum of both of the degrees of superimpositions in the lateral direction and in the longitudinal direction; namely, ov=ovx+ivy. Alternatively, the degree of the superimposition ov may be as follows: ov=ovx$^2$+ovy$^2$.

At steps of S1108, S1112, and S1116, the corresponding memory contents of the display character data candidate storage block 534b are updated.

That is to say, at the step S1108, the number of superimposition stored in the corresponding memory location of the storage block 534b are increased by one, the degree of the superimposition at the right side therein is ov, and the number of the superimpositions stored into the memory location corresponding to the minor region $S_{kg}$ are increased by one and the degree of superimposition at the left side is ov.

At the step S1112, the numbers of superimpositions for both of the minor regions $S_{k(g+1)}$ and $S_{kg}$ are increased by one and the degree of superimposition in the upper/downward directions is ov.

At the step S1116, the number of superimpositions for the minor region $S_{(k+1)(g+1)}$ are increased by one, its degree of superimposition at the left side is ov, the number of superimpositions for the minor region $S_{kg}$ are increased by one, and its degree of superimposition at the right side is ov.

In this way, for each minor region $S_{kg}$ ($0 \leq k \leq (n-1)$) within the lower minor region $SR_g$, the detection procedures of the superimpositions with the three adjacent minor regions are repeated (S1117).

Figure 47:
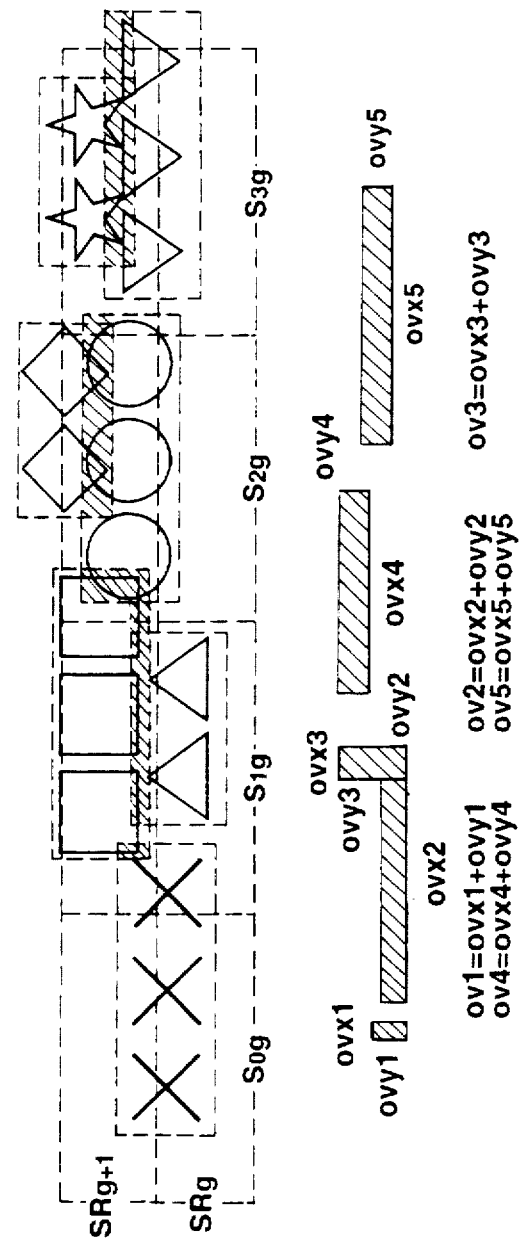
FIG. 47 is an explanatory view for explaining an example of a memory content in a display candidate character data storage block 534b shown in FIG. 36 after the detection of the longitudinal superimposition.

These repetition results are shown in FIG. 47.

In the case of FIG. 47, the number of superimpositions for the respective minor regions are 3.

When the superimposition detection for the couple of the two minor regions ($SR_g$ and $SR_{g+1}$) is ended, the comparison/calculation block 534c appropriately erases the character data such as the names of places as the display candidates included in the two minor region rows from the display character data candidate storage block 534b so that all of the numbers of the superimpositions are set to 0s (at the step S1118).

This non-display condition may be the same as the conditions of a) through f) considered in the case of the erasure (decimation) of the character data such as the names of places superimposed laterally.

Figure 42:
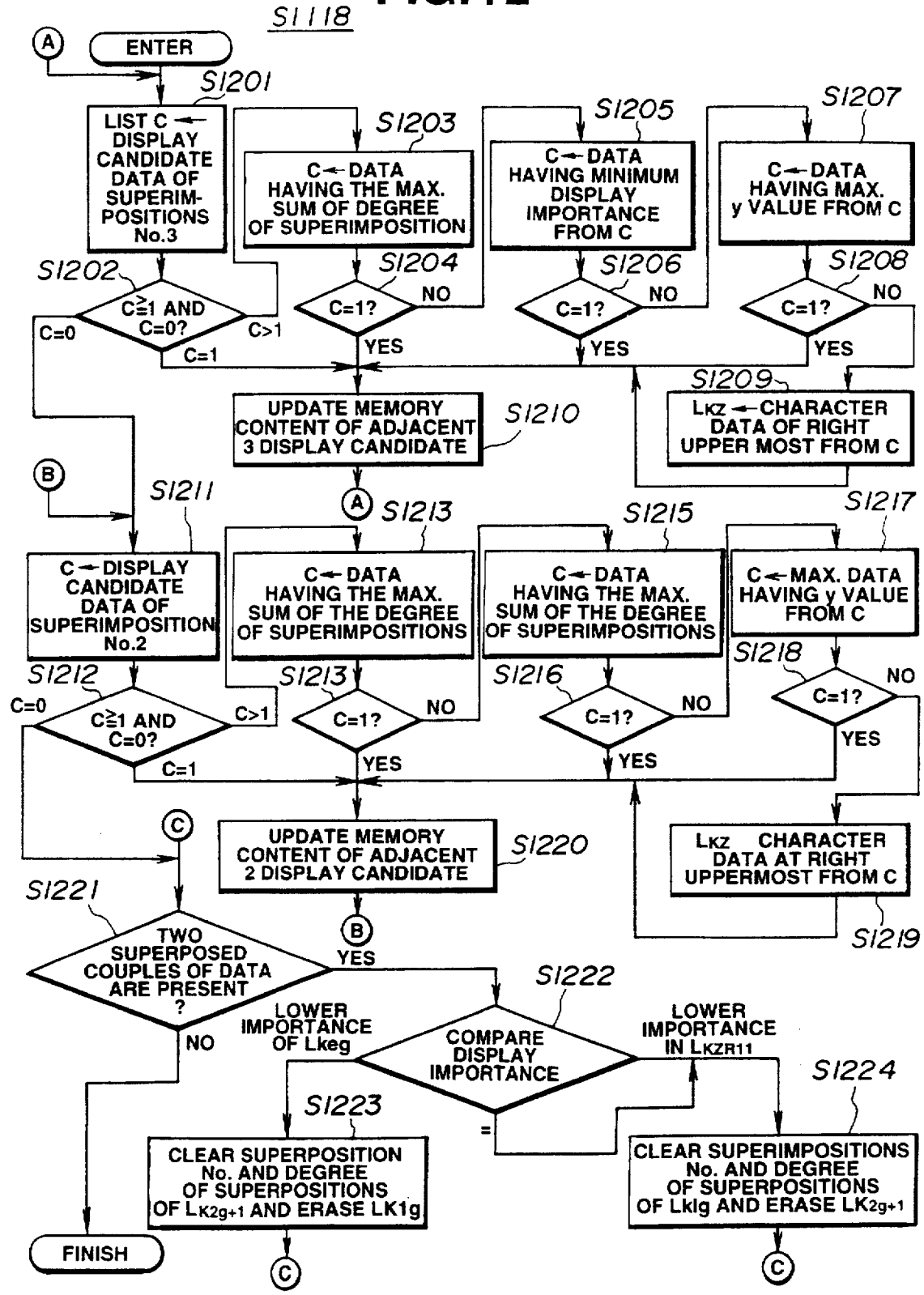
FIG. 42 is an operational flowchart for explaining a subroutine at a step S1118 shown in FIG. 41.

Herein, FIG. 42 shows a subroutine in the step S1118 of FIG. 41.

In the same way as the detection of the superimposition in the lateral direction, the CPU (the comparison/calculation block 534c, but hereinafter called CPU) selects any one of the character data of all of the display candidates within the two minor region rows $SR_g$, $SR_{g+1}$ which has the number of superimpositions are 3 and prepares a non-display candidate list C at a step S1201. If the non-display candidate list C includes a plurality of the character data such as names of places at a step S1202, the subroutine goes to a step S1203 in which the CPU selects any one of the character data which has a maximum sum of the degrees of superimpositions and incorporates the selected character data into the list C to prepare again the list C.

Thereafter, the CPU selects the character data such as names of places which has the lowest degree of display importance (at a step S1205) and which has the maximum y coordinate values of the relative position coordinates yr (at a step S1207), sequentially, on condition that the plurality of the character data are left in the non-display candidate list C (at steps S1204 and S1206) and prepares a new non-display candidate list C.

If the plurality of the character data are still left in the list C at a step S1208, the subroutine goes to a step S1209 in which the CPU finally selects any one of the character data such as the name of place $L_{k(g+1)}$ whose specifier k is the maximum from among the character data such as names of places belonging to the upper minor region row $SR_{g+1}$ (the minor region row which is located at the right uppermost position) if the character data belonging to the upper minor region row $SR_{g+1}$ are still left therein. If those are not left therein, the CPU finally selects the character data $L_{kg}$ such as name of place which has the maximum specifier k from among those within the lower minor region row $SR_g$.

In order to simplify the symbolic expression of the finally selected character data, these character data are denoted by $L_{kz}$.

In the procedure after the step S1209 described above, if the non-display candidate list C is empty (nothing is left), the CPU shifts the processing such as to erase the data having the number of superimpositions of 2 after a step S1211. In addition, if the number of character data included in the non-display candidate list C indicate only $L_{kz}$ (z=g or =g+1), the CPU erases this data $L_{kz}$ from the display character candidate storage block 534b at the next step S1210.

In order to erase the character data such as name of place $L_{kz}$, the memory contents of the character data as the display candidates superimposed on the above-described character data $L_{kz}$ are updated.

Again, in order to simplify the symbolic expression, either one of the minor region row number g and g+1 which is different from z (Z) is denoted by *Z.

That is to say, if Z=g, *Z=g+1,

If Z=g+1, *Z=g.

Since the number of superimpositions of the character data such as name of place $L_{kz}$ are 3, the three character data such as names of places which are superimposed on the character data $L_{kz}$ are $L_{(k-1)*z}$, $L_{k*z}$, and $L_{(k+1)*z}$. Herein, the number of superimpositions for these three character data are reduced by one, respectively, and the degree of superimposition at the right side is 0 for the minor region $S_{(k-1)*z}$.

In addition, the degree of superimposition in the upper and lower (vertical) direction gives 0 for the minor region $S_{k*z}$ and the degree of superimposition at the left side is 0 for the minor region $S_{(k+1)*z}$.

Thereafter, all of the memory contents of the memory locations corresponding to the minor region $S_{kz}$ are cleared and the corresponding number of superimpositions for the minor region $S_{kz}$ give 0.

Referring back to the step S1201, the above-described processing is repeated until the character data such as names of places having the number of superimpositions of 2 are not left within the minor regions $SR_g$ and $SR_{g+1}$. Then, the subroutine goes to a step S1211 in order to erase (decimate) the character data having the number of superimpositions of 2.

In the same way as the case of the number of superimpositions of 3s, all of the character data such as names of places having the number of superimpositions of 2s are included in the non-display candidate list C and the CPU selects sequentially any of the character data which has the maximum sum of the degrees of superimpositions, which has the lowest degree of display importance, which has the maximum y coordinate value yr of the relative display positions, and which is located at the rightmost, uppermost position so that the CPU finally selects one $L_{kz}$ of the character data such as name of place at steps S1211 through S1219.

At a step S1220, since the character data such as names of places which superimpose on the finally selected character data $L_{kz}$ are two of the three character data $L_{(k-1)*z}$, $L_{k*z}$, and $L_{(k+1)*z}$, these memory contents are updated in the same way as the case of the number of superimpositions of 3s and all of the memory contents of the memory locations corresponding to the minor region $S_{kz}$ are cleared and the number of superimposition for this region is set to 0.

Referring back to the step S1211, the same processing is repeated until the character data such as names of places having the number of superimpositions of 2s within the minor region $SR_g$ and $SR_{g+1}$ thereat and the subroutine goes to the step S1221 in order to decimate (erase) the character data such as names of places having the number of superimposition of 1s.

In the same way as in the case of the lateral decimation (erasure, or skipping) described above, the comparison/calculation block 534c (the CPU) searches for the couple of two mutually superimposing character data ($L_{k1g}$, $L_{k2g+1}$) at a step S1221. Then, the CPU compares both of the degrees of display importance with each other and selects one of the character data which has the lower degree of display importance at a step S1222.

If the same degree of display importance is resulted, the character data such as name of place $L_{k2g+1}$ located at the upper minor region row $SR_{g+1}$ is to be erased. If the data to be erased is determined, the number of superimpositions and the degree of superimposition are cleared to 0s for the other character data such as name of place (not to be erased) and all of the memory contents corresponding to the character data to be erased are cleared at a step S1223 or step S1224.

Thereafter, after the same processing is repeated until the number of superimposition of all of the character data such as names of places within the two minor region rows $SR_g$ and $SR_{g+1}$ indicate 0s, the comparison/calculation block 534c (the CPU) ends its processing and the subroutine returns to the step S1119 of FIG. 41 in which 1 is added to the minor region row specifier g. Then, the CPU carries out the detection of superimposition in the longitudinal direction and erasure of the display candidates for the next two minor region rows.

In this way, for the couple of all of the vertically adjacent minor region rows ($SR_g$, $SR_{g+1}$)($0 \leq g \leq (m-2)$, the detection and decimation (erasure) of superimposition of the character data such as names of places in the longitudinal direction are ended and the step S712 of the main routine shown in FIG. 37 is ended.

Although, in the twelfth embodiment, the detection (and erasure) of the superimposition in the longitudinal direction is carried out sequentially from the lower minor region row such as $(SR_0, SR_1) \rightarrow (SR_{m-2}, SR_{m-1})$ on the contrary, from the upper minor region such as $(SR_{m-2}, SR_{m-1}) \rightarrow (SR_0, SR_1)$ may be carried out. In the latter case, if, at the steps of S1209, S1219, and S1222, the character data such as names of places belonging to the lower minor region row $SR_g$ to be erased are selected with priority, the number of the character data such as names of places when the processing is shifted to the next minor region row becomes reduced and the quantity of calculations can accordingly be reduced.

In addition, the steps S711 and S712 may be reversed. In addition, either of the steps S711 or S712 may only be carried out to reduce the quantity of calculations. Furthermore, for the detection of the superimposition in the longitudinal direction, the searched adjacent minor regions may be limited to the upper or lower adjacent minor region, not three adjacent minor regions described above.

In this case, the number of superimposition for the respective minor regions is 1 and the flowchart shown in FIG. 42 is started from the step S1221.

Referring back to the flowchart of FIG. 37, in the same way as in the case of the eleventh embodiment, the display character data selection block 534 transmits the individual character data such as names of places stored in the display character data candidate storage block 534b sequentially to the image data output block 535AA. The image data output block 535AA outputs the image data to the image display block 540AA at a step S713. When the character data such as names of places of the display candidates are clipped (image processing) via the image data output block 535AA to be output to the image display block 540AA, the CPU confirms whether the road map display processing be continued at a step S714. If continued at the step S714, the processing described above is repeated with the memory contents of the display character data candidate storage block 534b cleared at the step S701.

As described above, since, in the navigating apparatus in the twelfth embodiment, the superimposition of the single character data such as name of place present within each minor region is calculated between the adjacent minor regions on the basis of the division of the screen into the plurality of minor regions previously defined and those superimposed on the other character data are erased (decimated) and displayed on the screen, the road map display with the character data can be achieved by smaller quantities of calculations.

(Thirteenth Embodiment)

Next, a thirteenth preferred embodiment of the navigating apparatus according to the present invention will be described.

The functional and hardware structures in the thirteenth embodiment is basically the same as those in the eleventh or twelfth embodiment. However, in addition to the divided minor regions on the image screen previously defined, virtual minor regions outside of the image screen are imaged in the thirteenth embodiment.

For all minor regions including the virtual minor regions, the selection, detection of the superimpositions, and erasure of the superimposed character data such as names of places are carried out generally in the same way as those in the eleventh or twelfth embodiment.

Figure 48:
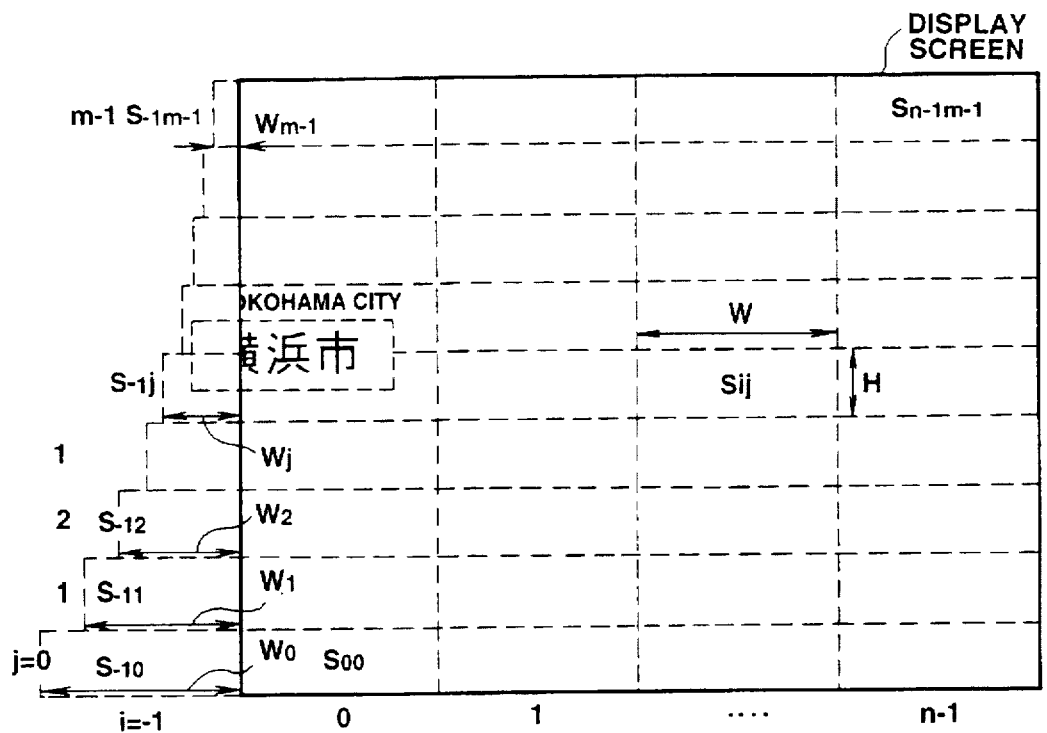
FIG. 48 is an explanatory view for explaining a virtual minor region outside the display screen in a case of a thirteenth preferred embodiment of the navigating apparatus according to the present invention.

FIG. 48 shows an explanatory view for explaining virtual minor regions imaged outside of the screen in the navigating apparatus of the thirteenth embodiment.

As shown in FIG. 48, suppose that the virtual minor regions $S_{-10}, S_{-11}, ---, S_{-1m-1}$ having the same heights as the heights H of the respective divided minor regions are brought in touch with the left side of the displayed screen. Each width of the virtual minor regions may be W as in the same way as that of each divided minor region of the screen or alternatively may be different for each of the virtual divided minor regions.

For example, since, in a case where the bird's eye view perspectively projected from the road map is to be displayed in the navigating apparatus, the scale of the displayed road map at the upper portion of the screen becomes reduced as compared with the lower portion thereof (percentage of scale reduction becomes higher),to equalize a range of the road map corresponding to each of the virtual minor regions so that a sense of incompatibility when a part of the names of places having the displayed position outside the screen is displayed is reduced, the widths of the virtual minor regions located at the upper positions may be lower than those located at the lower positions, provided that the widths of the respective minor regions within the screen are integrally set to W in order to simplify the calculations described above in the twelfth embodiment.

Herein, suppose that the widths of the virtual minor regions $S_{-1j}$ are denoted by $W_j$.

It is noted that the operation of the thirteenth embodiment is generally the same as that in the case of either of the eleventh or twelfth embodiment provided that the minor region row $SR_j$ is constituted by the (n+1)–the number of minor regions of $S_{-1j}, S_{0j}, S_{1j}, ---, S_{(n-1)j}$.

When the determination of the minor region position for each of the character data such as names of places at the minor region collation block 134a or 534a is carried out, if a specifier i derived by the following equation is equal to −1 provided that such conditions as i<0 and $0 \leq j \leq (m-1)$ are satisfied for the specifiers i and j derived by the equation (54), one of the minor regions to which the corresponding one of the character data such as name of place is denoted by $S_{-1j}$:

$$i = [(xq-xo)/W_j] \qquad (66)$$

When the relative display position (xr, yr) is calculated, the following equations are used in place of the equation (55) provided that its character data such as name of place is that in the virtual minor region $S_{-1j}$:

$$xr = xq - xo + W_j,$$

$$yr = yq - yo - jH \qquad (67)$$

In addition, when the calculation of the degree of superimposition in the lateral direction between those in the minor regions $S_{-1j}$ and $S_{0j}$ is as follows in place of the equation (56) described above:

$$ov = (\#_{-1} \cdot Wf - W_j) + (xr_{-1} - xr_0) \qquad (68)$$

It is noted that since, for the virtual minor regions, the supposition that the number of characters in each name is approximately equal to the width $W_j$ of the respective virtual minor regions is not established, the equation of (57) may not be used.

In the same way, the calculation of the degree of lateral superimposition ovx between the minor regions $S_{-1z}$ and $S_{0-z}$ is carried out as follows in place of the equations (59) and (61):

$$ovx = (\#_{-1z} \cdot Wf - W_z) + (xr_{-1z} - xr_{0 \cdot z}) \qquad (69)$$

In this case, the equations (60) and (61) may not be used. If Z=g, *Z=g+1 and if Z=g+1, *Z=g.

In addition, when the degree of superimposition in the lateral direction ovx between those in the minor region $S_{-1g}$ and $S_{-1(g+1)}$ is calculated using the following equation in place of the equations of (63), (64), and (65):

$$ovx = \#_{-1z} \cdot Wf - |W_g - xr_{-1g} - W_{(g+1)} + xr_{-1(g+1)}| \qquad (70)$$

In the equation (70), if $(W_g - xr_{-1g}) > (W_{g+1} - xr_{-1(g+1)})$, Z=g; and if $(W_g - xr_{-1g}) < (W_{g+1} - xr_{-1(g+1)})$, Z=g+1.

Figure 49:
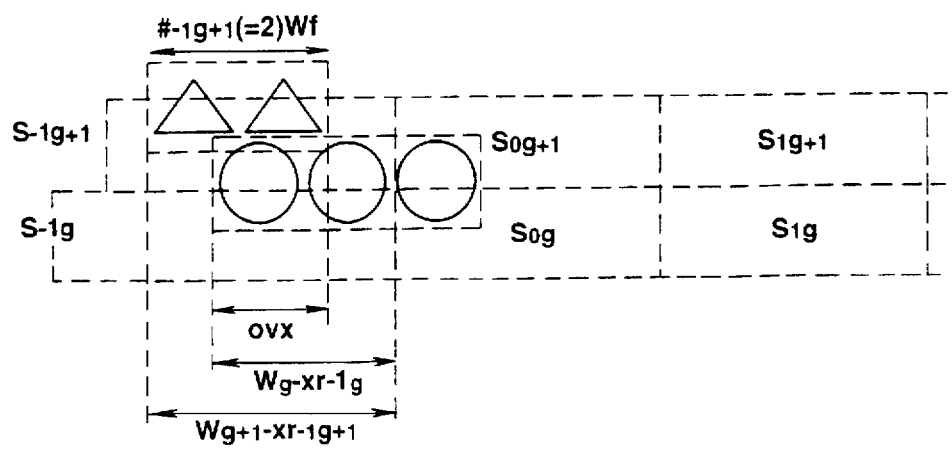
FIG. 49 is an explanatory view for explaining a method for calculating a degree of superimposition between adjacent virtual minor regions in a case of the thirteenth embodiment of the navigating apparatus.

FIG. 49 shows an explanatory view for explaining the method for calculating the degree of superimposition in the x direction between those of the adjacent virtual minor regions in the thirteenth embodiment.

FIG. 49 exemplifies the latter case of $(W_g - xr_{-1g}) < (W_{g+1} - xr_{-1(g+1)})$.

If the widths of all of the virtual minor regions $W_j$ are equal to W, the above-described substitutions of the equations give the same results before the substitutions. Hence, the calculations for the virtual minor regions are the same as those in either of the eleventh or twelfth embodiment.

In the way described above, for the names of places whose displayed position coordinates do not fall within the displayed image screen, any one of the names of places which is brought in contact with the screen edge can be displayed partially as shown in FIG. 48.

Since, in the navigating apparatus of the thirteenth embodiment, the virtual minor regions outside the image screen and in touch with the divided minor region of the minor regions previously defined in the image screen are imaged so that the character data such as names of places present in the virtual minor regions are added to the candidates to be displayed, any one of the character data such as names of places which is nearly in touch with the screen edge can partially be displayed so that more information of the road map can be provided for the user (viewer).

While the present invention has been disclosed in terms of the preferred embodiment in order to facilitate better understanding thereof, it should be appreciated that the invention can be embodied in various ways without departing from the principle of the invention. Therefore, the invention should be understood to include all possible embodiments and modification to the shown embodiments which can be embodied without departing from the principle of the invention as set forth in the appended claims.

TABLE 1

NODE (INTERSECTION) DATA

| | | |
|---|---|---|
| N2 | NAME OF INTERSECTION | :YAMA IRIGUCHI |
| | POSITION COORDINATE | (N2x, N2y) |
| | NUMBER OF LINKS | :4 |
| | ADJACENT INFORMATION | $(L_1,N_1), (L_2,N_3), (L_5,N_5), (L_6,N_6)$ |
| N3 | NAME OF INTERSECTION | :YAMA IRIGUCHI MAE |
| | POSITION COORDINATE | (N3x, N3y) |
| | NUMBER OF LINKS | :3 |
| | ADJACENT INFORMATION | $(L_2,N_2), (L_7,N_7), (L_3,N_4)$ |
| N4 | NAME OF INTERSECTION | :SANKAI |
| | POSITION COORDINATE | (N4x, N4y) |
| | NUMBER OF LINKS | :2 |
| | ADJACENT INFORMATION | $(L_3,N_3), (L_4, N_8)$ |
| N7 | NAME OF INTERSECTION | :FRONT OF PRIMARY SCHOOL |
| | POSITION COORDINATE | (N7x, N7y) |
| | NUMBER OF LINKS | :2 |
| | ADJACENT INFORMATION | $(L_7,N_3), (L_8,N_9)$ |

TABLE 1-continued

NODE (INTERSECTION) DATA

| | | |
|---|---|---|
| N9 | NAME OF INTERSECTION | :FRONT OF JUNIOR HIGH SCHOOL |
| | POSITION COORDINATE | (N9x, N9y) |
| | NUMBER OF LINKS | :2 |
| | ADJACENT INFORMATION | $(L_8,N_7), (L_9,N_{10})$ |

TABLE 2

LINK (ROUTE) DATA

| | | |
|---|---|---|
| L1 | NUMBER OF ROUTE POINTS | : 8 |
| | POSITIONAL COORDINATE OF ROUTE POINT | q11, q12, q13, ..., q18 |
| | ROAD RANK (ATTRIBUTE) | : (PREFECTURAL ROAD) |
| | ROAD LINE NAME | : ROUTE 4000 |
| | NODE IDENTIFIER | : N1, N2 |
| L2 | NUMBER OF ROUTE POINTS | : 8 |
| | POSITIONAL COORDINATE OF ROUTE POINT | q21, q22, q23, ..., q28 |
| | ROAD RANK (ATTRIBUTE) | : NATIONAL ROAD (HIGHWAY) |
| | ROAD LINE NAME | : ROUTE 123 |
| | NODE IDENTIFIER | : N2, N3 |
| L3 | NUMBER OF ROUTE POINTS | : 8 |
| | POSITIONAL COORDINATE OF ROUTE POINT | q31, q32, q33, ..., q38 |
| | ROAD RANK (ATTRIBUTE) | : PREFECTURAL ROAD(HIGHWAY) |
| | ROAD LINE NAME | : ROUTE 1000 |
| | NODE IDENTIFIER | : N6, N8 |

| | | |
|---|---|---|
| L1 | NUMBER OF ROUTE POINTS | : 8 |
| | POSITIONAL COORDINATE OF ROUTE POINT | q41, q42, q43, ..., q48 |
| | ROAD RANK (ATTRIBUTE) | : (PREF. ROAD) |
| | ROAD LINE NAME | : ROUTE 1000 |
| | NODE IDENTIFIER | : N4, N8 |
| L2 | NUMBER OF ROUTE POINTS | : 8 |
| | POSITIONAL COORDINATE OF ROUTE POINT | q51, q52, q53, ..., q58 |
| | ROAD RANK (ATTRIBUTE) | : (PREF. ROAD) |
| | ROAD LINE NAME | : ROUTE 123 |
| | NODE IDENTIFIER | : N2, N5 |

| | | |
|---|---|---|
| L7 | NUMBER OF ROUTE POINTS | : 8 |
| | POSITIONAL COORDINATE OF ROUTE POINT | q71, q72, q73, ..., q78 |
| | ROAD RANK (ATTRIBUTE) | : NATIONAL ROAD (HIGHWAY) |
| | ROAD LINE NAME | : ROUTE 123 |
| | NODE IDENTIFIER | : N3, N7 |
| L8 | NUMBER OF ROUTE POINTS | : 8 |
| | POSITIONAL COORDINATE OF ROUTE POINT | q81, q82, q83, ..., q88 |
| | ROAD RANK (ATTRIBUTE) | : NATIONAL ROAD (HIGHWAY) |
| | ROAD LINE NAME | : ROUTE 123 |
| | NODE IDENTIFIER | : N7, N9 |

TABLE 3

| i | j | (NAME) N | RELATIVE DISPLAY POSITION (xr, yr) | ROAD NAME ATTRIBUTE DISPLAY IMPORTANCE |
|---|---|---|---|---|
| 0 | 0 | — | | |
| 1 | 0 | NOUMIDAI | (12, 5) | 1 |
| 2 | 0 | YOKOHAMA CITY | (4, 3) | 3 |
| ⋮ | ⋮ | | | |
| n−1 | 0 | NAGAHAMA | (8, 13) | 2 |
| 0 | 1 | — | | |
| ⋮ | ⋮ | | | |
| n−1 | 1 | NAMIKI | (11, 21) | 2 |
| 0 | m−1 | — | | |
| ⋮ | ⋮ | | | |
| n−1 | m−1 | — | | |

TABLE 4

| i | j | (NAME) N | SUPER-IMPOSED NUMBER | DEGREE OF SUPERIMPOSITION LEFT | DEGREE OF SUPERIMPOSITION UP/DOWN | DEGREE OF SUPERIMPOSITION RIGHT | (xr, yr) | NAME OF PLACE ATTRIBUTE DISPLAY IMPORTANCE |
|---|---|---|---|---|---|---|---|---|
| 0 | 0 | — | | | | | | |
| 1 | 0 | NOUMIDAI | 0 | — | — | — | (12, 5) | 1 |
| 2 | 0 | YOKOHAMA CITY | 0 | — | — | — | (4, 3) | 3 |
| ⋮ | ⋮ | | | | | | | |
| n−1 | 0 | NAGAHAMA | 0 | — | ' | — | (8, 13) | 2 |
| 0 | 1 | — | | | | | | |
| ⋮ | ⋮ | | | | | | | |
| n−1 | 1 | NAMIKI | 0 | — | — | — | (11, 12) | 2 |
| 0 | m−1 | — | | | | | | |
| ⋮ | ⋮ | | | | | | | |
| n−1 | m−1 | — | | | | | | |

What is claimed is:

1. A navigating apparatus comprising:

a) present position detecting means for detecting a present position of a mobile body and a forwarding direction toward which the mobile body moves at the present position thereof;

b) initial display parameter value setting means for previously setting the detected present position and display parameters thereinto as initial values;

c) direction of line of sight determining means for determining a direction of line of sight for a perspectively projected image on the basis of at least the detected forwarding direction;

d) view point position determining means for determining a position of a view point on which the direction of line of sight is based on the basis of at least the information of the forwarding direction detected by the present position detecting means;

e) road map data storing means for storing at least a road map data expressed with a two-dimensional X-Y plane as a reference;

f) coordinate transforming means for executing a coordinate transformation of the road map data stored in said road map data storing means on the basis of at least the determined direction of line of sight and the determined view point position into a bird's eye view which is the perspectively projected image of the read road map data so as to generate the bird's eye view; and g) display means for receiving the display data of the bird's eye view and for displaying the bird's eye view on its image screen;

wherein said direction of line of sight determining means determines the direction of line of sight placed on a reference point (Q) on the basis of at least a past positional information of the present position before a predetermined period of time has passed or before the mobile body in which the navigating apparatus is mounted has run by a predetermined interval of distance, and $$\alpha(t)=w_i \times \delta+(1-w_i)\times\alpha(t-1), \ 0<w_i<1,$$

$\alpha(t)$: the direction of line of sight, $\delta$: the forwarding direction, $\delta=\arg |P_p-P_o|$, $P_p$: a previously measured present position before the predetermined period of time has passed or before the mobile body has run by the predetermined interval of distance, and $\alpha(t-1)$: the determined line of sight before the predetermined period of time has passed or before the mobile body has run by the predetermined interval of distance.

2. A navigating apparatus as claimed in claim 1, wherein the view point position $E(X_o, Y_o, Z_o)$ is determined as follows:

$$x=X_p+L\times\cos \alpha(t),$$

$$y=Y_p+L\times\sin \alpha(t),$$

(x, y) denotes coordinate positions of the referring point (B) on the X-Y plane and L denotes a distance from the reference point (Q) to the referring point (B); and $$X_o=x-hx \cos \alpha(t)/\tan \theta,$$

$$Y_o=y-hx \sin \alpha(t)/\tan \theta,$$

and $$Z_o=h,$$

wherein h denotes a height of the view point and $\theta$ denotes an angle of depression for the view point.

3. A navigating apparatus as claimed in claim 1, wherein said present position detecting means comprises: a GPS; and a geomagnetic direction sensor.

4. A navigating apparatus as claimed in claim 1, wherein said direction of line of sight determining means determines a next direction of the line of sight of the perspectively projected image on the basis of a past direction of the line of sight.

5. A navigating apparatus as claimed in claim 1, wherein said road map data stored in said road map data storing means includes traffic intersection data and route road point data, which further comprises predictive route road point calculating means for calculating a route road point present in the forwarding direction of the mobile body from another route point which corresponds to the present position of the mobile body as a predicted route point to which the mobile body moves on the basis of the present position detected by said present position detecting means and forwarding direction at the present position detected by said present position detecting means and on the basis of the road map data stored in said road map memory, and wherein said direction of line of sight determining means determines the direction of line of sight and determines a reference point of the perspectively projected view on the basis of the present position of the mobile body detected by said present position detecting means, the forwarding direction at the detected present position, and the predicted route road point, and said coordinate transforming means executes the coordinate transformation of the road map data on the basis of the determined information from the direction of line of sight determining means.

6. A navigating apparatus as claimed in claim 5, which further comprises turn signal detecting means for detecting an information on a turn signal of the mobile body and wherein said predictive route road point calculating means calculates the predicted route road point on the basis of the present position detected by said present position detecting means, the forwarding direction at the present position detected by said present position detecting means, the road map data stored in said road map data storing means, and the information on the turn signal of the mobile body detected by said turn signal detecting means.

7. A navigating apparatus as claimed in claim 6, wherein said mobile body is an automotive vehicle having a combination lamp to indicate right and left turns and no turn when no combination lamp is turned on.

8. A navigating apparatus as claimed in claim 1, wherein said road map storing means stores character data constituting names of places to be superimposed on the road map data and wherein said initial display parameter value setting means, said direction of line of sight determining means and coordinate transforming means are constituted by display reference point determining unit which is so constructed as to determine a display reference point on the road map data to be displayed on the basis of at least the present position detected by said present position detecting means and a calculation processing unit which is so constructed as to fetch the road map data required to be displayed on the image screen of said display means and to determine contents of displays on the display image screen of said display means, said display image screen being previously divided into a plurality of minor display regions and said calculation processing unit selecting one of character data constituting one of the names of places which is displayed within the same minor region in accordance with the division of the image screen into the minor regions.

9. A navigating apparatus as claimed in claim 8, wherein said calculation processing unit further comprises first means for determining whether a superimposition of the character data constituting the name of place belonging to one of the divided minor regions on either of the character data constituting names of places belonging to adjacent left and right minor regions occurs for each of the divided minor regions, for each predetermined one of the character data constituting the names of places which are display candidates and wherein said calculation processing unit executes such a decimination that parts of the character data which are superimposed mutually are erased and not displayed when a plurality of the character data are determined to be superimposed.

10. A navigating apparatus as claimed in claim 9, wherein said calculation processing unit further comprises second means for determining whether a superimposition of the character data constituting the name of place belonging to one of the divided minor regions on any one of the character data belonging to adjacent upper or lower minor regions or belonging to a left or right minor region adjacent to the adjacent upper or lower region thereof occurs for each of the divided minor regions, for each predetermined one of the character data constituting the names of places which are display candidates and wherein said calculation processing unit executes such a decimination that parts of the character data which are superimposed mutually are erased and not displayed when a plurality of the character data are determined to be superimposed.

11. A navigating apparatus as claimed in claim 9, wherein said calculation processing unit further comprises third means for determining whether a lateral superimposition of the character data constituting the name of place belonging to one of the divided minor regions on any one of the character data belonging to a laterally adjacent minor region in a lateral direction of the image screen and determined whether a longitudinal superimposition of the character data constituting the name of place belonging to one of the divided minor regions on any one of the character data belonging to a longitudinally adjacent minor region, for each predetermined one of the character data constituting the names of places which are display candidates and wherein said calculation processing unit executes such a decimination that parts of the character data which are superimposed mutually are erased and not displayed when a plurality of the character data are determined to be laterally and longitudinally superimposed.

12. A navigating apparatus as claimed in claim 11, wherein the divided minor regions that said calculation processing unit handles include virtually imaged minor regions extended outside the display image screen and wherein said calculation processing unit executes the calculation processing such that at least one of the character data constituting the names of places which is adjacent to an outside periphery of the image screen is partially displayed.

13. A navigating apparatus as claimed in claim 12, wherein said character data constituting the names of places have degrees of display importance as their attributes and wherein said calculation processing unit selects the character data constituting the names of places to be displayed on the basis of their degrees of the display importance.

14. A navigating apparatus comprising:

a) present position detecting means for detecting a present position of a mobile body and a forwarding direction toward which the mobile body moves at the present position thereof;

b) initial display parameter value setting means for previously setting the detected present position and display parameters thereinto as initial values;

c) direction of line of sight determining means for determining a direction of line of sight for a perspectively projected image on the basis of at least the detected forwarding direction;

d) view point position determining means for determining a position of a view point on which the direction of line of sight is based on the basis of at least the information of the forwarding direction detected by the present position detecting means;

e) road map data storing means for storing at least a road map data expressed with a two-dimensional X-Y plane as a reference;

f) coordinate transforming means for executing a coordinate transformation of the road map data stored in said road map data storing means on the basis of at least the determined direction of line of sight and the determined view point position into a bird's eye view which is the perspectively projected image of the read road map data so as to generate the bird's eye view; and g) display means for receiving the display data of the bird's eye view and for displaying the bird's eye view on its image screen, wherein said direction of line of sight determining means determines the direction of line of sight placed on a reference point (O) on the basis of at least a past positional information of the present position before a predetermined period of time has passed or before the mobile body in which the navigating apparatus is mounted has run by a predetermined interval of distance, and wherein $$\alpha(t)=w0 \cdot \delta_o + w1 \cdot \delta_1 + \cdots + w_i \delta_i$$

wherein $w0+w1+w2+ \cdots W_i=1$ and $\delta_i$ denotes the direction of line of sight or the forwarding direction of the mobile body, $\delta_i$ being calculated before the predetermined period of time has passed by an i-th number of times or before the predetermined interval of distance through which the mobile body has run by the i-th number of times.

15. A navigating apparatus comprising:

a present position detecting means for detecting a present position of a mobile body and a forwarding direction toward which the mobile body moves at the present position thereof;

b) initial display parameter value setting means for previously setting the detected present position and display parameters thereinto as initial values;

c) direction of line of sight determining means for determining a direction of line of sight for a perspectively projected image on the basis of at least the detected forwarding direction;

d) view point position determining means for determining a position of a view point on which the direction of line of sight is based on the basis of at least the information of the forwarding direction detected by the present position detecting means;

e) road map data storing means for storing at least a road map data expressed with a two-dimensional X-Y plane as a reference;

f) coordinate transforming means for executing a coordinate transformation of the road map data stored in said road map data storing means on the basis of at least the determined direction of line of sight and the determined view point position into a bird's eye view which is the perspectively projected image of the read road map data so as to generate the bird's eye view; and g) display means for receiving the display data of the bird's eye view and for displaying the bird's eye view on its image screen, wherein said direction of line of sight determining means determines the direction of line of sight placed on a reference point (O) on the basis of at least a past positional information of the present position before a predetermined period of time has passed or before the mobile body in which the navigating apparatus is mounted has run by a predetermined interval of distance, and wherein $\alpha(t)=\beta_p-\arg|P_r-P_o|.$ wherein $\beta_p$ denotes an angle formed between the positional information of a position $P_r$ of a road through which the mobile body has passed and which is remote by R from the present position and the present position $P_o$.

16. A navigating apparatus comprising:
a) external storing means for storing road map data which are divided into a plurality of square-shaped land-partitioned regions defined as meshes;
b) display reference point determining means for determining a display reference point on the road map data;
c) calculation processing means for executing a calculation processing required to display a bird's eye view on the basis of the mesh data from said external storing means and the determination information of said display reference point determining means; and
d) image displaying means for displaying the road map data as the result of calculation processing by said calculation processing means on its display screen;

wherein said direction of line of sight determining means determines the direction of line of sight placed on a reference point (O) on the basis of at least a past positional information of the present position before a predetermined period of time has passed or before the mobile body in which the navigating apparatus is mounted has run by a predetermined interval of distance, and $\alpha(t)=w_i \times \delta+(1-w_i)\times\alpha(t-1), 0<w_i<1,$ $\alpha(t)$: the direction of line of sight.
$\delta$: the forwarding direction, $\delta=\arg|P_p-P_o|.$
$P_p$: a previously measured present position before the predetermined period of time has passed or before the mobile body has run by the predetermined interval of distance, and
$\alpha(t-1)$: the determined line of sight before the predetermined period of time has passed or before the mobile body has run by the predetermined interval of distance.

17. A navigating apparatus comprising:
a) present position detecting means for detecting a present position of a mobile body and for detecting a forwarding direction at the present position toward which the mobile body moves;
b) road map data storing means for storing a road map information including a road map data previously expressed with a two-dimensional X-Y plane as a reference and traffic intersection data and route road point data on the road map data;
c) predicted route road point calculating means for calculating a route road point present in a forward direction of the mobile body toward which the mobile body moves from a route road point at which the mobile body is present as the present position on the basis of the present position detected by the present position detecting means, the forwarding direction at the present position detected by the present position detecting means, and the road map information;
d) view point position/reference point position determining means for determining a reference point position and a direction of a view point on a road map display on the basis of the present position and forwarding direction at the present position detected by said present position detecting means;
e) display information generating means for carrying out a coordinate transformation of the road map information on the basis of the data of the view point position and reference point position data from the view point position/reference point position determining means so as to generate a display information; and
f) display means for displaying the generated display information on its image screen;

wherein said direction of line of sight determining means determines the direction of line of sight placed on a reference point (O) on the basis of at least a past positional information of the present position before a predetermined period of time has passed or before the mobile body in which the navigating apparatus is mounted has run by a predetermined interval of distance, and $\alpha(t)=w_i \times \delta+(1-w_i)\times\alpha(t-1), 0<w_i<1,$ $\alpha(t)$: the direction of line of sight,
$\delta$: the forwarding direction, $\delta=\arg|P_p-P_o|.$
$P_p$: a previously measured present position before the predetermined period of time has passed or before the mobile body has run by the predetermined interval of distance, and
$\alpha(t-1)$: the determined line of sight before the predetermined period of time has passed or before the mobile body has run by the predetermined interval of distance.

18. A navigating apparatus comprising:
a) external memory means for storing road map information having a road map graphic data and character data constituting names of places to be superimposed on the road graphic data;
b) display reference point determining means for determining a display reference point on the road map according to a position of a vehicle;
c) a calculation processing unit which is so constructed as to fetch the road map information required to be displayed from said eternal memory means and so as to determine contents of displays, on the basis of the determined display reference point; and
d) image display unit which is so constructed as to display an output from said calculation processing unit in a form of a road map image on its screen, wherein the image screen of the image display unit is divided into a plurality of image minor regions and said calculation processing unit selects and displays one of the character data constituting the names of places to be displayed within one of the same minor regions in accordance with the division of the image screen into the plurality of minor regions;

wherein said direction of line of sight determining means determines the direction of line of sight placed on a reference point (O) on the basis of at least a past positional information of the present position before a predetermined period of time has passed or before the mobile body in which the navigating apparatus is mounted has run by a predetermined interval of distance, and $\alpha(t)=w_i \times \delta+(1-w_i)\times\alpha(t-1), 0<w_i<1,$ $\alpha(t)$: the direction of line of sight,
$\delta$: the forwarding direction, $\delta=\arg|P_p-P_o|.$
$P_p$: a previously measured present position before the predetermined period of time has passed or before the mobile body has run by the predetermined interval of distance, and α(t−1): the determined line of sight before the predetermined period of time has passed or before the mobile body has run by the predetermined interval of distance.

19. A method for navigating a mobile body, comprising the steps of:
   a) detecting a present position of the mobile body and a forwarding direction toward which the mobile body moves at the present position thereof;
   b) previously setting the detected present position and display parameters values;
   c) determining a direction of line of sight for a perspectively projected image on the basis of at least the information of the detected forwarding direction;
   d) determining a position of a view point on which the direction of line of sight is based on the basis of at least the information of the detected forwarding direction;
   e) storing at least a road map data expressed with a two-dimensional X-Y plane as a reference;
   f) executing a coordinate transformation of the road map data stored in said road map data storing means on the basis of at least the determined direction of line of sight and the determined view point position into a bird's eye view which is the perspectively projected image of the read road map data so as to generate the bird's eye view; and
   g) receiving the data of the bird's eye view and displaying the bird's eye view on an image screen;

wherein said direction of line of sight determining means determines the direction of line of sight placed on a reference point (O) on the basis of at least a past positional information of the present position before a predetermined period of time has passed or before the mobile body in which the navigating apparatus is mounted has run by a predetermined interval of distance, and $$\alpha(t)=w_i\times\delta+(1-w_i)\times\alpha(t-1), 0<w_i<1,$$

α(t): the direction of line of sight,

δ: the forwarding direction, $\delta=\arg|P_p-P_o|$, $P_p$: a previously measured present position before the predetermined period of time has passed or before the mobile body has run by the predetermined interval of distance, and α(t−1): the determined line of sight before the predetermined period of time has passed or before the mobile body has run by the predetermined interval of distance.

20. A navigating apparatus comprising:
   a) present position detecting means for detecting a present position of a mobile body and a forwarding direction toward which the mobile body moves at the present position thereof;
   b) initial display parameter value setting means for previously setting the detected present position and display parameters thereinto as initial values;
   c) direction of line of sight determining means for determining a direction of line of sight for a bird's eye view including the present position of the mobile body on the basis of at least the detected forwarding direction;
   d) view point position determining means for determining a position of a view point on the basis of at least the direction of line of sight;
   e) road map data storing means for storing at least a road map data expressed with a two-dimensional X-Y plane as a reference;
   f) coordinate transforming means for executing a coordinate transformation of the road map data stored in said road map data storing means on the basis of at least the determined direction of line of sight and the determined view point position into the bird's eye view so as to generate the bird's eye view including the present position of the mobile body; and
   g) display means for receiving the display data of the bird's eye view and for displaying on its image screen the bird's eye view including the present position of the mobile body;

wherein said direction of line of sight determining means determines the direction of line of sight placed on a reference point (O) on the basis of at least a past positional information of the present position before a predetermined period of time has gassed or before the mobile body in which the navigating apparatus is mounted has run by a predetermined interval of distance, and $$\alpha(t)=w_i\times\delta+(1-w_i)\times\alpha(t-1), 0<w_i<1,$$

α(t): the direction of line of sight,

δ: the forwarding direction, $\delta=\arg|P_p-P_o|$, $P_p$: a previously measured present position before the predetermined period of time has passed or before the mobile body has run by the predetermined interval of distance, and α(t−1) the determined line of sight before the predetermined period of time has passed or before the mobile body has run by the predetermined interval of distance.

21. A navigation apparatus comprising:

present position detecting means for detecting a present position of a mobile body and a forwarding direction toward which the mobile body moves at the present position thereof;

initial display parameter value setting means for previously setting the detected present position and display parameters thereinto as initial values;

direction of line of sight determining means for determining a direction of line of sight for a perspective projected image on the basis of at least the detected forwarding direction;

view point position determining means for determining a position of a viewpoint on which the direction of line of sight is based on the basis of at least the information of the forwarding direction detected by the present position detecting means;

road map data storing means for storing at least a road map data expressed with a two-dimensional X-Y plane as a reference;

coordinate transforming means for executing a coordinate transformation of the road map data stored in said road map data storing means on the basis of at least the determined direction of line of sight and the determined viewpoint position into a bird's eye view which is the perspectively projected image of the road map data so as to generate the bird's eye view; and display means for receiving the display data of the bird's eye view and for displaying the bird's eye view on its image screen, wherein said initial display parameter setting means sets an initial referring point (B(Xb, Yb, O)), an initial viewpoint position (Xo, Yo, Zo), an initial viewpoint position height h, and a degression angle (θ) of the viewpoint position E and said direction of line of sight determining means determines the line of sight so that the present position of the mobile body is placed on a straight line connecting a position (E(Xo, Yo, O)) of the viewpoint on the X-Y plane of the road map data to the initial referring point (B), the present position of the mobile body is placed on a display reference point (Q) placed on the straight line between the viewpoint position (E(Xo, Yo, O)) and the initial referring point (B), and determines the line of sight on the basis of the following equation:

$$\alpha(t)=wi\delta+(1-wi)\alpha(t-1),$$

wherein 0<wi<1, $\delta$ denotes the forwarding direction of the mobile body at the present position and $\delta=\text{arg}|P_p-P_o|$, wherein $P_p$ denotes a previously detected present position before a present period of time has passed or before the mobile body has run by a predetermined interval of distance, and $\alpha(t-1)$ denotes a predetermined line of sight before the predetermined period of time has passed or before the mobile body has run by the predetermined interval of distance.

22. A navigating apparatus comprising:
a) present position detecting means for detecting a present position of a mobile body and a forwarding direction toward which the mobile body moves at the present position thereof;
b) initial display parameter value setting means for previously setting the detected present position and display parameters thereinto as initial values;
c) direction of line of sight determining means for determining a direction of line of sight for a perspectively projected image on the basis of at least the detected forwarding direction;
d) view point position determining means for determining a position of a view point on which the direction of line of sight is based on the basis of at least the information of the forwarding direction detected by the present position detecting means;
e) road map data storing means for storing at least a road map data expressed with a two-dimensional X-Y plane as a reference;
f) coordinate transforming means for executing a coordinate transformation of the road map data stored in said road map data storing means on the basis of at least the determined direction of line of sight and the determined view point position into a bird's eye view which is the perspectively projected image of the read road map data so as to generate the bird's eye view; and
g) display means for receiving the display data of the bird's eye view and for displaying the bird's eye view on its image screen, which further comprises:
recommended route storing means for storing a recommended route data, wherein said direction of line of sight determining means determines the direction of line of sight on the basis of the forwarding direction and recommended route data stored in said recommended route data storing means and wherein said coordinate transforming means executes the coordinate transformation on the basis of the determined direction of line of sight, the determined view point position, and the recommended route data; and
wherein said direction of line of sight determining means determines the direction of line of sight $\alpha(t)$ as follows: $\alpha(t)=\beta_r=\text{arg}|N-P_o|$, wherein N $(X_n, Y_n, Z_n)$ denotes a recommended position $(X_n, Y_n, Z_n)$ corresponding to a recommended route position on a recommended route to be traveled which is remote from the present position $P_o$ by a road distance R and $\beta_r$ denotes a direction of the recommended position N viewed from the present position $P_o$.

23. A navigating apparatus as claimed in claim 22, wherein $$\dot{R} \leqq F/\sqrt{(1+\tan^2\theta)} \times$$

$$\{h(1+\tan^2\theta)/(\tan\theta + u \cdot F) + D_c\} \times (1+\sec\omega),$$

wherein $\theta$ denotes an angle of depression of the line of sight, h denotes a height of the line of sight, F denotes a tangent of an angle of field of view in a lateral direction, u denotes an aspect ratio of the display image screen, $D_c$ denotes a distance from a position corresponding to a lowest end of the display image screen to a display reference point Q, and $\omega$ denotes a curve angle of a traffic intersection having a steepest corner.

24. A navigating apparatus comprising:
a) present position detecting means for detecting a present position of a mobile body and a forwarding direction toward which the mobile body moves at the present position thereof;
b) initial display parameter value setting means for previously setting the detected present position and display parameters thereinto as initial values;
c) direction of line of sight determining means for determining a direction of line of sight for a perspectively projected image on the basis of at least the detected forwarding direction;
d) view point position determining means for determining a position of a view point on which the direction of line of sight is based on the basis of at least the information of the forwarding direction detected by the present position detecting means;
e) road map data storing means for storing at least a road map data expressed with a two-dimensional X-Y plane as a reference;
f) coordinate transforming means for executing a coordinate transformation of the road map data stored in said road map data storing means on the basis of at least the determined direction of line of sight and the determined view point position into a bird's eye view which is the perspectively projected image of the read road map data so as to generate the bird's eye view; and
g) display means for receiving the display data of the bird's eye view and for displaying the bird's eye view on its image screen, which further comprises:
recommended route storing means for storing a recommended route data, wherein said direction of line of sight determining means determines the direction of line of sight on the basis of the forwarding direction and recommended route data stored in said recommended route data storing means and wherein said coordinate transforming means executes the coordinate transformation on the basis of the determined direction of line of sight, the determined view point position, and the recommended route data; and
wherein said direction of line of sight determining means determines the direction of line of sight $\alpha(t)$ as follows:

$$\alpha(t)=w\delta+(1-w)\alpha(t-1),$$

wherein $\delta=\beta_r$, 0<w<1, $\beta_r=\text{arg}|N-P_o|$ and denotes a direction of a recommended position which corresponds to a recommended route position viewed from the present position $P_o$.

25. A navigating apparatus comprising:
   a) present position detecting means for detecting a present position of a mobile body and a forwarding direction toward which the mobile body moves at the present position thereof;
   b) initial display parameter value setting means for previously setting the detected present position and display parameters thereinto as initial values;
   c) direction of line of sight determining means for determining a direction of line of sight for a perspectively projected image on the basis of at least the detected forwarding direction;
   d) view point position determining means for determining a position of a view point on which the direction of line of sight is based on the basis of at least the information of the forwarding direction detected by the present position detecting means;
   e) road map data storing means for storing at least a road map data expressed with a two-dimensional X-Y plane as a reference;
   f) coordinate transforming means for executing a coordinate transformation of the road map data stored in said road map data storing means on the basis of at least the determined direction of line of sight and the determined view point position into a bird's eye view which is the perspectively projected image of the read road map data so as to generate the bird's eye view; and
   g) display means for receiving the display data of the bird's eye view and for displaying the bird's eye view on its image screen, which further comprises:
      recommended route storing means for storing a recommended route data, wherein said direction of line of sight determining means determines the direction of line of sight on the basis of the forwarding direction and recommended route data stored in said recommended route data storing means and wherein said coordinate transforming means executes the coordinate transformation on the basis of the determined direction of line of sight, the determined view point position, and the recommended route data; and
   wherein the direction of line of sight determining means determines the direction of line of sight $\alpha(t)$ as follows:

$\alpha(t)=w1\times\arg|N_1-P_o|+w2\times\arg|N_2-P_o|+\cdots+wi\times\arg|N_i-P_o|$, wherein $w1+w2+\cdots+wi=1$ and $N_1$ through $N_i$ denote a plurality of recommended positions of 1 through i which correspond to recommended route positions, and $P_o$ denotes the present position of the mobile body.

26. A navigating apparatus comprising:
   a) present position detecting means for detecting a present position of a mobile body and a forwarding direction toward which the mobile body moves at the present position thereof;
   b) initial display parameter value setting means for previously setting the detected present position and display parameters thereinto as initial values;
   c) direction of line of sight determining means for determining a direction of line of sight for a perspectively projected image on the basis of at least the detected forwarding direction;
   d) view point position determining means for determining a position of a view point on which the direction of line of sight is based on the basis of at least the information of the forwarding direction detected by the present position detecting means;
   e) road map data storing means for storing at least a road map data expressed with a two-dimensional X-Y plane as a reference;
   f) coordinate transforming means for executing a coordinate transformation of the road map data stored in said road map data storing means on the basis of at least the determined direction of line of sight and the determined view point position into a bird's eye view which is the perspectively projected image of the read road map data so as to generate the bird's eye view; and
   g) display means for receiving the display data of the bird's eye view and for displaying the bird's eye view on its image screen, which further comprises:
      recommended route storing means for storing a recommended route data, wherein said direction of line of sight determining means determines the direction of line of sight on the basis of the forwarding direction and recommended route data stored in said recommended route data storing means and wherein said coordinate transforming means executes the coordinate transformation on the basis of the determined direction of line of sight, the determined view point position, and the recommended route data; and
   wherein the direction of line of sight determining means determines the direction of line of sight $\alpha(t)$ as follows:

$\alpha(t)=w1\times\arg|N_1-P_o|+w2\times\arg|N_2-P_o|+\cdots+wi\times\arg|N_i-P_o|+u\times\delta+v1\times\arg|P_o-L_1|+v2\times\arg|P_o-L_2|+\cdots+v_j\times\arg|P_o-L_j|$, wherein $w1+w2+\cdots+w_i+w_i+u+v1+v2+\cdots+V_j=1$, $N_1$ through $N_i$ denote a plurality of recommended positions of 1 through i which correspond to recommended route positions, $P_o$ denotes the present position of the mobile body, $L_1$ through $L_j$ denotes a plurality of past position information of the mobile body calculated before a predetermined period of time has passed by an j-th number of times or before predetermined interval of distance through which the mobile body has run by the j-th number of times, u denotes an aspect ratio of the display image screen, and $\delta=\beta_r=\arg|N_i-P_o|$.

27. A navigating apparatus comprising:
   a) present position detecting means for detecting a present position of a mobile body and a forwarding direction toward which the mobile body moves at the present position thereof;
   b) initial display parameter value setting means for previously setting the detected present position and display parameters thereinto as initial values;
   c) direction of line of sight determining means for determining a direction of line of sight for a perspectively projected image on the basis of at least the detected forwarding direction;
   d) view point position determining means for determining a position of a view point on which the direction of line of sight is based on the basis of at least the information of the forwarding direction detected by the present position detecting means;
   e) road map data storing means for storing at least a road map data expressed with a two-dimensional X-Y plane as a reference;
   f) coordinate transforming means for executing a coordinate transformation of the road map data stored in said road map data storing means on the basis of at least the determined direction of line of sight and the determined view point position into a bird's eye view which is the perspectively projected image of the read road map data so as to generate the bird's eye view; and g) display means for receiving the display data of the bird's eye view and for displaying the bird's eye view on its image screen, which further comprises:

recommended route storing means for storing a recommended route data, wherein said direction of line of sight determining means determines the direction of line of sight on the basis of the forwarding direction and recommended route data stored in said recommended route data storing means and wherein said coordinate transforming means executes the coordinate transformation on the basis of the determined direction of line of sight, the determined view point position, and the recommended route data; and wherein said coordinate transforming means executes the coordinate transformation of the road map data to generate the bird's eye view, with a reference point (Q) of the bird's eye view set to be equal to a recommended position N $(X_n, Y_n, 0)$ on a recommended route which is remote from the present position $P_o$ $(X_o, Y_o, Z_o)$ by a road distance R, wherein $x = X_n + L \cdot \cos \alpha(t)$, $y = Y_n + L \cdot \sin \alpha(t)$, wherein x and y denote coordinate values in x axis and y axis in a two-dimensional X-Y plane of a referring point B (x, y, 0), L denotes a distance from the reference point position Q $(X_n, Y_n, 0)$ to the referring point position B (x, y, 0), wherein the point position of the view point E $(X_o, Y_o, Z_o)$ is expressed as:

$X_o = x - h \cdot \cos \alpha(t)/\tan \theta$, $Y_o = y - h \cdot \sin \alpha(t)/\tan \theta$, and $Z_o = h$, wherein h denotes a height of the view point position E, $\alpha(t)$ denotes the direction of line of sight at a time of t, and $\theta$ denotes an angle of depression at the view point position E, and wherein the road distance R is defined as follows:

$R = F/\sqrt{(1 + F^2 + \tan^2\theta)} \times \{h(1 + \tan^2\theta)/(\tan\theta + u \cdot F) + D_c\}$, wherein F denotes a tangent of an angle of field of view in a lateral direction, u denotes an aspect ratio of the display image screen, $D_c$ denotes a distance form a position corresponding to a lowest end of the display image screen to the display reference point Q, and wherein such a requirement of $R < D_c$ that the mobile body is not hidden below the lower end of a view plane G under the equation of R is added so that the value of $D_c$ is defined so as to fall in the following condition:

$D_c > F/\sqrt{(1 + F^2 + \tan^2\theta) - F} \{h \cdot (1 + \tan^2\theta)/(\tan\theta + u \cdot F)\}$ 28. A navigating apparatus comprising:

a) present position detecting means for detecting a present position of a mobile body and a forwarding direction toward which the mobile body moves at the present position thereof;

b) initial display parameter value setting means for previously setting the detected present position and display parameters thereinto as initial values;

c) direction of line of sight determining means for determining a direction of line of sight for a perspectively projected image on the basis of at least the detected forwarding direction;

d) view point position determining means for determining a position of a view point on which the direction of line of sight is based on the basis of at least the information of the forwarding direction detected by the present position detecting means;

e) road map data storing means for storing at least a road map data expressed with a two-dimensional X-Y plane as a reference;

f) coordinate transforming means for executing a coordinate transformation of the road map data stored in said road map data storing means on the basis of at least the determined direction of line of sight and the determined view point position into a bird's eye view which is the perspectively projected image of the read road map data so as to generate the bird's eye view; and g) display means for receiving the display data of the bird's eye view and for displaying the bird's eye view on its image screen, which further comprises:

display reference point determining means for determining a display reference point on the road map and wherein the road map data storing means stores the road map data, the road map data being divided into a plurality of constant meshes and said coordinate transforming means is constituted by calculation processing means for executing required calculation processings on the basis of required number of meshes fetched from the road map storing means and on the basis of information derived from said display reference point determining means, which further comprises:

display parameter inputting means for receiving the display parameters from said initial display parameter value setting means and for setting and varying arbitrarily the values of the display parameters, wherein said calculation processing means calculates the required calculation processings on the basis of the required number of meshes fetched from said road map storing means, the information derived from said display reference point determining means, and display parameters input from said display parameter input means, and wherein said display means displays the road map data in the bird's eye view on its display image screen as results of calculations executed by said calculation processing means;

wherein said road map data storing means comprises an external memory block and wherein said calculation processing means includes: a view point position/a road map region to be displayed determining means for determining the view point position and a road map region to be displayed on the basis of he information derived from said display reference point determining means; data access means for providing data access to the road map data stored in the external memory block; internal data storing means, having a predetermined memory capacity, for storing data accessed by said data access means therein; graphic data coordinate transforming means for executing the coordinate transformation the road map data stored in said internal data storing means on the basis of the information determined by the view point position/the road map region to be displayed determining means so as to generate the bird's eye view; and image data outputting means for outputting the image data of the bird's eye view generated by said graphic data coordinate transforming means; and wherein a value of integer times as long as a length of a side of each mesh is made equal to a diameter (2 R) of a circumscribed circle covering the road map region to be displayed.

29. A navigating apparatus as claimed in claim 28, wherein said calculation processing means executes the road map displays in a stepwise manner according to a degree of details previously set on the road map data and a distance from the view point to the road map data.

30. A navigating apparatus as claimed in claim 28, wherein a value of the integer multiple (N) is previously set according to the memory capacity of said internal data storing means.

31. A navigating apparatus as claimed in claim 30, wherein said calculation processing means determines each of the meshes in the external memory block which corresponds to the determined region to be displayed by the view point position/the road map region to be displayed on the basis of a center coordinate (RX, RY) of the circumscribed circle, when said calculation processing means updates the displayed image of the display means in accordance with a movement of the display reference point.

32. A navigating apparatus as claimed in claim 28, wherein said calculating processing means executes the calculation processings so that the road map data in the bird's eye view on a limited range of the display image screen of said display means and an information other than the road map data is displayed on a range outside the road map display range.

33. A navigating apparatus as claimed in claim 32, wherein said calculation processing means sets a boundary line on the display image screen of the display image as a pseudo horizon above which a present clock is displayed.

34. A navigating apparatus as claimed in claim 32, wherein said calculation processing means sets a boundary line on the display image screen of the display image as a pseudo horizon above which a destination at which the mobile body is finally to arrive is displayed.

* * * * *